(12) United States Patent
Ide et al.

(10) Patent No.: US 9,285,601 B2
(45) Date of Patent: Mar. 15, 2016

(54) OPTICAL DEVICE, PROJECTOR, MANUFACTURING METHOD, AND MANUFACTURING SUPPORT APPARATUS

(75) Inventors: Masafumi Ide, Tokorozawa (JP); Seiko Kato, Tokorozawa (JP); Takaaki Takeishi, Tokorozawa (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 134 days.

(21) Appl. No.: 14/234,775

(22) PCT Filed: Jun. 27, 2012

(86) PCT No.: PCT/JP2012/066444
§ 371 (c)(1),
(2), (4) Date: Jan. 24, 2014

(87) PCT Pub. No.: WO2013/015066
PCT Pub. Date: Jan. 31, 2013

(65) Prior Publication Data
US 2014/0132849 A1    May 15, 2014

(30) Foreign Application Priority Data

Jul. 25, 2011 (JP) ................ 2011-162584
Nov. 25, 2011 (JP) ................ 2011-258134
Mar. 12, 2012 (JP) ................ 2012-055194

(51) Int. Cl.
*G02F 1/1335* (2006.01)
*G02B 27/48* (2006.01)
(Continued)

(52) U.S. Cl.
CPC ...... *G02B 27/48* (2013.01); *G02F 1/13* (2013.01); *G02F 1/133528* (2013.01);
(Continued)

(58) Field of Classification Search
CPC .............. G02F 1/133528; G02F 1/133536; G02F 1/13363; G02F 1/133634; G02F 1/133615; G02F 1/133603; G02F 1/133604; G02B 5/3033; G02B 5/3016; G02B 5/3083; G02B 27/26; G02B 27/2214; H04N 13/0404; H04N 9/3197; H04N 9/3105; H04N 5/7441
USPC .................................. 349/96, 15, 117, 61, 5
See application file for complete search history.

(56) References Cited

U.S. PATENT DOCUMENTS

2004/0165126 A1    8/2004   Ooi et al.
2005/0128406 A1    6/2005   Lee
(Continued)

FOREIGN PATENT DOCUMENTS

CN    1357785 A    7/2002
CN    1627162 A    6/2005
(Continued)

OTHER PUBLICATIONS

Communication dated Mar. 23, 2015, issued by the State Intellectual Property Office of the People's Republic of China in counterpart Application No. 201280033008.7.
(Continued)

*Primary Examiner* — Mike Qi
(74) *Attorney, Agent, or Firm* — Sughrue Mion, PLLC

(57) ABSTRACT

A light source unit (110) emits linearly polarized laser light of a given wavelength. A wave plate (121) transmits the laser light emitted from the light source unit (110) and has a phase delay axis of which the direction is adjusted to about 0 degrees with respect to the polarization direction (101) of the laser light. A liquid crystal cell (123) transmits laser light that has passed through the wave plate (121) and by a switchable rotation amount, rotates the polarization direction (101) of the laser light transmitted through the liquid crystal cell (123). A wave plate (125) transmits laser light that has passed through the liquid crystal cell (123); and further has a phase delay axis of which the direction is adjusted to about 0 degrees with respect to the polarization direction (101) of the laser light.

21 Claims, 47 Drawing Sheets

(51) Int. Cl.
- *G02F 1/13* (2006.01)
- *G03B 21/20* (2006.01)
- *G03B 33/12* (2006.01)
- *G03B 35/26* (2006.01)
- *H04N 9/31* (2006.01)
- *G03B 21/00* (2006.01)
- *G02F 1/13363* (2006.01)

(52) U.S. Cl.
CPC ......... *G03B 21/005* (2013.01); *G03B 21/2033* (2013.01); *G03B 21/2073* (2013.01); *G03B 33/12* (2013.01); *G03B 35/26* (2013.01); *H04N 9/3161* (2013.01); *H04N 9/3167* (2013.01); *G02F 2001/133633* (2013.01); *G02F 2001/133638* (2013.01)

(56) References Cited

U.S. PATENT DOCUMENTS

| | | |
|---|---|---|
| 2005/0146659 A1 | 7/2005 | Ishii et al. |
| 2006/0103778 A1 | 5/2006 | Ooi et al. |
| 2006/0215091 A1* | 9/2006 | Muramoto et al. ........... 349/117 |
| 2009/0086112 A1 | 4/2009 | Kaida et al. |
| 2009/0190080 A1 | 7/2009 | Dessaud |
| 2009/0257106 A1 | 10/2009 | Tan et al. |
| 2009/0296096 A1 | 12/2009 | Jeong |
| 2010/0238099 A1 | 9/2010 | Sumiyama |

FOREIGN PATENT DOCUMENTS

| | | | | |
|---|---|---|---|---|
| CN | 1637525 A | 7/2005 | | |
| CN | 101493612 A | 7/2009 | | |
| CN | 101592786 A | 12/2009 | | |
| CN | 101915953 A | 12/2010 | | |
| CN | 102089616 A | 6/2011 | | |
| JP | 2002-269797 A | 9/2002 | | |
| JP | 2002269797 A | * 9/2002 | ............ | G11B 7/135 |
| JP | 2003-107475 A | 4/2003 | | |
| JP | 2003107475 A | * 4/2003 | .......... | G02F 1/13363 |
| JP | 2007-121842 A | 5/2007 | | |
| JP | 2008-70690 A | 3/2008 | | |
| JP | 2008070690 A | * 3/2008 | ............... | G02B 5/30 |
| JP | 2009-294604 A | 12/2009 | | |
| JP | 2010-020028 A | 1/2010 | | |
| JP | 2010-160307 A | 7/2010 | | |
| JP | 2010-244021 A | 10/2010 | | |
| JP | 2010-267353 A | 11/2010 | | |

OTHER PUBLICATIONS

Othera et al., Liquid Crystal Polarization Controlling Devices Utilizing Rotating Electric Fields, pp. 1-4.
International Search Report for PCT/JP2012/066444 dated Sep. 4, 2012.
Communication dated Feb. 20, 2015 from the European Patent Office in counterpart application No. 12817473.7.
International Preliminary Report on Patentability, dated Feb. 6, 2014, issued by the International Search Authority, in counterpart Application No. PCT/JP2012/066444.

\* cited by examiner

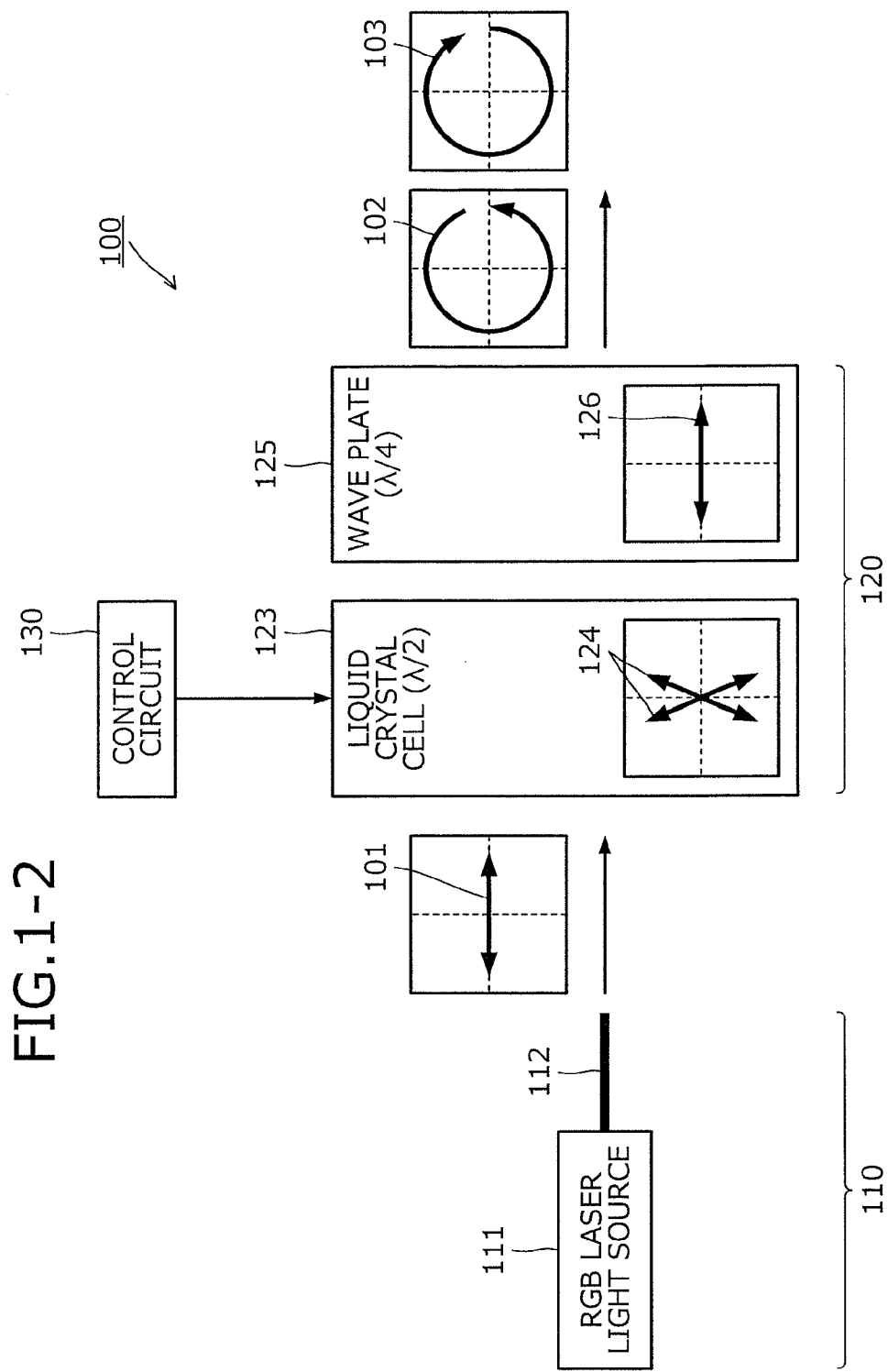

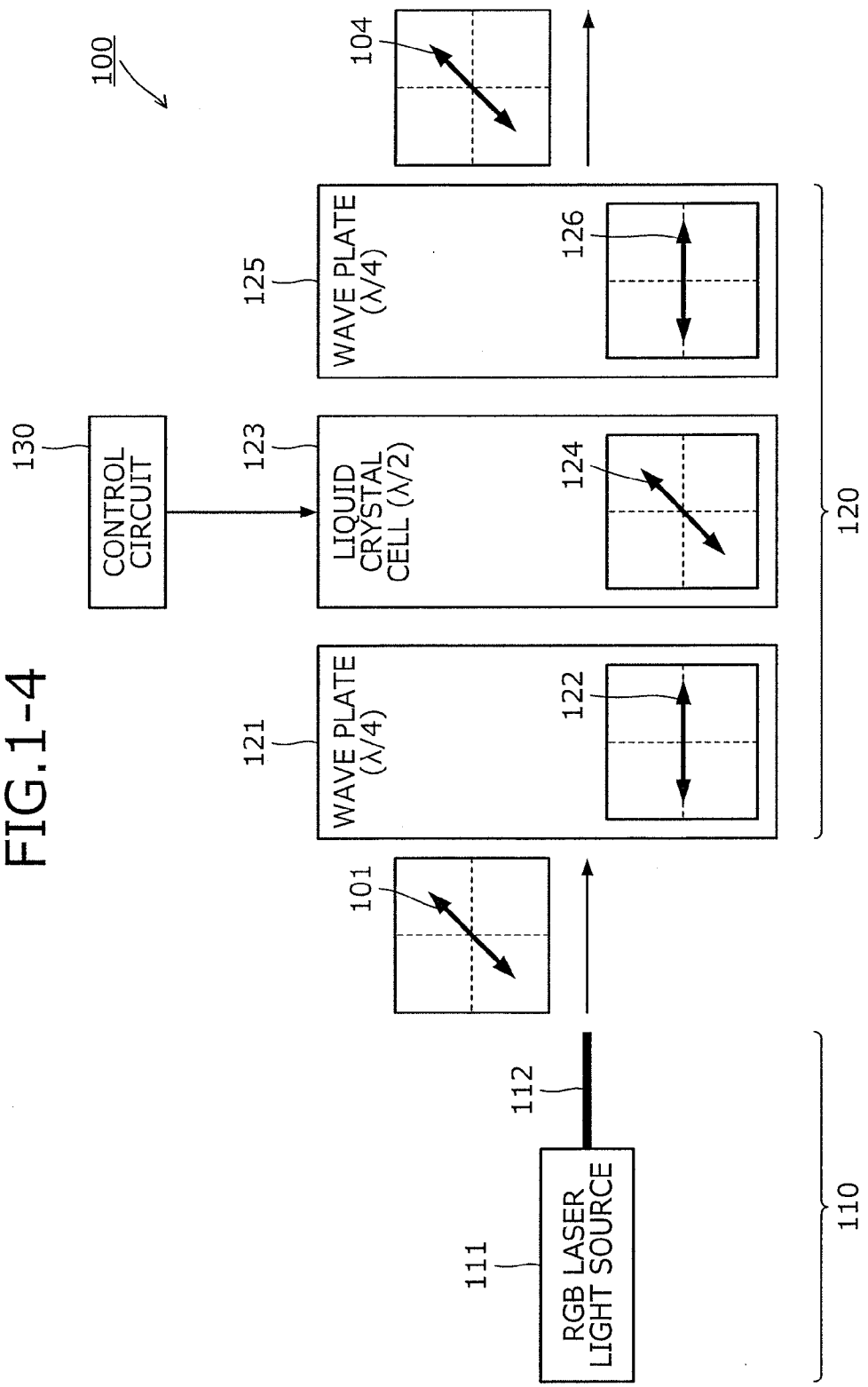

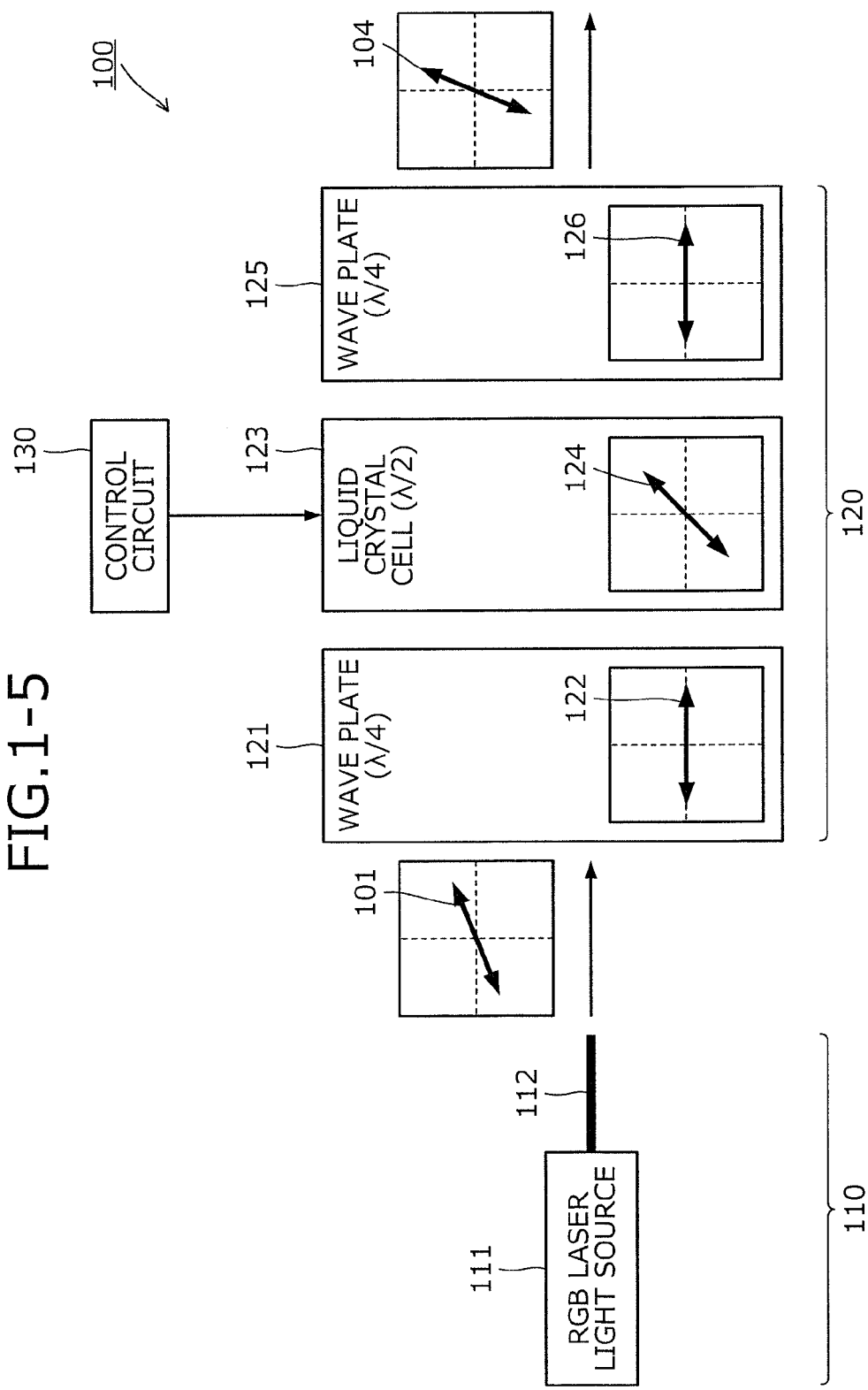

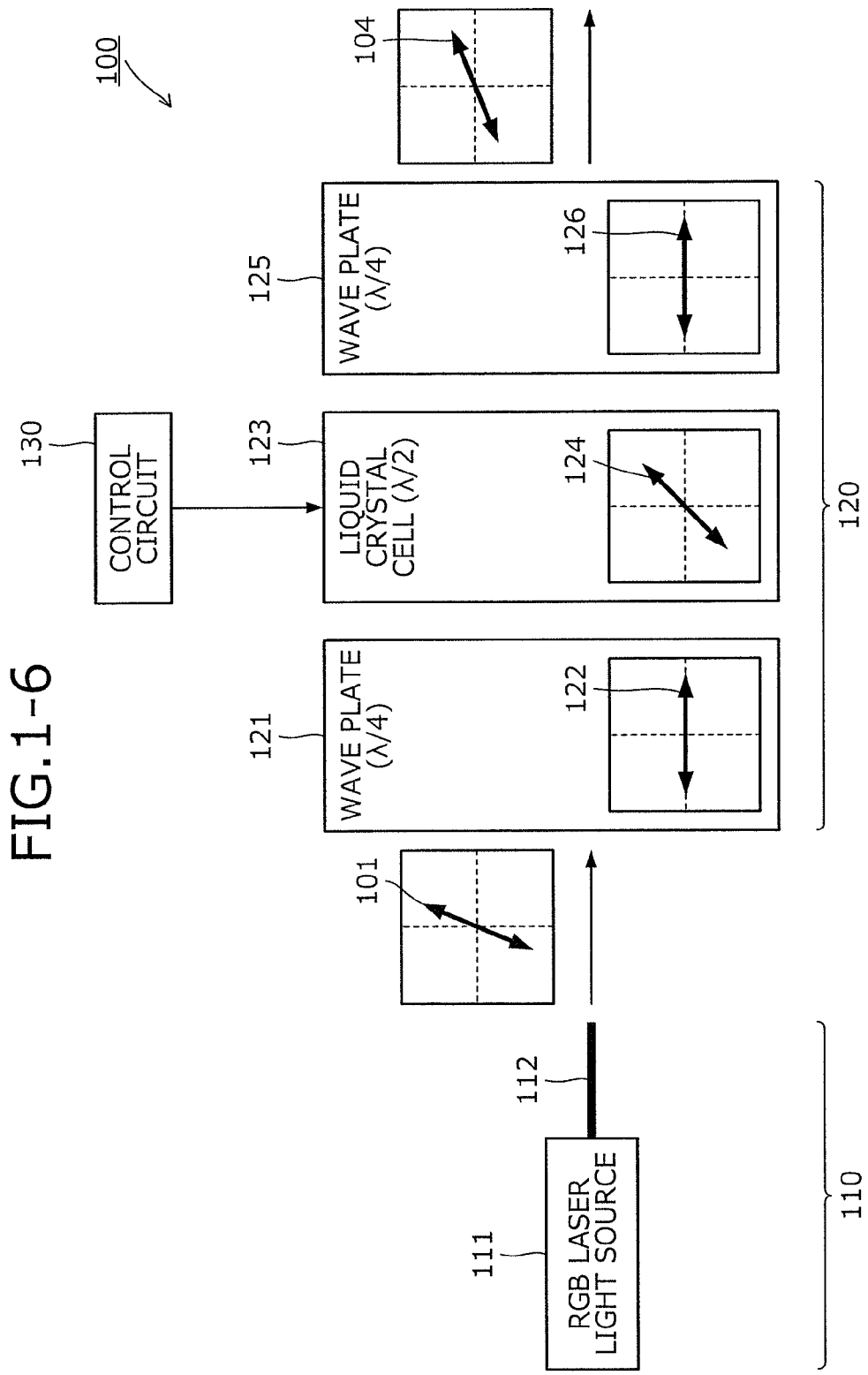

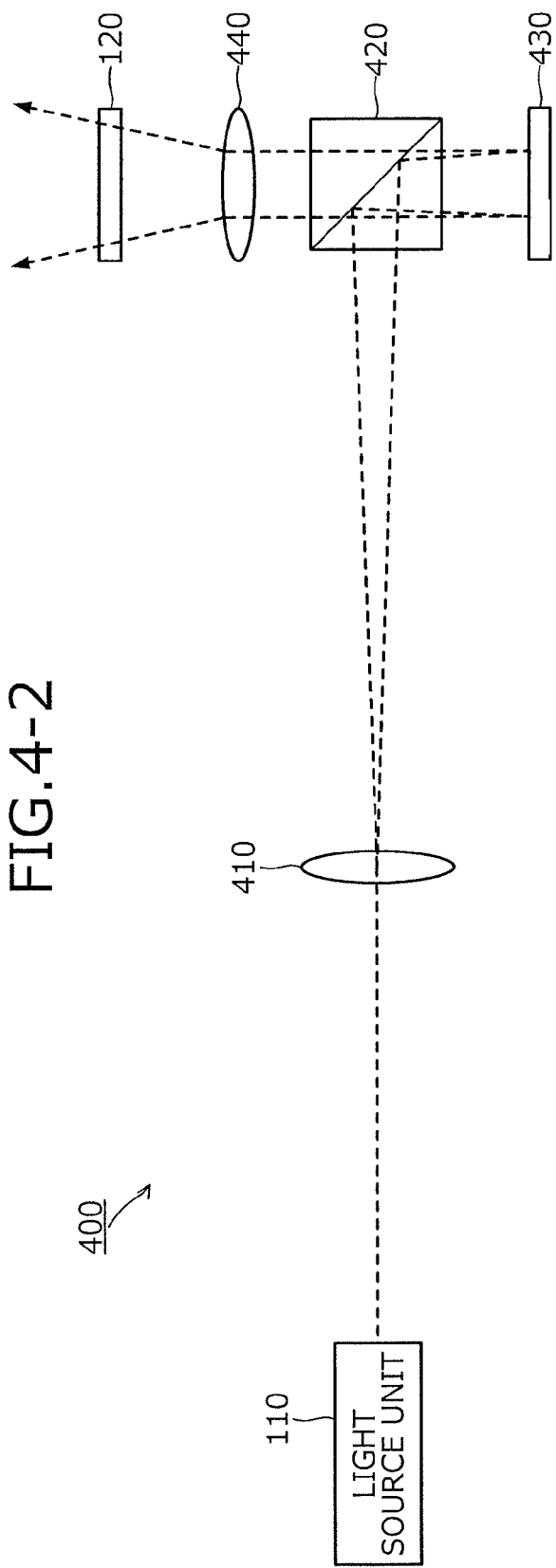

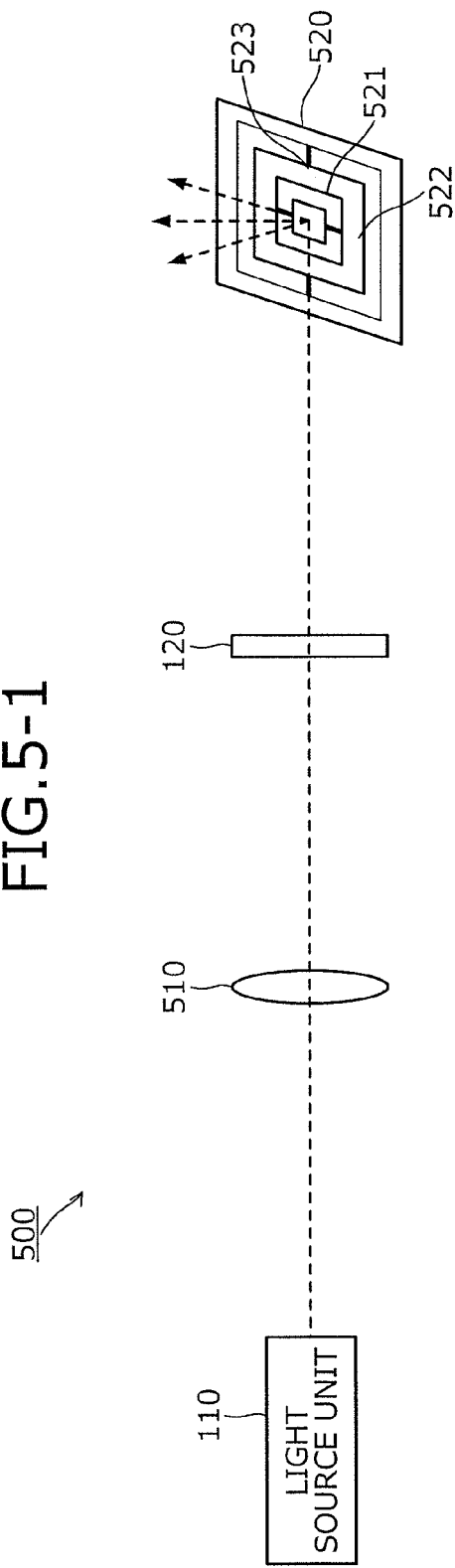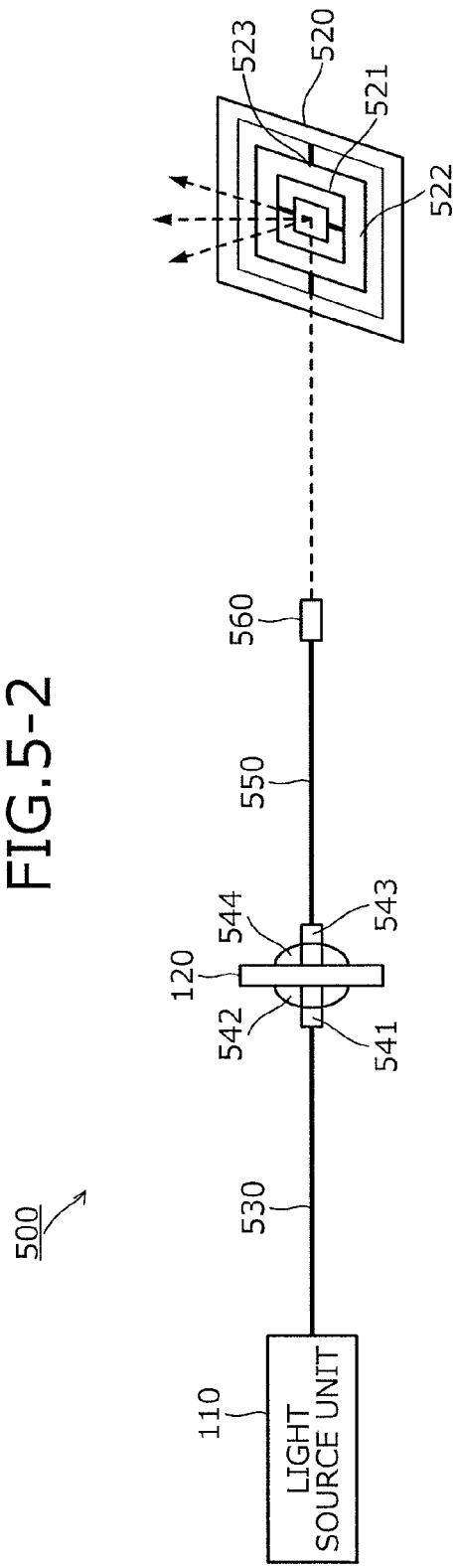

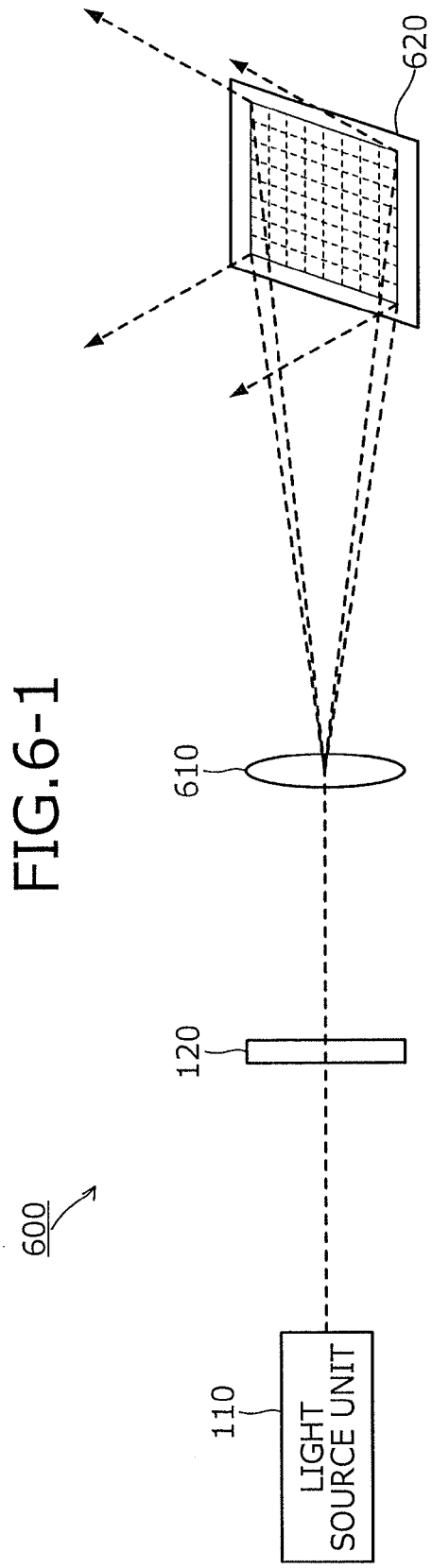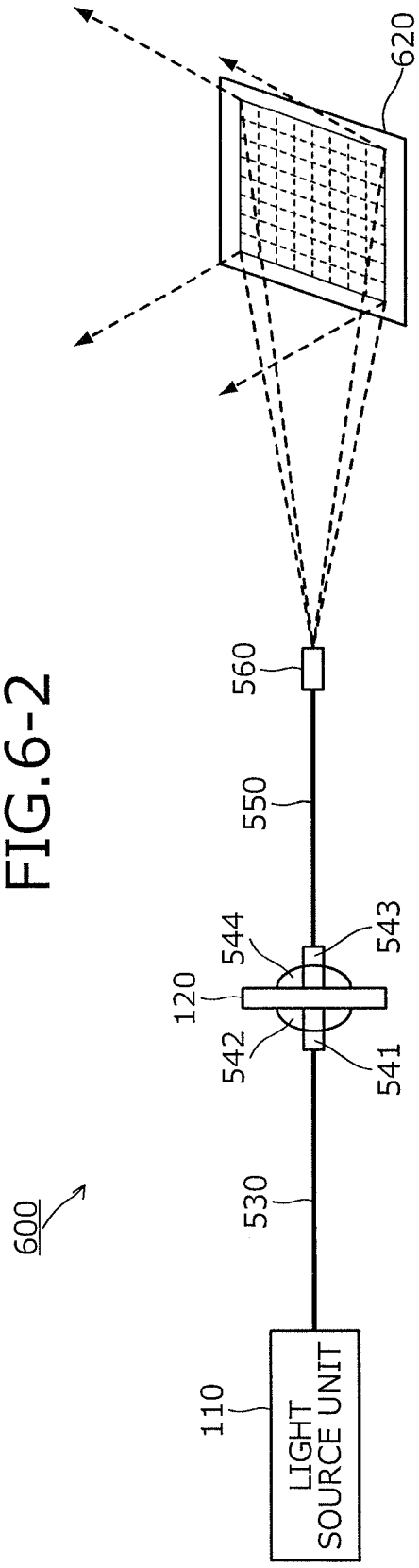

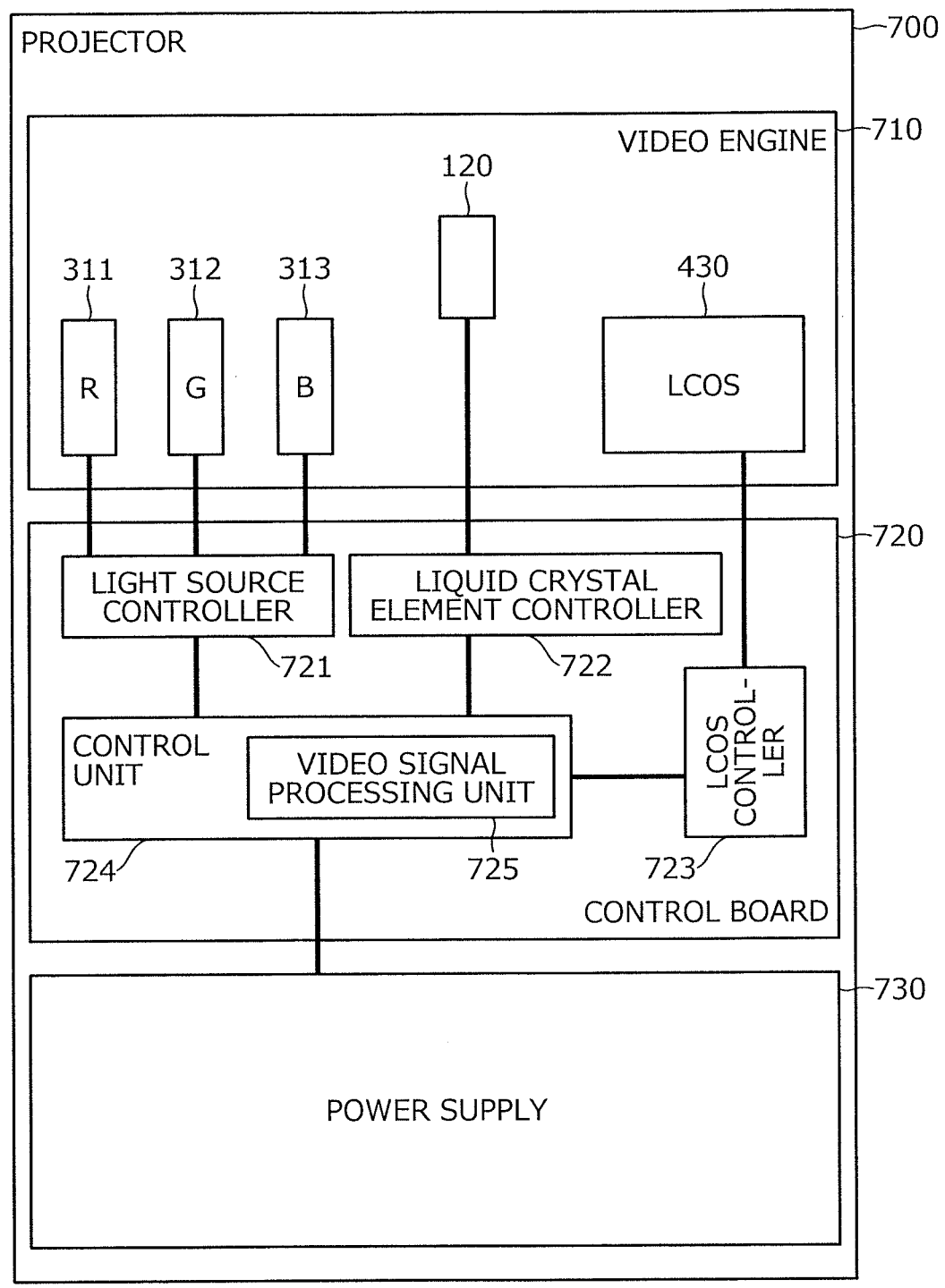

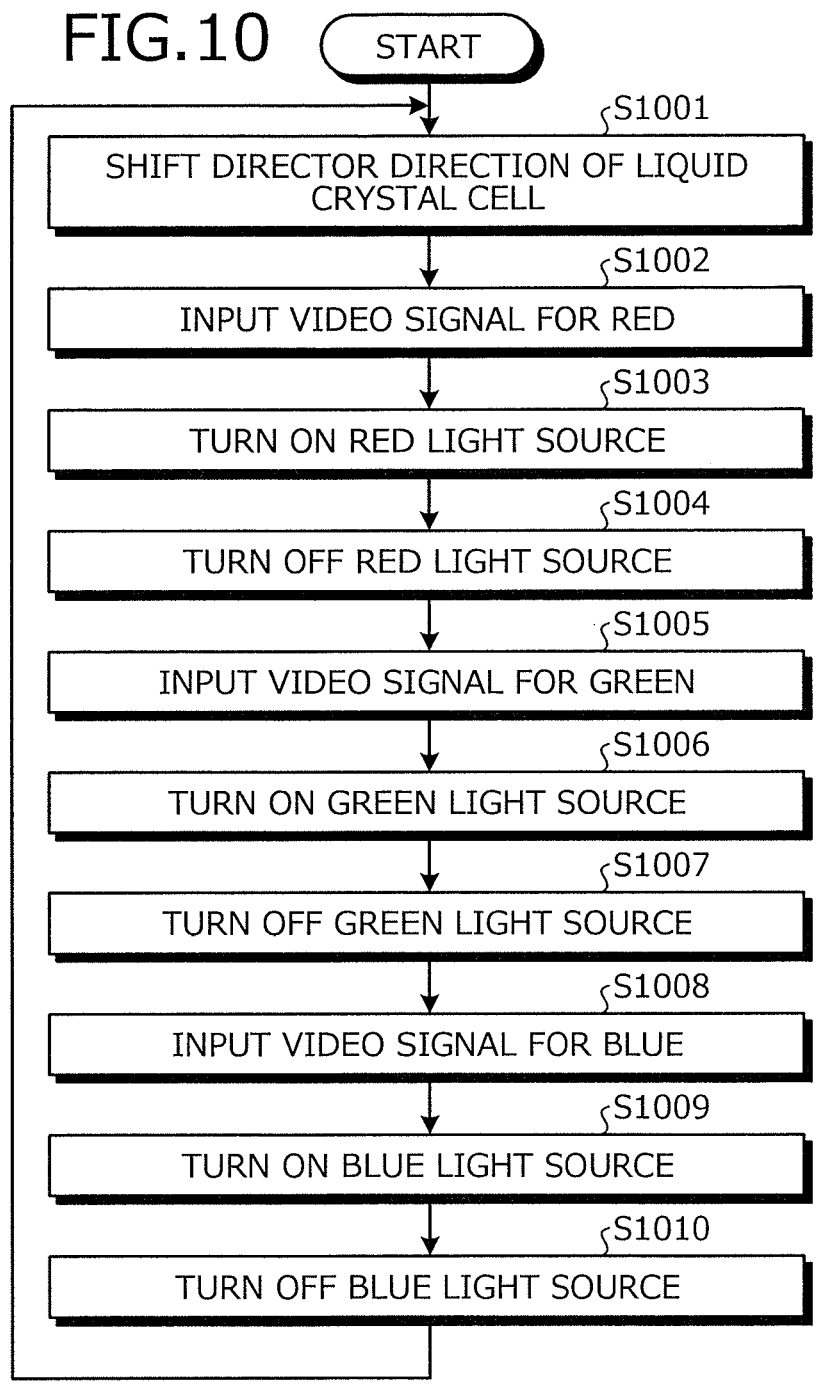

|  | VOLTAGE | TIME |
|---|---|---|
| electrode1 | $V_0$ | T |
| electrode2 | $0.854V_0$ | 730T/1000 |
| electrode3 | $0.5V_0$ | 250T/1000 |
| electrode4 | $0.146V_0$ | 20T/1000 |
| electrode5 | 0 | 0 |
| electrode6 | $0.146V_0$ | 20T/1000 |
| electrode7 | $0.5V_0$ | 250T/1000 |
| electrode8 | $0.854V_0$ | 730T/1000 |

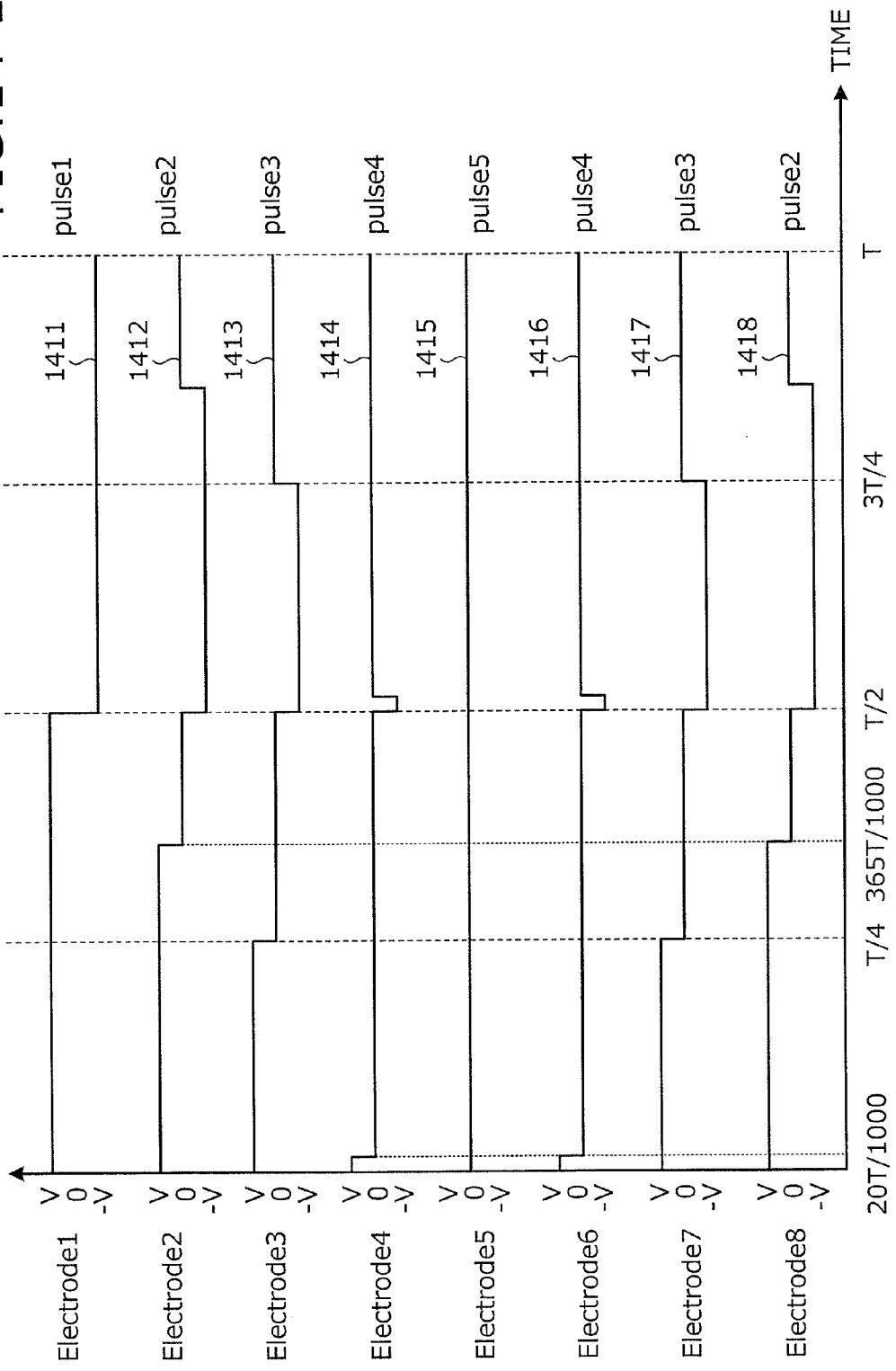

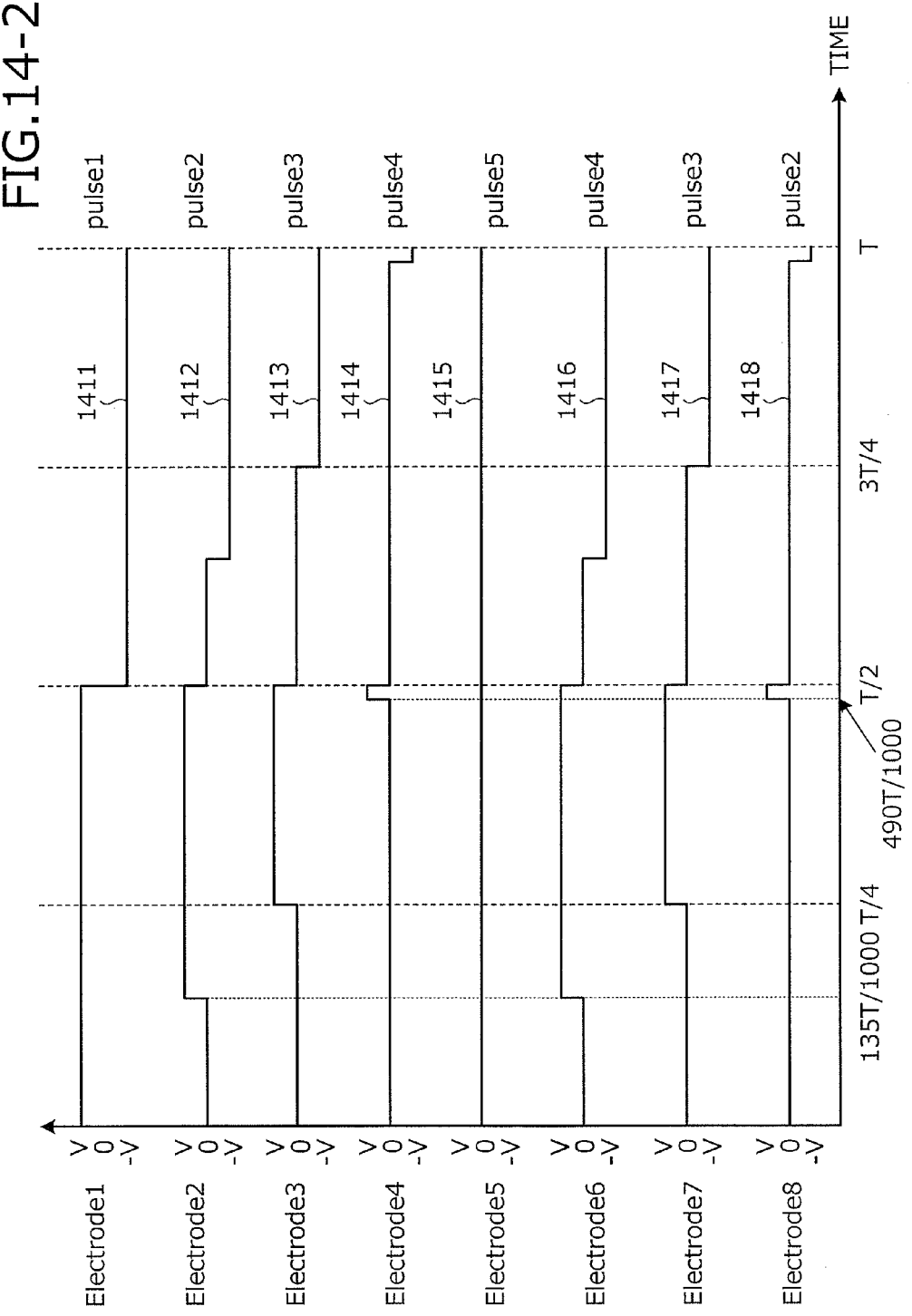

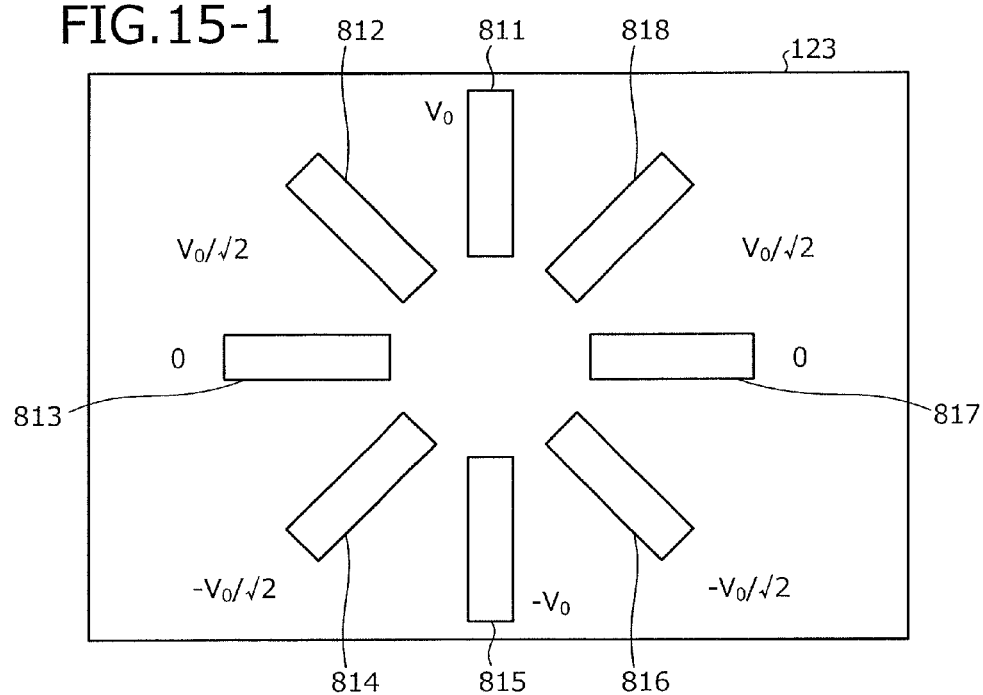

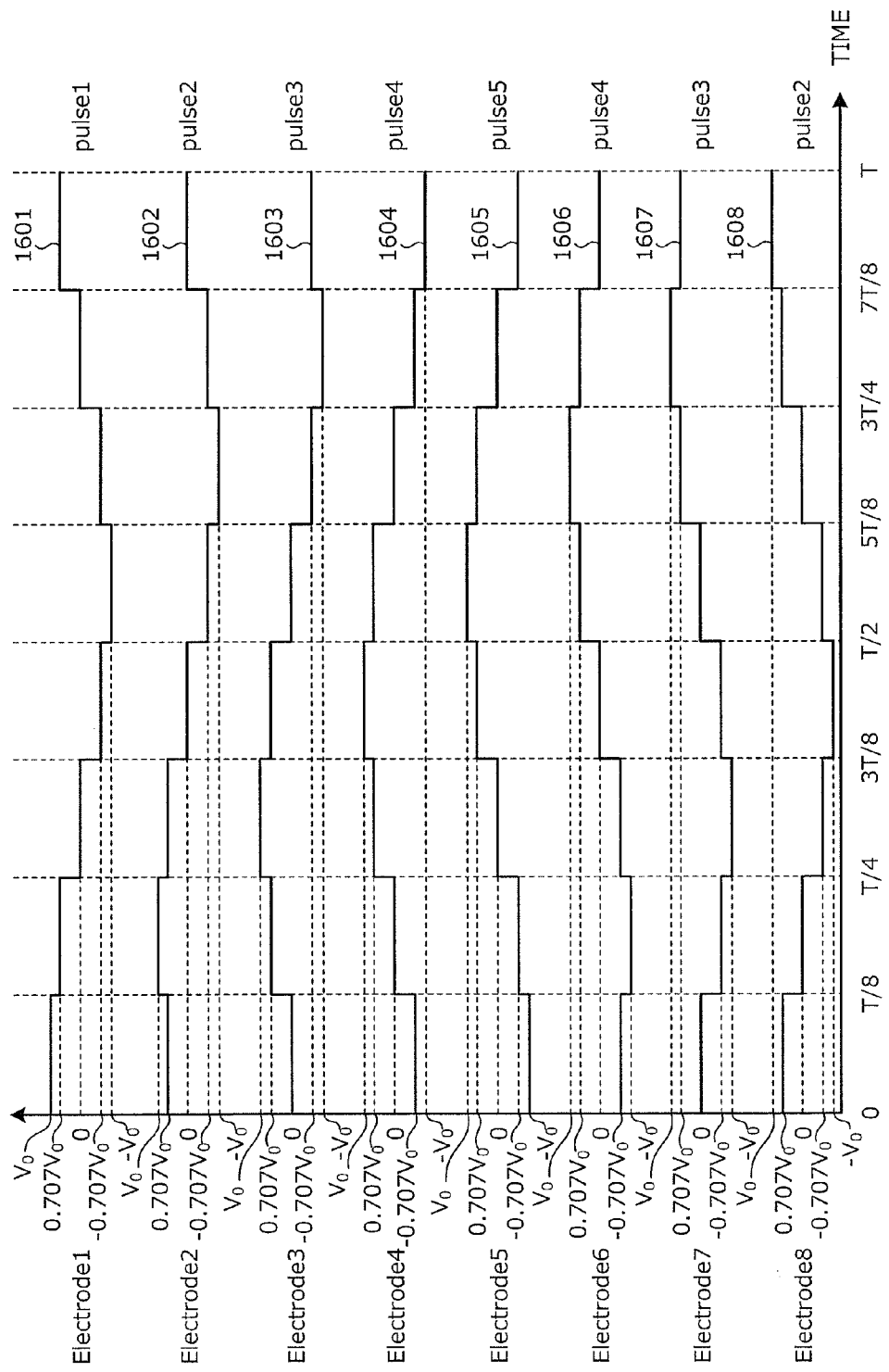

FIG.19

| | electrode 1 | electrode 2 | electrode 3 | electrode 4 | electrode 5 | electrode 6 | electrode 7 | electrode 8 |
|---|---|---|---|---|---|---|---|---|
| 1ST CYCLE | pulse 1 | pulse 2 | pulse 3 | pulse 4 | pulse 5 | pulse 4 | pulse 3 | pulse 2 |
| 2ND CYCLE | pulse 2 | pulse 3 | pulse 4 | pulse 5 | pulse 4 | pulse 3 | pulse 2 | pulse 1 |
| 3RD CYCLE | pulse 3 | pulse 4 | pulse 5 | pulse 4 | pulse 3 | pulse 2 | pulse 1 | pulse 2 |
| 4TH CYCLE | pulse 4 | pulse 5 | pulse 4 | pulse 3 | pulse 2 | pulse 1 | pulse 2 | pulse 3 |
| 5TH CYCLE | pulse 5 | pulse 4 | pulse 3 | pulse 2 | pulse 1 | pulse 2 | pulse 3 | pulse 4 |
| 6TH CYCLE | pulse 4 | pulse 3 | pulse 2 | pulse 1 | pulse 2 | pulse 3 | pulse 4 | pulse 5 |
| 7TH CYCLE | pulse 3 | pulse 2 | pulse 1 | pulse 2 | pulse 3 | pulse 4 | pulse 5 | pulse 4 |
| 8TH CYCLE | pulse 2 | pulse1 | pulse 2 | pulse 3 | pulse 4 | pulse 5 | pulse 4 | pulse 3 |

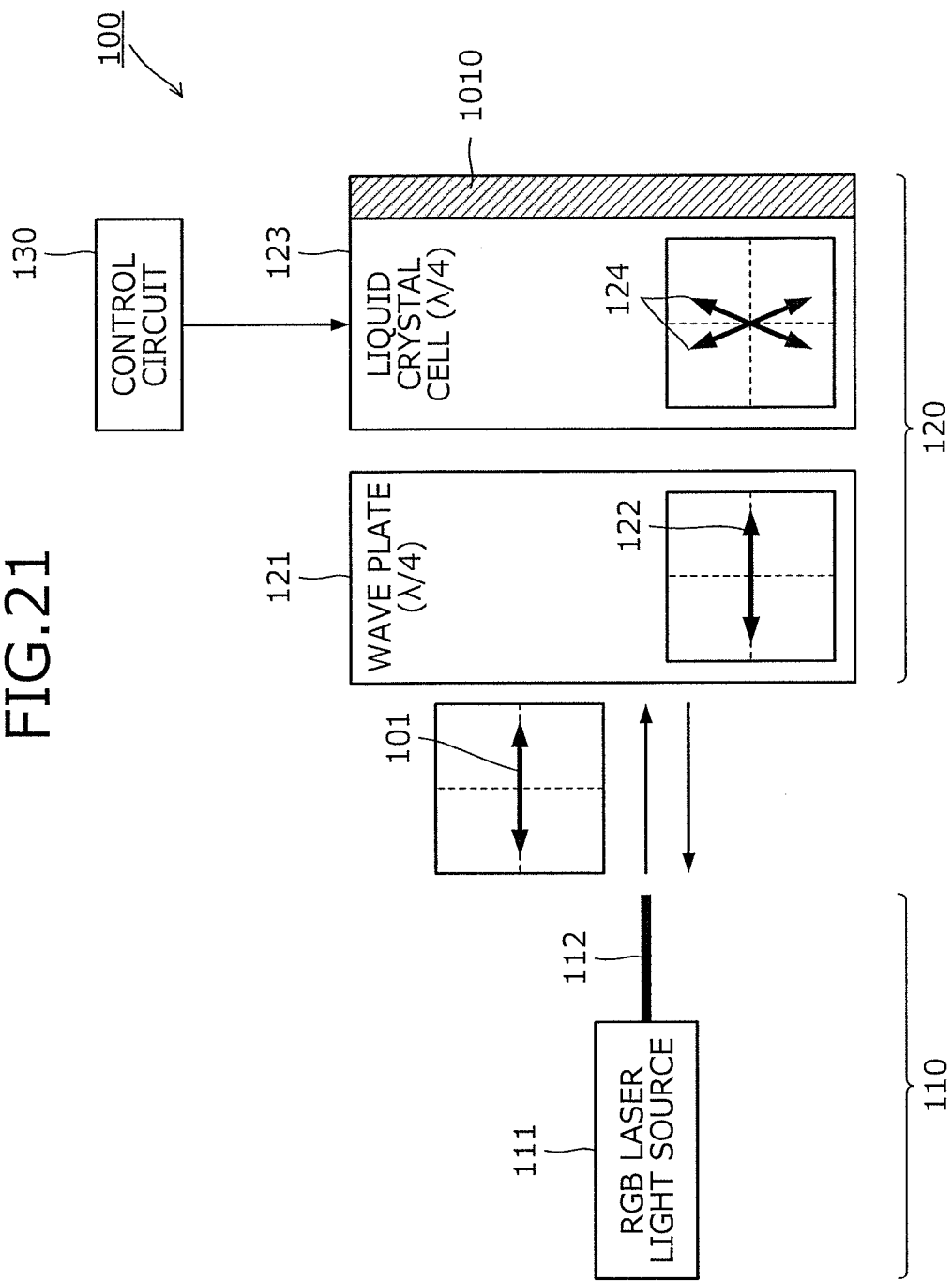

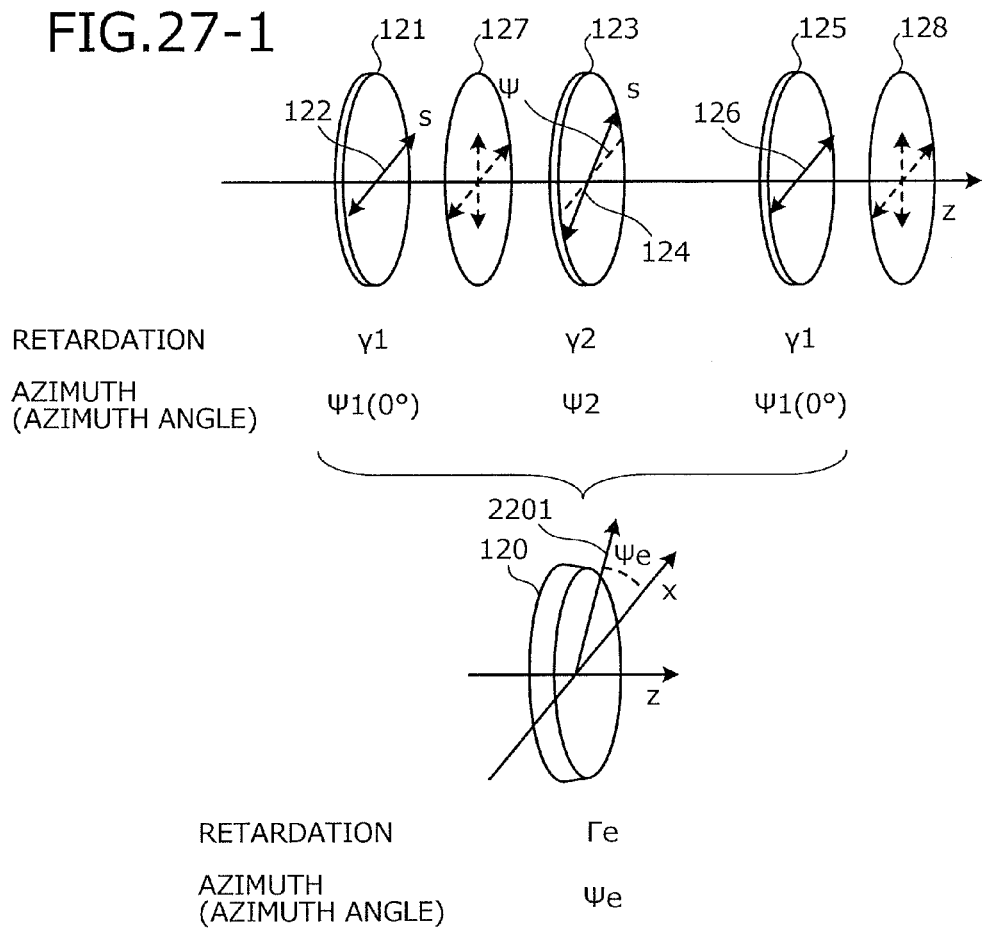

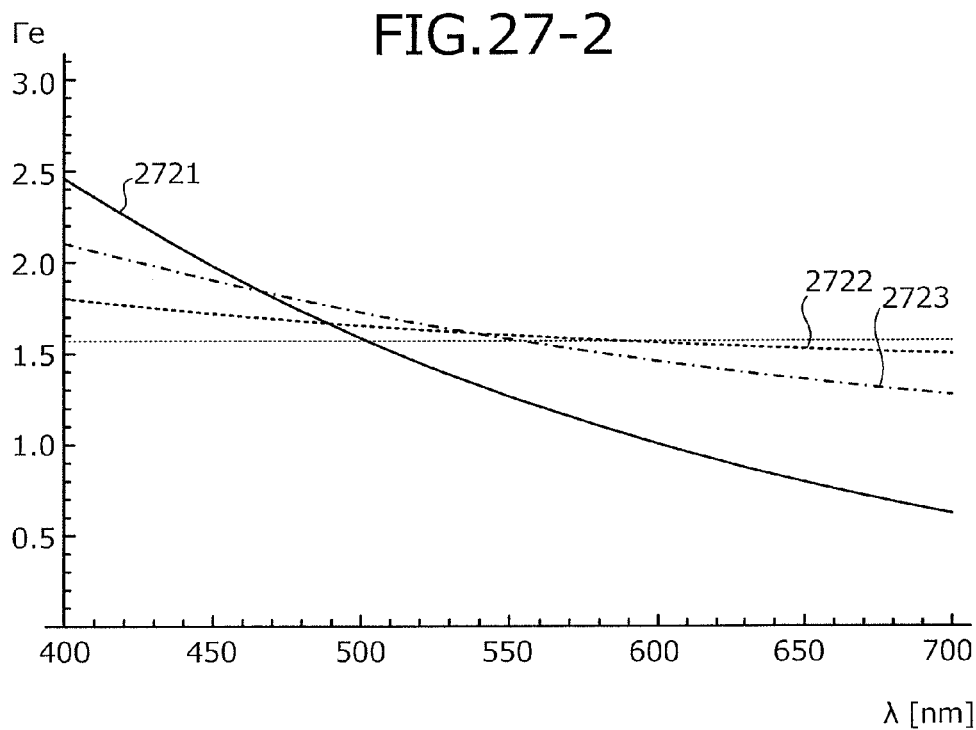
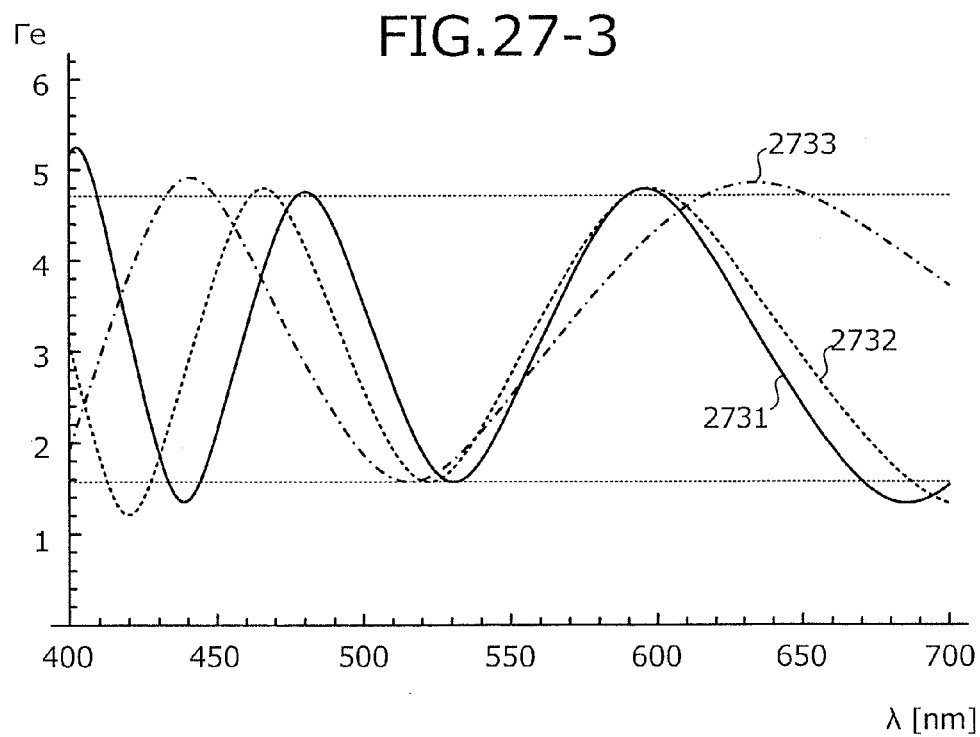

OPTICAL DEVICE, PROJECTOR, MANUFACTURING METHOD, AND MANUFACTURING SUPPORT APPARATUS

CROSS REFERENCE TO RELATED APPLICATIONS

This application is a National Stage of International Application No. PCT/JP2012/066444 filed Jun. 27, 2012, claiming priority based on Japanese Patent Application No. 2011-162584, filed Jul. 25, 2011, Japanese Patent Application No. 2011-258134, filed Nov. 25, 2011, and Japanese Patent Application No. 2012-055194, filed Mar. 12, 2012, the contents of all of which are incorporated herein by reference in their entirety.

TECHNICAL FIELD

The present invention relates to an optical device that generates laser light, to a projector, to a manufacturing method, and to a manufacturing support apparatus.

BACKGROUND ART

A conventional projector is known, which modulates light emitted from a lighting device by a spatial light modulator and projects onto a screen, an enlarged form of modulated image light through a projection optical system, such as projection lens. Conventionally, a metal hydride lamp, halogen lamp, etc. has been used as the lighting device of the projector. In recent years, however, use of a laser diode (LD) has been proposed in order to reduce the size of the lighting device and the projector.

However, because laser light is coherent light, video light projected in an enlarged form develops speckle patterns having randomly distributed luminous dots and dark dots. The speckle patterns are created when beams of light emitted from different points of the projection optical system interfere with each other because of the irregular phase relation between the beams of light. Such speckle patterns deteriorate the quality of a projected image or video. As a solution to such a problem, an image display device is known, which reduces speckle noise by controlling the polarized state of each beam of laser light emitted from each of primary color light source (see, e.g., Japanese Patent Laid-Open Publication Nos. 2010-160307 and 2007-121842). Another image display device is also widely known, which controls the polarization state of light and has a 3D display function.

Patent document 1: Japanese Patent Laid-Open Publication No. 2010-160307
Patent document 2: Japanese Patent Laid-Open Publication No. 2007-121842

DISCLOSURE OF INVENTION

Problem to be Solved by the Invention

However, according to the above conventional techniques, a polarization controller that controls the polarization state of light is provided for each beam of primary color light and the applied voltage is controlled. This leads to a problem of an increase in the size of the device. Because the conventional polarization controller has wavelength dependency, if multiple beams of light of primary colors (wavelengths) are controlled through a single polarization controller, the polarization states of the beams of primary color light differ from one another due to wavelength dispersion, leading to a drop in the extinction ratio and posing a problem of deteriorated image quality.

To solve the above problems of the conventional techniques, an object of the present invention is to provide an optical device, a projector, a manufacturing method, and a manufacturing support apparatus that enable reductions in device size while suppressing drops in image quality.

Means for Solving Problem

To solve the problems above and achieve an object, an optical device includes a liquid crystal cell that transmits laser light that is in a state of polarization of a given direction and of a given wavelength, the liquid crystal cell being capable of shifting a direction of a director with respect to the given direction by rotating the direction of the director parallel to a substrate surface; a wave plate that transmits laser light emitted from the liquid crystal cell, the wave plate having a phase delay axis set in an arbitrary direction; and a control circuit that cyclically shifts the direction of the director. The optical device outputs the laser light that has passed through the wave plate and the liquid crystal cell.

As a result, the polarization state of laser light of a given wavelength can be controlled through a single wideband optical device.

Effect of the Invention

According to the present invention, an optical device that can shift the polarization direction of laser light at high speed can be provided. Adopting such an optical device offers an effect of enabling reductions in device size while suppressing the deterioration of image quality and also offers an effect of enabling size reductions of a device having a 3D display function.

BRIEF DESCRIPTION OF DRAWINGS

FIG. 1-2 depicts a first modification of the optical device;
FIG. 1-3 depicts a second modification of the optical device;
FIG. 1-4 depicts a third modification of the optical device;
FIG. 1-5 depicts a fourth modification of the optical device;
FIG. 1-6 depicts a fifth modification of the optical device;
FIG. 2-1 depicts an example of characteristics of retardation by a liquid crystal device;
FIG. 2-2 depicts an example of chromatic dispersion characteristics of the liquid crystal device of FIG. 1-1;
FIG. 3-1 depicts a configuration example of a light source unit;
FIG. 3-2 depicts a first modification of the light source unit;
FIG. 3-3 depicts a second modification of the light source unit;
FIG. 4-1 depicts a first configuration example of a video engine to which the optical device is applied;
FIG. 4-2 depicts a modification of the first configuration example of the video engine;
FIG. 5-1 depicts a second configuration example of a video engine to which the optical device is applied;
FIG. 5-2 depicts a third configuration example of a video engine to which the optical device is applied;
FIG. 6-1 depicts a fourth configuration example of a video engine to which the optical device is applied;

FIG. 6-2 depicts a fifth configuration example of a video engine to which the optical device is applied;

FIG. 7 depicts a configuration example of a projector to which the optical device is applied;

FIG. 8-1 depicts a first example of an electrode structure of the liquid crystal cell;

FIG. 8-2 depicts a second example of the electrode structure of the liquid crystal cell;

FIG. 8-3 depicts a third example of the electrode structure of the liquid crystal cell;

FIG. 8-4 depicts a fourth example of the electrode structure of the liquid crystal cell;

FIG. 9-1 depicts a first example of a form of use of the projector;

FIG. 9-2 depicts a second example of a form of use of the projector;

FIG. 10 is a flowchart of an example of control in a case of realizing a reduction in speckles;

FIG. 13-1 depicts an example of applied voltages to the liquid crystal cell;

FIG. 13-2 depicts an example of times for applying voltages during one cycle;

FIG. 14-1 depicts a first example of waveforms of voltages applied to the liquid crystal cell;

FIG. 14-2 depicts a second example of waveforms of voltages applied to the liquid crystal cell;

FIG. 15-1 depicts an example of voltages applied to the liquid crystal cell;

FIG. 15-2 depicts an example of times for applying voltages during one cycle;

FIG. 16 depicts a third example of waveforms of voltages applied to the liquid crystal cell;

FIG. 19 depicts an example of voltage application patterns for respective electrodes of the liquid crystal cell;

FIG. 20-1 depicts an example of changes of electric field distributions caused by voltage application patterns;

FIG. 20-2 depicts an example of changes of electric field distributions caused by voltage application patterns;

FIG. 20-3 depicts an example of changes of electric field distributions caused by voltage application patterns;

FIG. 20-4 depicts an example of changes of electric field distributions caused by voltage application patterns;

FIG. 20-5 depicts an example of changes of electric field distributions caused by voltage application patterns;

FIG. 20-6 depicts an example of changes of electric field distributions caused by voltage application patterns;

FIG. 20-7 depicts an example of changes of electric field distributions caused by voltage application patterns;

FIG. 20-8 depicts an example of changes of electric field distributions caused by voltage application patterns;

FIG. 21 depicts another modification of the optical device;

FIG. 24-1 is a graph of a first example of characteristics of an azimuth ($\Psi=3\pi/8$) in a case of using the liquid crystal device as the quarter wave plate;

FIG. 24-2 is a graph of a first example of characteristics of the azimuth ($\Psi=5\pi/8$) in a case of using the liquid crystal device as the quarter wave plate;

FIG. 26-1 is a graph of a second example of characteristics of the azimuth ($\Psi=3\pi/8$) in a case of using the liquid crystal device as the quarter wave plate;

FIG. 26-2 is a graph of a second example of characteristics of the azimuth ($\Psi=5\pi/8$) in a case of using the liquid crystal device as the quarter wave plate;

FIG. 27-1 depicts an example of a laminated wave plate in which phase difference films are combined together;

FIG. 27-2 is a graph of an example of characteristics of chromatic dispersion of a phase difference film;

FIG. 27-3 is a graph of an example of characteristics of retardation for wavelengths at the liquid crystal device that includes a phase difference film;

FIG. 27-4 is a graph of an example of characteristics of the azimuth for wavelengths at the liquid crystal device that includes a phase difference film;

FIG. 27-5 depicts an example of a change of the retardation characteristics depending on the number of phase difference films;

FIG. 27-6 depicts an example of a change of the azimuth characteristics depending on the number of phase difference films;

FIG. 27-7 depicts an example of a change of the retardation characteristics depending on the number of phase difference films in a case of setting slow axes of the phase difference films and wave plates orthogonal to one another;

FIG. 27-8 depicts an example of a change of the azimuth characteristics depending on the number of phase difference films in a case of setting the slow axes of the phase difference films and wave plates orthogonal to one another;

FIG. 28-1 is a perspective view of an example of the optical device;

FIG. 28-2 is a perspective view of another example of the optical device;

BEST MODE(S) FOR CARRYING OUT THE INVENTION

Embodiments of an optical device, a projector, a manufacturing method, a manufacturing support apparatus according to the present invention will be described in detail with reference to the accompanying drawings.

Embodiment

Figure 1:
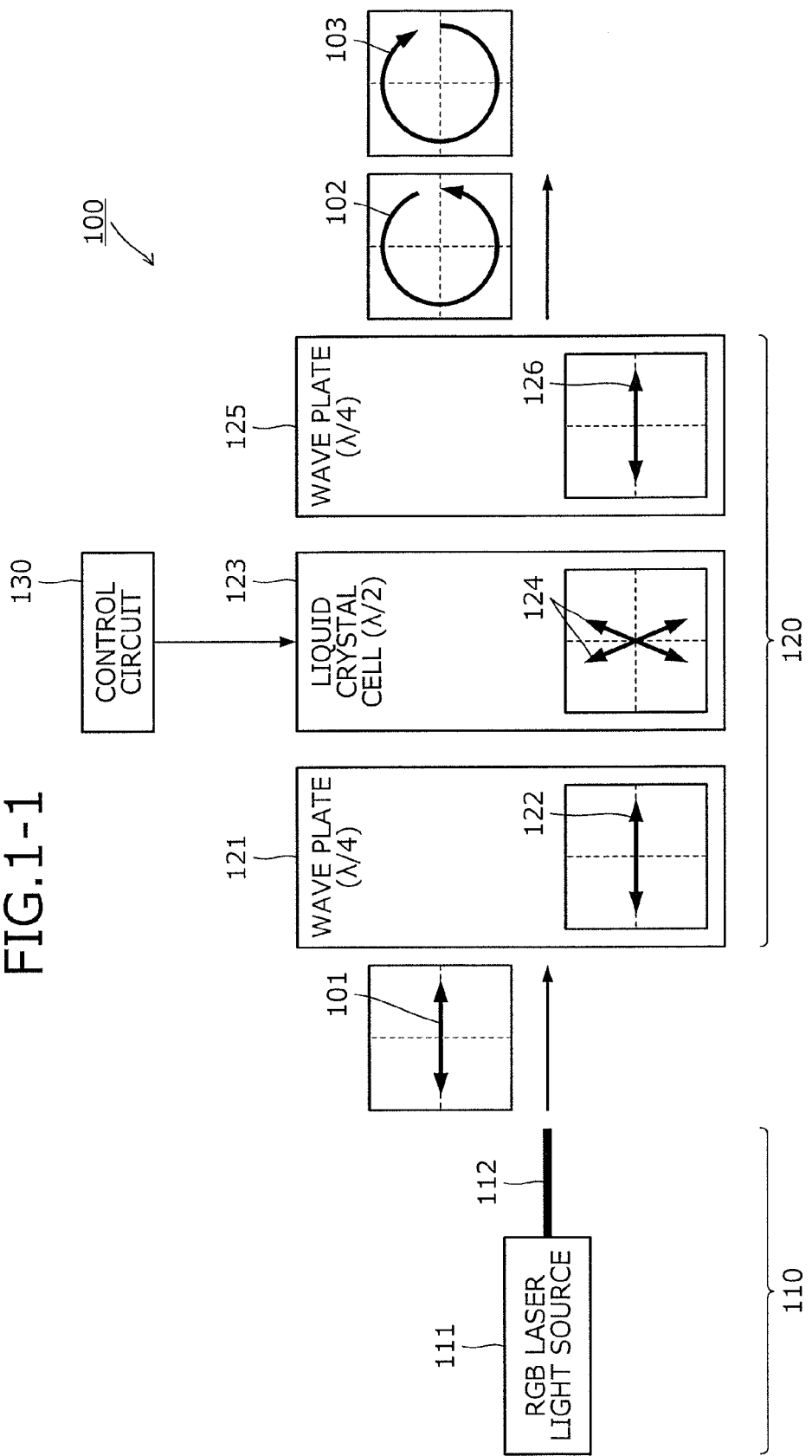
FIG. 1-1 depicts a configuration example of an optical device according to an embodiment.

FIG. 1-1 depicts a configuration example of an optical device according to an embodiment. As depicted in FIG. 1-1, an optical device 100 includes a light source unit 110, a liquid crystal device 120, and a control circuit 130. The light source unit 110 and the control circuit 130 may be disposed outside the optical device 100.

The light source unit 110 emits laser light of a given wavelength in a given polarization state. Laser light is, for example, linearly polarized laser light that includes multiple beams of primary color light in terms of space or time. The light source unit 110, for example, includes an RGB laser light source 111 and a polarization-maintaining fiber 112. The RGB laser light source 111 emits linearly polarized laser light that includes multiple beams of primary color (red, green, and blue) light. The light source unit 110 is, for example, a light source unit that operates by the field sequential method to cause light sources for respective colors to emit light in a time-sharing sequence.

The polarization-maintaining fiber 112 is a polarization maintaining fiber (PMF) that maintains the polarization state (linear polarization) of laser light emitted from the RGB laser light source 111 and that sends the laser light to the liquid crystal device 120. A polarization direction 101 represents the polarization direction (e.g., 0 degrees) of laser light emitted from the polarization-maintaining fiber 112 to the liquid crystal device 120.

The liquid crystal device 120 includes a wave plate 121 serving as a second wave plate, a liquid crystal cell 123, and a wave plate 125. The wave plates 121 and 125 are, for example, quarter wave plates identical in configuration with one another. For example, each of the wave plates 121 and 125 can be made out of a liquid crystal cell. The wave plate 121 transmits laser light emitted from the polarization-maintaining fiber 112. A slow axis orientation 122 represents the direction of the slow axis (phase delay axis) of the wave plate 121. The slow axis is the axis at which the refractive index of birefringence becomes the highest.

As indicated by the slow axis orientation 122, the slow axis of the wave plate 121 is set at an angle of about 0 degrees with respect to the given polarization direction 101 of laser light emitted from the polarization-maintaining fiber 112. The wave plate 121, therefore, emits laser light passing therethrough to the liquid crystal cell 123 without changing the polarization state of the laser light.

The liquid crystal cell 123 transmits laser light emitted from the wave plate 121. The liquid crystal cell 123 rotates the polarization direction of laser light passing therethrough, by a degree of rotation that can be shifted. A director direction 124 represents the direction of the director of a liquid crystal molecule. As indicated by the director direction 124, the angle of the director of the liquid crystal cell 123 with respect to the slow axis orientation 122 of the wave plate 121 can be shifted to about 67.5 degrees and to 112.5 degrees in a direction parallel with the substrate surface of the liquid crystal cell 123.

When the director direction 124 of the liquid crystal cell 123 is shifted to 67.5 degrees with respect to the slow axis orientation 122, the polarization state of laser light emitted from the liquid crystal cell 123 is rotated by 67.5×2=135 degrees. When the director direction 124 of the liquid crystal cell 123 is shifted to 112.5 degrees with respect to the slow axis orientation 122, the polarization state of laser light emitted from the liquid crystal cell 123 is rotated by 112.5×2=225 degrees The wave plate 125 transmits laser light emitted from the liquid crystal cell 123. A slow axis orientation 126 represents the direction of the slow axis (phase delay axis) of the wave plate 125. As indicated by the slow axis orientation 126, the slow axis of the wave plate 125 is set at an angle of about 0 degrees with respect to the polarization direction 101 of laser light emitted from the polarization-maintaining fiber 112. Laser light passing through the wave plate 125 is emitted to a device downstream of the optical device 100.

Polarization states 102 and 103 represent the polarization directions of the laser light emitted from the wave plate 125. When the director direction 124 of the liquid crystal cell 123 is shifted to 67.5 degrees with respect to the slow axis orientation 122, the laser light emitted from the wave plate 125 is in a state of counterclockwise circular polarization, as indicated by the polarization state 102. When the director direction 124 of the liquid crystal cell 123 is shifted to 112.5 degrees with respect to the slow axis orientation 122, laser light emitted from the wave plate 125 is in a state of clockwise circular polarization, as indicated by the polarization state 103.

The control circuit 130 cyclically shifts the angle of the director direction 124 of the liquid crystal cell 123 with respect to the slow axis orientation 122 of the wave plate 121, to 67.5 degrees and to 112.5 degrees. For example, the control circuit 130 shifts the director direction 124 of the liquid crystal cell 123 by controlling the voltage applied to electrodes of the liquid crystal cell 123.

As depicted in FIG. 1-1, the liquid crystal device 120 works as a quarter wave plate that changes the polarization state of laser light emitted from the polarization-maintaining fiber 112, to a circular polarization state. By shifting the director direction 124 of the liquid crystal cell 123, the polarization state of laser light emitted from the liquid crystal device 120 is changed alternately to the counterclockwise circular polarization state and to the clockwise circular polarization state.

The liquid crystal cell 123 is disposed between the wave plate 121 and the wave plate 125. In this configuration, the liquid crystal device 120 is caused to work as the quarter wave plate for laser light emitted from the liquid crystal device 120, without dependency on the polarization state of the laser light incident on the liquid crystal device 120.

Figures 1, 2, 3:
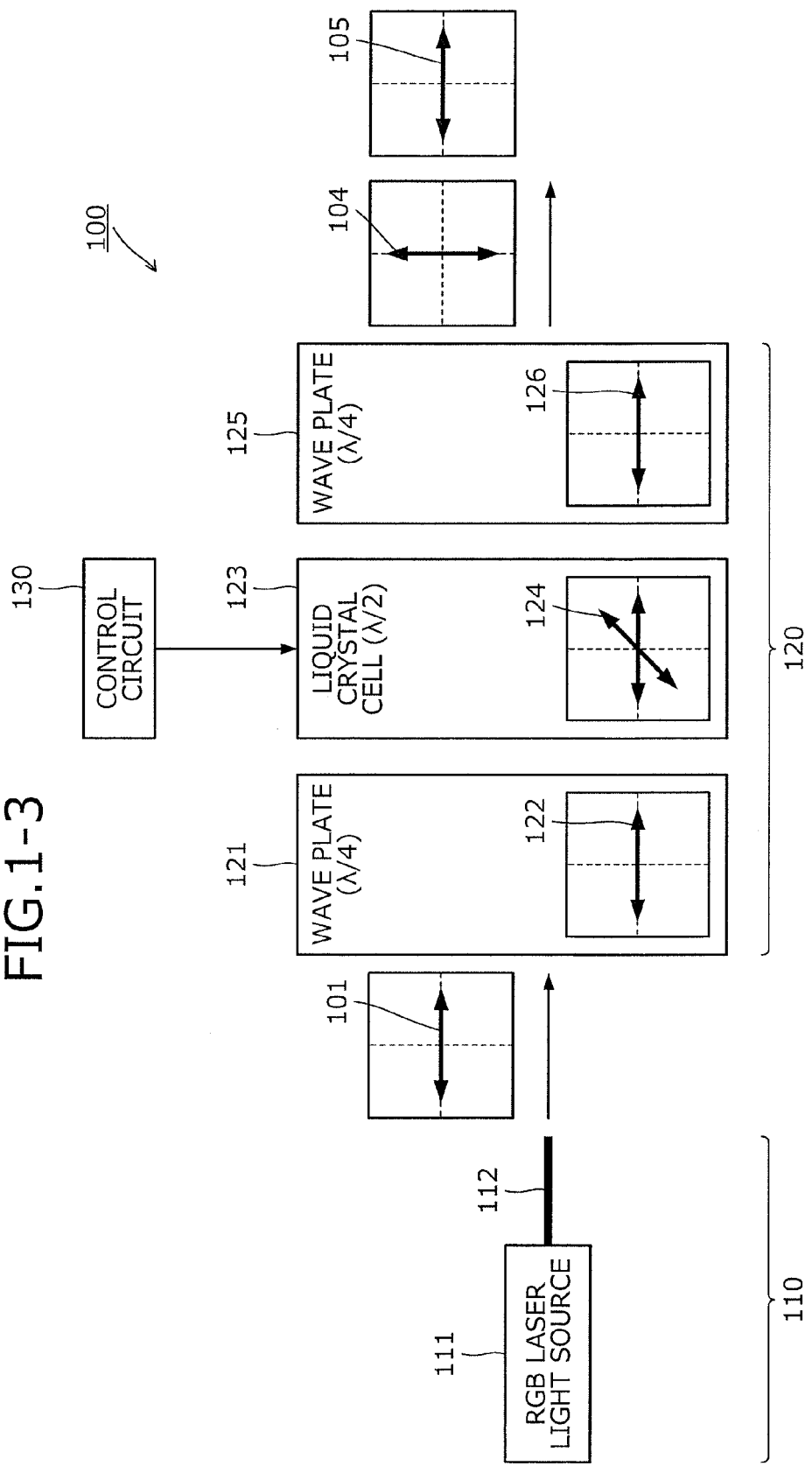
Figures 1, 2:
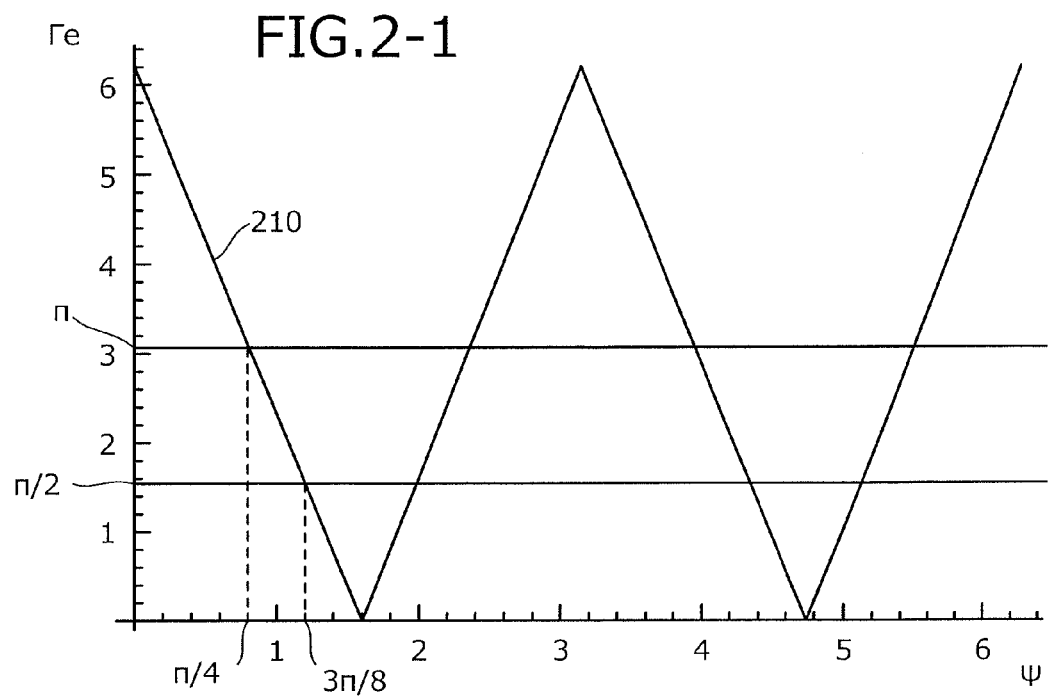
Figure 2:
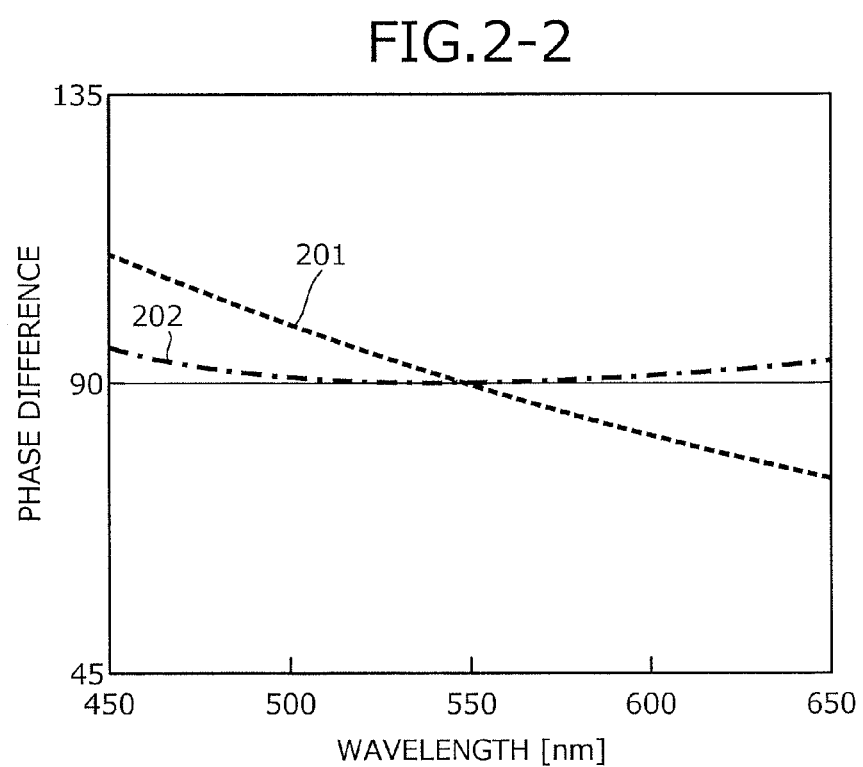
Figures 1, 3:
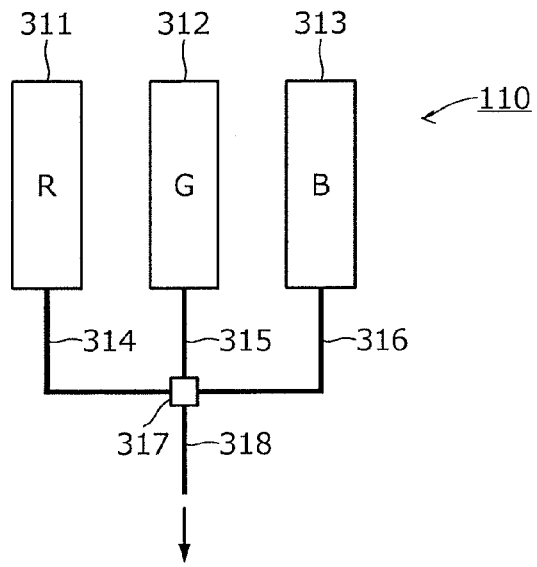
Figures 2, 3:
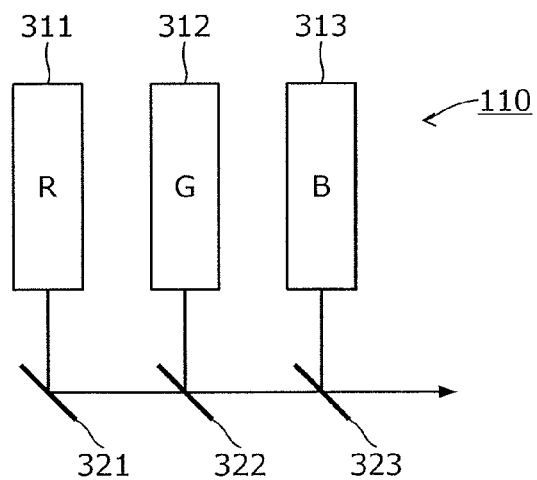
Figure 3:
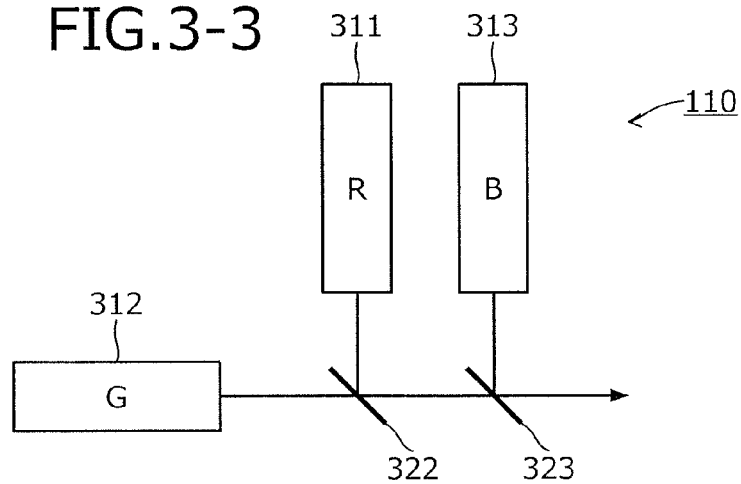

FIG. 1-2 depicts a first modification of the optical device. In FIG. 1-2, components identical to those depicted in FIG. 1-1 are denoted by the same reference numerals used in FIG. 1-1 and are omitted in further description. When the polarization state of the laser light incident on the liquid crystal device 120 can be limited to an angle of 0 degrees or 90 degrees with respect to the slow axis orientation 126, the wave plate 121 may be omitted from the liquid crystal device 120, as shown in FIG. 1-2. In this configuration, the same effect as that of the optical device 100 of FIG. 1-1 can be achieved and the number of components can be reduced.

FIG. 1-3 depicts a second modification of the optical device. In FIG. 1-3, components identical to those depicted in FIG. 1-1 are denoted by the same reference numerals used in FIG. 1-1 and are omitted in further description. As shown in FIG. 1-3, the director direction 124 of the liquid crystal cell 123 may also be shifted to 45 degrees and to 0 degrees with respect to the slow axis orientation 122.

In this case, the liquid crystal device 120 works as a half wave plate. For example, because the slow axis orientation 122 matches the polarization direction 101 of laser light, the wave plate 121 does not change the polarization state of incident laser light. When the director direction 124 of the liquid crystal cell 123 is set at 45 degrees with respect to the slow axis orientation 122, the director direction 124 is tilted by +45 degrees with respect to the polarization direction 101 of laser light. Thus, the polarization direction of laser light emitted from the wave plate 121 is rotated by 45×2=90 degrees. Because the slow axis orientation 126 is tilted by +90 degrees with respect to the polarization direction of laser light from the liquid crystal cell 123, the wave plate 125 does not change the polarization state of laser light emitted from the liquid crystal cell 123.

When the director direction 124 makes zero angle with respect to the polarization direction 101 of laser light, the liquid crystal cell 123 does not change the polarization direction of laser light emitted from the wave plate 121. Because the slow axis orientation 126 makes zero angle with respect to laser light from the liquid crystal cell 123, the wave plate 125 does not change the polarization state of laser light emitted from the liquid crystal cell 123.

A polarization state 104 represents the polarization direction of laser light that is emitted from the liquid crystal device 120 when the director direction 124 of the liquid crystal cell 123 is set at 45 degrees with respect to the slow axis orientation 122. A polarization state 105 represents the polarization direction of laser light that is emitted from of the liquid crystal device 120 when the director direction 124 of the liquid crystal cell 123 makes zero angle with respect to the slow axis orientation 122. As indicated by the polarization states 104 and 105, by shifting the angle of the director direction 124 with respect to the slow axis orientation 122 to 0 degrees and to 45 degrees, the polarization state of laser light emitted from the liquid crystal device 120 is shifted to zero-degree linear polarization and to 90-degree linear polarization with respect to the polarization direction 101.

FIG. 1-4 depicts a third modification of the optical device. In FIG. 1-4, components identical to those depicted in FIG. 1-3 are denoted by the same reference numerals used in FIG. 1-3 and are omitted in further description. As depicted in FIG. 1-4, a case where the polarization state of laser light incident on the liquid crystal device 120 is assumed to be 45-degree linear polarization with respect to the slow axis orientation 122 will be described.

In this case, because the slow axis orientation 122 is tilted by −45 degrees with respect to the polarization direction 101 of laser light, the wave plate 121 changes the polarization state of incident laser light to a clockwise circular polarization state. To change the phase by π, the liquid crystal cell 123 changes the polarization direction of laser light emitted from the wave plate 121, to counterclockwise circular polarization. Because the slow axis orientation 126 makes zero angle, the wave plate 125 changes the polarization state of laser light emitted from the liquid crystal cell 123, to zero-degree linear polarization with respect to the laser light incident on the liquid crystal device 120, and transmits the linearly polarized laser light.

FIG. 1-5 depicts a fourth modification of the optical device. In FIG. 1-5, components identical to those depicted in FIG. 1-3 are denoted by the same reference numerals used in FIG. 1-3 and are omitted in further description. As depicted in FIG. 1-5, a case where the polarization state of laser light incident on the liquid crystal device 120 is assumed to be 30-degree linear polarization with respect to the slow axis orientation 122 will be described.

In this case, because the slow axis orientation 122 is tilted by −30 degrees with respect to the polarization direction 101 of laser light, the wave plate 121 changes the polarization state of incident laser light to a clockwise elliptical polarization state (in which the major axis of the ellipse is parallel with the slow axis orientation 122). To change the phase by π, the liquid crystal cell 123 changes the polarization direction of laser light emitted from the wave plate 121, to a counterclockwise elliptical polarization state (in which the major axis of the ellipse is orthogonal to the slow axis orientation 122).

Because the slow axis orientation 126 is orthogonal to the direction of elliptical polarization of laser light, the wave plate 125 cancels a phase shift of π/4 in the x-axis direction and the same in the y-axis direction. As a result, the wave plate 125 changes the polarization state of laser light emitted from the liquid crystal cell 123, to 60-degree linear polarization with respect to the slow axis orientation 122, and transmits the linearly polarized laser light.

FIG. 1-6 depicts a fifth modification of the optical device. In FIG. 1-6, components identical to those depicted in FIG. 1-3 are denoted by the same reference numerals used in FIG. 1-3 and are omitted in further description. As depicted in FIG. 1-6, a case where the polarization state of laser light incident on the liquid crystal device 120 is assumed to be 60-degree linear polarization with respect to the slow axis orientation 122 will be described.

In this case, because the slow axis orientation 122 is tilted by −60 degrees with respect to the polarization direction 101 of laser light, the wave plate 121 changes the polarization state of incident laser light to a clockwise elliptical polarization state (in which the major axis of the ellipse is orthogonal with the slow axis orientation 122). To change the phase by π, the liquid crystal cell 123 changes the polarization direction of laser light emitted from the wave plate 121, to a counterclockwise elliptical polarization state (in which the major axis of the ellipse is parallel to the slow axis orientation 122).

Because the slow axis orientation 126 is orthogonal to the direction of elliptical polarization of laser light, the wave plate 125 cancels a phase shift of π/4 in the x-axis direction and the same in the y-axis direction. As a result, the wave plate 125 changes the polarization state of laser light emitted from the liquid crystal cell 123, to 30-degree linear polarization with respect to the slow axis orientation 122, and transmits the linearly polarized laser light.

(Chromatic Dispersion Characteristics of Liquid Crystal Device)

The chromatic dispersion characteristics of the liquid crystal device 120 will be described. An action by an ordinary wave plate on the polarization state of laser light can be expressed as, for example, equation (1) in the form of a Jones matrix. In equation (1), Γe denotes a retardation (phase difference) by the wave plate, Ψe denotes an azimuth, and (Vx, Vy) denotes incident polarization.

$$\begin{pmatrix} \cos\Psi e & -\sin\Psi e \\ \sin\Psi e & \cos\Psi e \end{pmatrix} \begin{pmatrix} e^{-i\Gamma e} & 0 \\ 0 & e^{i\Gamma e/2} \end{pmatrix} \begin{pmatrix} \cos\Psi e & \sin\Psi e \\ -\sin\Psi e & \cos\Psi e \end{pmatrix} \begin{pmatrix} Vx \\ Vy \end{pmatrix} = \qquad (1)$$

$$\begin{pmatrix} e^{-i\Gamma e/2}\cos^2\Psi e + e^{i\Gamma e/2}\sin^2\Psi e & -i\sin(\Gamma e/2)\sin(2\Psi e) \\ -i\sin(\Gamma e/2)\sin(2\Psi e) & e^{-i\Gamma e/2}\sin^2\Psi e + e^{i\Gamma e/2}\cos^2\Psi e \end{pmatrix} \begin{pmatrix} Vx \\ Vy \end{pmatrix}$$

In the liquid crystal device 120, the retardation (phase difference) by the wave plates 121 and 125 is set to γ1 (=π/2) and the retardation by the liquid crystal cell 123 is set to γ2 (=π). At this time, the azimuth Ψ of the liquid crystal cell 123 is the angle of the direction of the director (direction of the slow axis) of the liquid crystal cell 123 with respect to the direction of the slow axes of the wave plates 121 and 125.

A Jones matrix for the liquid crystal device 120 composed of the wave plates 121 and 125 and the liquid crystal cell 123 is expressed as, for example, equation (2), in which "x" denotes the product of matrices.

$$\begin{pmatrix} e^{-i\gamma 1/2} & 0 \\ 0 & e^{i\gamma 1/2} \end{pmatrix} \quad (2)$$

$$\begin{pmatrix} e^{-i\gamma 2/2}\cos^2\Psi + e^{i\gamma 2/2}\sin^2\Psi & i\sin(\gamma 2/2)\sin(2\Psi) \\ -i\sin(\gamma 2/2)\sin(2\Psi) & e^{-i\gamma 2/2}\sin^2\Psi + e^{i\gamma 2/2}\cos^2\Psi \end{pmatrix} \times$$

$$\begin{pmatrix} e^{-i\gamma 1/2} & 0 \\ 0 & e^{i\gamma 1/2} \end{pmatrix}$$

If an action by the liquid crystal device 120 is regarded as an action by a single ordinary wave plate, the equality between the Jones matrix of equation (1) and the Jones matrix of equation (2) is defined in an equation. From this equation, the retardation Γe by the liquid crystal device 120 can be expressed by, for example, equation (3). The azimuth Ψe of the liquid crystal device 120 with respect to the incident polarization of laser light can be expressed by, for example, equation (4).

$$\cos(\Gamma e/2) = \cos^2\Psi\cos(\gamma 1 + \gamma 2/2) + \sin^2\Psi\cos(\gamma 1 - \gamma 2/2) \quad (3)$$

$$\sin(2\Psi e) = \frac{\sin(\gamma 2/2)\sin(2\Psi)}{\sin(\Gamma e/2)} \quad (4)$$

The retardations γ1 and γ2 have chromatic dispersion characteristics. When 2×γ1=γ2 is satisfied, if equation (5) holds, the retardation Γe of laser light having passed through the liquid crystal device 120 is not affected by the retardations γ1 and γ2.

$$\frac{\partial}{\partial \gamma}\Gamma e = 0 \rightarrow \gamma 1 = \frac{(2n-1)\pi}{2} \quad (5)$$

Because the wave plates 121 and 125 are the quarter wave plates, the retardation γ1=π/2 is satisfied. When the liquid crystal cell 123 works as the half wave plate, the retardation γ2 by the liquid crystal cell 123 is π. In this case, equations (3) and (4) are transformed into equations (6) and (7).

$$\cos(\Gamma e/2) = \sin^2\Psi - \cos^2\Psi = -\cos(2\Psi) \quad (6)$$

$$\sin(2\Psi e) = 1 \quad (7)$$

As indicated by equation (7), the azimuth Ψe of the liquid crystal device 120 serving as a wave plate is determined to be π/4, regardless of the azimuth Ψ between the slow axes of the wave plates 121 and 125 and the slow axis of the liquid crystal cell 123.

FIG. 2-1 depicts an example of the characteristics of the retardation by the liquid crystal device. In FIG. 2-1, the horizontal axis represents the azimuth Ψ between the slow axes of the wave plates 121 and 125 and the slow axis of the liquid crystal cell 123 and the vertical axis represents the retardation Γe by the liquid crystal device 120. Retardation characteristics 210 represent the characteristics of the retardation Γe to the azimuth Ψ. As indicated by equation (6) and the retardation characteristics 210, the retardation Γe by the liquid crystal device 120 changes from 0 to 2π corresponding to the azimuth Ψ between the slow axes of the wave plates 121 and 125 and the slow axis of the liquid crystal cell 123.

When the azimuth Ψ is π/4, the retardation Γe is π. Hence, the liquid crystal device 120 works as the half wave plate whose slow axis is adjusted to 45 degrees with respect to incident polarization. When the azimuth Ψ is 3π/8, the retardation Γe is π/2. Hence, the liquid crystal device 120 works as the quarter wave plate whose slow axis is adjusted to 45 degrees with respect to incident polarization.

FIG. 2-2 depicts an example of the chromatic dispersion characteristics of the liquid crystal device of FIG. 1-1. In FIG. 2-2, the horizontal axis represents the wavelength [nm] of the light and the vertical axis represents the phase difference (retardation) by the liquid crystal device 120 due to birefringence. The chromatic dispersion characteristics 201 are indicated as reference data representing the characteristics of phase differences for wavelengths shown by laser light having passed through an ordinary quarter wave plate. The phase difference Γ of laser light having passed through an ordinary quarter wave plate can be expressed by, for example, equation (8).

$$\Gamma = (2\pi/\lambda) \times (ne - no) \times d \quad (8)$$

In equation (8), λ denotes the wavelength of the light; ne denotes the refractive index along the direction of a fast axis (phase advance axis) of the quarter wave plate, where the fast axis is the axis at which a refractive index in birefringence is the lowest; no denotes the refractive index along the direction of the slow axis of the quarter wave plate; and d denotes the thickness of the quarter wave plate. Hence, the chromatic dispersion characteristics 201 represent characteristics that vary the phase difference Γ according to the wavelength λ.

Chromatic dispersion characteristics 202 represent the characteristics of phase differences for wavelengths of laser light having passed through the liquid crystal device 120 when Ψ=3π/8 is satisfied. Ψ denotes the angle of the director direction 124 of the liquid crystal cell 123 with respect to the slow axes of the wave plates 121 and 125.

As shown by the chromatic dispersion characteristics 202, the liquid crystal device 120 works as a quarter wave plate with low wavelength dependency (i.e., quarter wave plate applicable to wide wavelength bands). According to the optical device 100, therefore, the polarization state of laser light can be controlled as chromatic dispersion is suppressed. Because chromatic dispersion is suppressed, a drop in the extinction ratio is suppressed, which improves the quality of an image created on a screen by projecting the laser light thereon.

By changing the polarization state of laser light to a clockwise circular polarization state and to a counterclockwise circular polarization state, speckles of an image created on the screen by projecting laser light thereon are reduced to improve the image quality. By changing the polarization state of light for creating video, for example, to a clockwise circular polarization state and to a counterclockwise circular polarization state, a three-dimensional image can be created using a circular polarization filter.

The polarization state of laser light that includes multiple beams of primary color light can be controlled by the liquid crystal device 120. As a result, the number of components is reduced, compared to, for example, a case of providing a polarization controller for each primary color light, thereby enabling a reduction in the size of the device.

The liquid crystal cell 123 may be made of, for example, a nematic liquid crystal, or made of a ferroelectric liquid crystal (FLC). The liquid crystal cell 123 may be provided as a liquid crystal cell having multiple electrodes that maintain director directions that are different from one another (see, e.g., FIGS. 8-1 to 8-4).

Each of the above liquid crystal cells shifts the direction of the director of a liquid crystal molecule by rotating the direction parallel to the substrate surface, and can control the movement of the liquid crystal molecule by only the field response rate of the liquid crystal, using a horizontal electric field. Each liquid crystal cell, therefore, can shift the polarization state of laser light at high speed. Shifting the polarization state of laser light at high speed improves the effect of speckle reduction and enables generation of a three-dimensional image with a high frame rate.

(Configuration Example of Light Source Unit)

A configuration of the light source unit will be described in detail. The light source unit combines multiple beams of laser light differing in wavelength from one another, into a single beam of laser light. FIG. 3-1 depicts a configuration example of the light source unit. The light source unit 110 of FIG. 1-1 has, for example, a red light source 311, a green light source 312, a blue light source 313, polarization-maintaining fibers 314 to 316, a combiner 317, and a polarization-maintaining fiber 318, as depicted in FIG. 3-1. The polarization-maintaining fiber 318 corresponds to the polarization-maintaining fiber 112 of FIG. 1-1.

The red light source 311 (R) oscillates to emit red laser light to the polarization-maintaining fibers 314. The green light source 312 (G) oscillates to emit green laser light to the polarization-maintaining fibers 315. The blue light source 313 (B) oscillates to emit blue laser light to the polarization-maintaining fibers 316. It is assumed that the polarization states of beams of laser light emitted respectively from the red light source 311, the green light source 312, and the blue light source 313 are a state of linear polarization in a given direction. The red light source 311, the green light source 312, and the blue light source 313 may be provided respectively as, for example, a laser device that directly emits each color of laser light or as a second harmonic generation (SHG) laser device.

The polarization-maintaining fiber 314 maintains the polarization state of laser light emitted from the red light source 311 and emits the laser light to the combiner 317. The polarization-maintaining fiber 315 maintains the polarization state of laser light emitted from the green light source 312 and emits the laser light to the combiner 317. The polarization-maintaining fiber 316 maintains the polarization state of laser light emitted from the blue light source 313 and emits the laser light to the combiner 317.

The combiner 317 is a light-combining unit that combines beams of laser light emitted from the polarization-maintaining fibers 314 to 316. The combiner 317 emits combined laser light to the polarization-maintaining fiber 318, which maintains the polarization state of laser light emitted from the combiner 317 and emits the laser light. Hence, laser light emitted from the polarization-maintaining fiber 318 is laser light that includes beams of red, green, and blue color light. The polarization state of laser light emitted from the polarization-maintaining fiber 318 is a state of linear polarization in a given direction.

FIG. 3-2 depicts a first modification of the light source unit. In FIG. 3-2, components identical to those depicted in FIG. 3-1 are denoted by the same reference numerals used in FIG. 3-1 and are omitted in further description. As depicted in FIG. 3-2, the light source unit 110 may have the red light source 311, the green light source 312, the blue light source 313, a mirror 321, and dichroic mirrors 322 and 323.

The red light source 311 oscillates to emit red laser light to the mirror 321. The green light source 312 oscillates to emit green laser light to the dichroic mirror 322. The blue light source 313 oscillates to emit blue laser light to the dichroic mirror 323. The mirror 321 reflects laser light emitted from the red light source 311 and sends the laser light to the dichroic mirror 322.

The dichroic mirrors 322 and 323 are light-combining units that combine beams of laser light emitted from the red light source 311, the green light source 312, and the blue light source 313. The dichroic mirror 322 reflects and outputs to the dichroic mirror 323, laser light (light having a wavelength for green) emitted from the green light source 312. The dichroic mirror 322 transmits and outputs to the dichroic mirror 323, laser light (light having a wavelength for red) emitted from the mirror 321.

The dichroic mirror 323 reflects and outputs to a device downstream of the light source unit 110, laser light (light having a wavelength for blue) emitted from the blue light source 313. The dichroic mirror 323 transmits and outputs to the device downstream of the light source unit 110, laser light (beams of light having wavelengths for red and green) emitted from the dichroic mirror 322. Each of the dichroic mirrors 322 and 323 can be implemented by using, for example, a dielectric multilayer film.

Laser light emitted from the dichroic mirror 323 is laser light that includes beams of red, green, and blue color light. The polarization state of laser light emitted from the dichroic mirror 323 is a state of linear polarization in a given direction.

FIG. 3-3 depicts a second modification of the light source unit. In FIG. 3-3, components identical to those depicted in FIG. 3-2 are denoted by the same reference numerals used in FIG. 3-2 and are omitted in further description. As depicted in FIG. 3-3, the light source unit 110 may have the red light source 311, the green light source 312, the blue light source 313, and the dichroic mirrors 322 and 323. The red light source 311 oscillates to emit red laser light to the dichroic mirror 322. The green light source 312 oscillates to emit green laser light to the dichroic mirror 322. The blue light source 313 oscillates to emit blue laser light to the dichroic mirror 323.

The dichroic mirror 322 reflects and outputs to the dichroic mirror 323, laser light (light having a wavelength for red) emitted from the red light source 311. The dichroic mirror 322 transmits and outputs to the dichroic mirror 323, laser light (light having a wavelength for green) emitted from the green light source 312.

The dichroic mirror 323 reflects and outputs to a device downstream of the light source unit 110, laser light (light having a wavelength for blue) emitted from the blue light source 313. The dichroic mirror 323 transmits and outputs to the device downstream of the light source unit 110, laser light (beams of light having wavelengths for red and green) emitted from the dichroic mirror 322.

Laser light emitted from the dichroic mirror 323 is laser light that includes beams of red, green, and blue color light. The polarization state of laser light emitted from the dichroic mirror 323 is a state of linear polarization in a given direction.

(Configuration Example of Video Engine to which Optical Device is Applied)

Figures 1, 4:
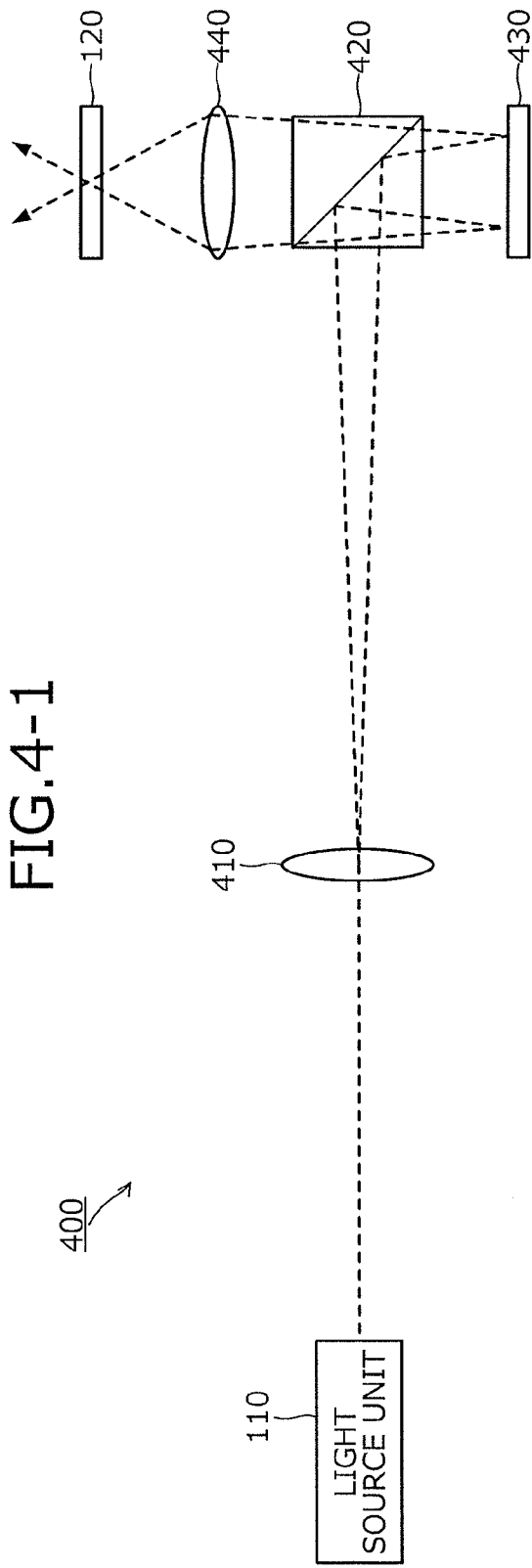

FIG. 4-1 depicts a first configuration example of a video engine to which the optical device is applied. In FIG. 4-1, components identical to those depicted in FIG. 1-1 are denoted by the same reference numerals used in FIG. 1-1 and are omitted in further description. A video engine 400 of FIG. 4-1 is a video engine to which the optical device 100 of FIG. 1-1 is applied and in which a liquid crystal on silicon (LCOS) is used. The video engine 400 includes the light source unit 110, a lens 410, a polarizing beam splitter 420, an LCOS 430, a lens 440, and the liquid crystal device 120.

The lens 410 emits incoming laser light from the light source unit 110 to the polarizing beam splitter 420. The polarizing beam splitter 420 reflects incoming laser light from the lens 410 and sends the reflected light to the LCOS 430. The polarizing beam splitter 420 emits incoming laser light from the LCOS 430 to the lens 440 according to the polarization state of the laser light.

The LCOS 430 is a modulator that modulates laser light spatially to generate video. The LCOS 430 reflects incoming laser light from the polarizing beam splitter 420 back to the polarizing beam splitter 420. According to the voltage applied to each pixel on a surface that reflects laser light, the LCOS 430 controls the polarization state of the reflected light at each pixel. As a result, the intensity of laser light passing through the polarizing beam splitter 420 and falling onto the lens 440 can be controlled for each pixel.

The lens 440 condenses incoming laser light from the polarizing beam splitter 420 and emits the condensed laser light to the liquid crystal device 120. The lens 440 may be configured by combining multiple lenses together. The liquid crystal device 120 controls the polarization state of incoming laser light from the lens 440 and emits the laser light to a device downstream. Laser light emitted from the liquid crystal device 120 is projected onto, for example, a screen.

FIG. 4-2 depicts a modification of the first configuration example of the video engine. In FIG. 4-2, components identical to those depicted in FIG. 4-1 are denoted by the same reference numerals used in FIG. 4-1 and are omitted in further description. When an FLC is used as the liquid crystal cell 123, light having passed through the polarizing beam splitter 420 does not have to be condensed. As depicted in FIG. 4-2, therefore, reflected light from the LCOS 430 may be projected without being condensed.

Figures 1, 20:
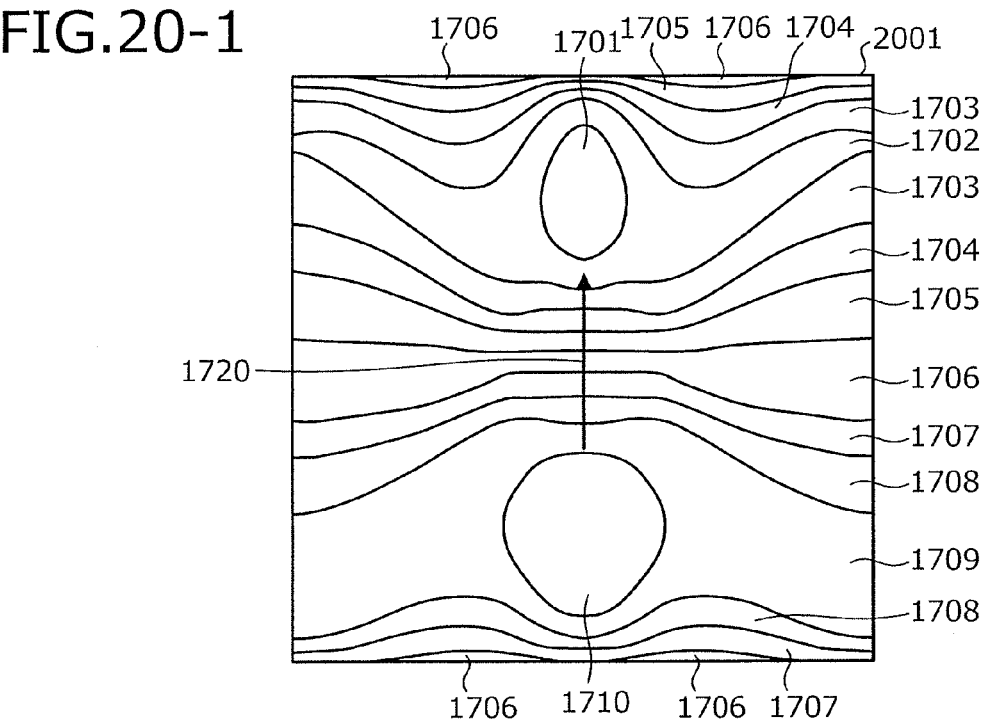
Figures 2, 20:
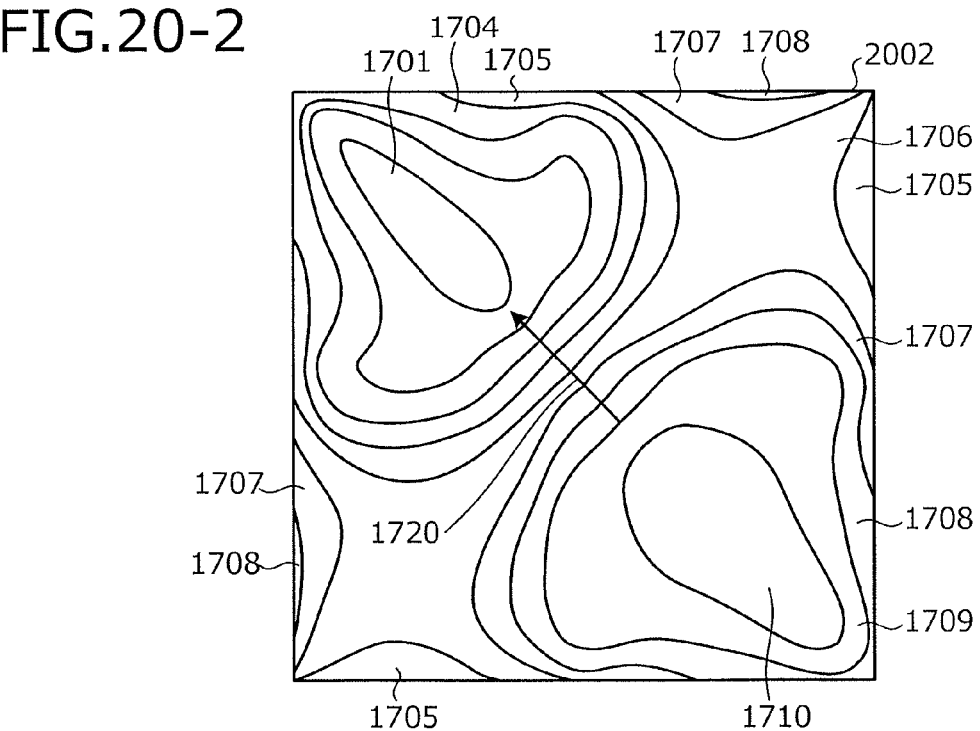
Figures 3, 20:
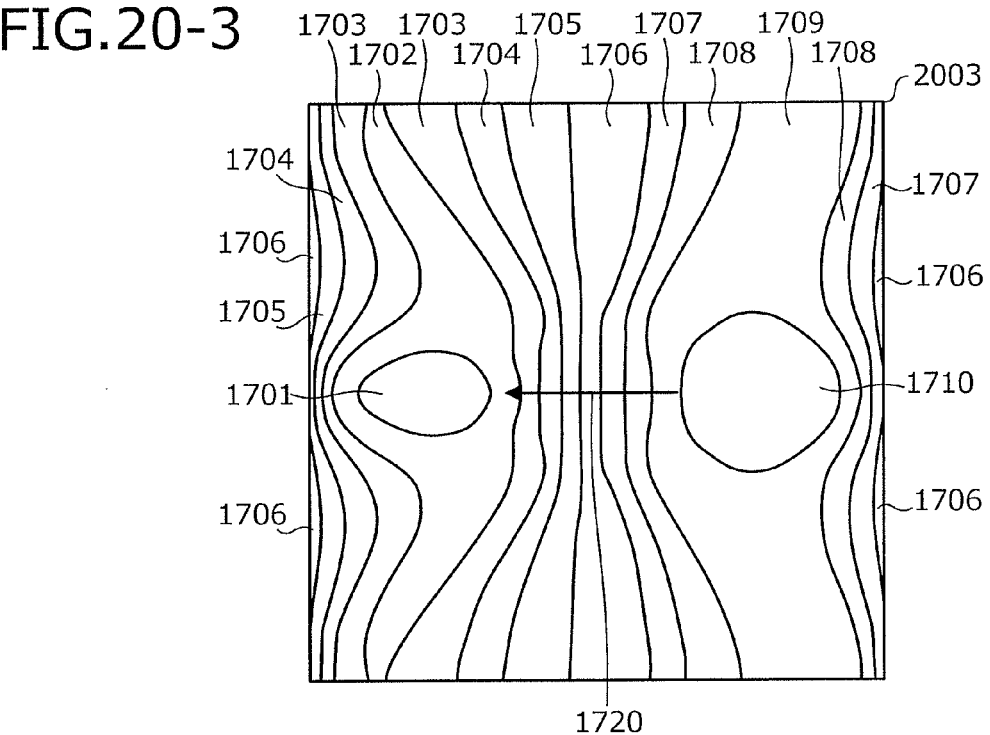
Figures 4, 20:
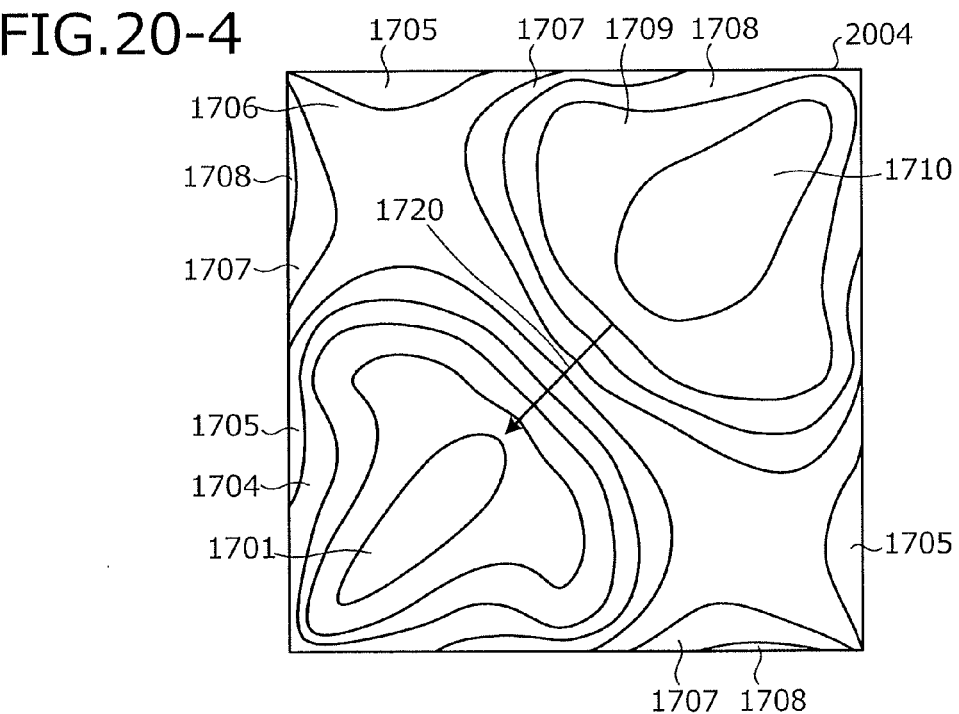
Figures 5, 20:
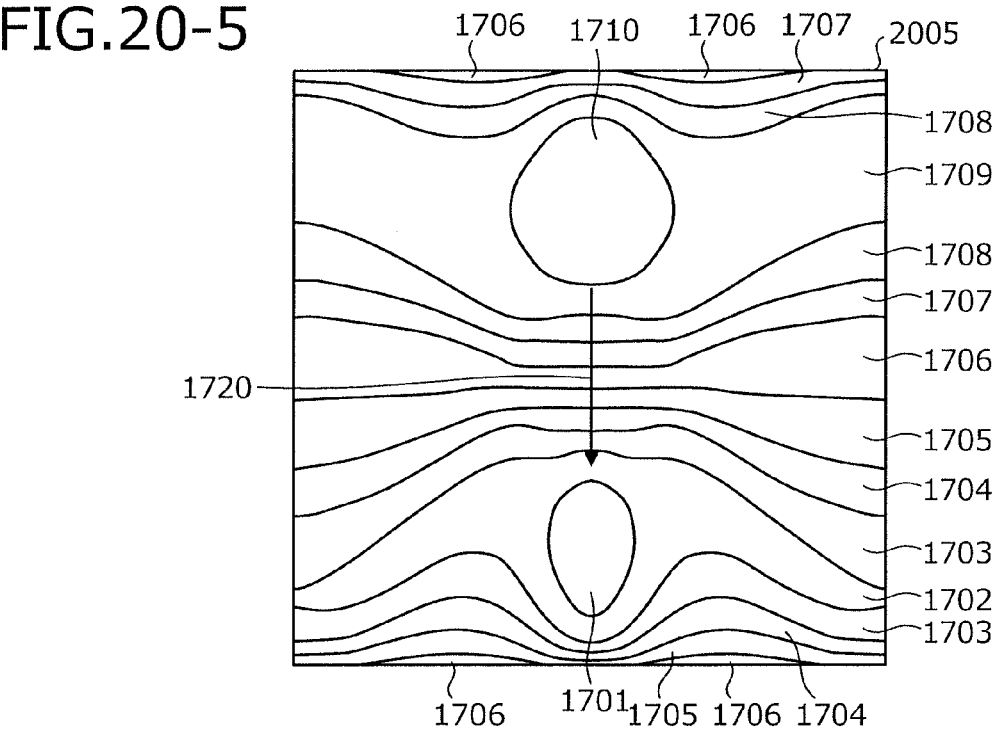

FIG. 5-1 depicts a second configuration example of a video engine to which the optical device is applied. In FIG. 5-1, components identical to those depicted in FIG. 1-1 are denoted by the same reference numerals used in FIG. 1-1 and are omitted in further description. A video engine 500 of FIG. 5-1 is a video engine to which the optical device 100 of FIG. 1-1 is applied and in which a micro electro mechanical system (MEMS) is used. The video engine 500 includes the light source unit 110, a lens 510, the liquid crystal device 120, and an MEMS mirror 520.

The lens 510 emits incoming laser light from the light source unit 110 to the liquid crystal device 120. The liquid crystal device 120 controls the polarization state of incoming laser light from the lens 510 and sends the laser light to the MEMS mirror 520. The lens 510 may be configured by combining multiple lenses together. The MEMS mirror 520 is a modulator that modulates laser light spatially to generate video. The MEMS mirror 520 has a mirror 521 and rotating shafts 522 and 523. The mirror 521 reflects incoming laser light from the liquid crystal device 120.

The mirror 521 rotates about each of the rotating shafts 522 and 523 under external control. The rotating shafts 522 and 523 are the rotating shafts set at different angles to each other (e.g., at right angles to each other). The mirror 521, therefore, reflects laser light at various angles. Hence, laser light reflected by the mirror 521 scan the screen surface.

FIG. 5-2 depicts a third configuration example of a video engine to which the optical device is applied. In FIG. 5-2, components identical to those depicted in FIG. 1-1 or FIG. 5-1 are denoted by the same reference numerals used in FIG. 5-1 and are omitted in further description. A video engine 500 of FIG. 5-2 is a modification of the video engine 500 of FIG. 5-1.

The video engine 500 includes the light source unit 110, a polarization-maintaining fiber 530, a collimator lens 541, the liquid crystal device 120, a collimator lens 543, a polarization-maintaining fiber 550, a collimator lens 560, and the MEMS mirror 520. The polarization-maintaining fiber 530 maintains the polarization state of laser light emitted from the light source unit 110 and sends the laser light to the collimator lens 541.

The collimator lens 541 collimates incoming laser light from the polarization-maintaining fiber 530 and emits the collimated laser light to the liquid crystal device 120. The collimator lens 541 is fixed to the liquid crystal device 120 by resin 542. The liquid crystal device 120 controls the polarization state of laser light emitted from the collimator lens 541 and sends the laser light to the collimator lens 543. The collimator lens 543 optically couples laser light emitted from the liquid crystal device 120, to the polarization-maintaining fiber 550. The collimator lens 543 is fixed to the liquid crystal device 120 by resin 544.

The polarization-maintaining fiber 550 maintains the polarization state of laser light optically coupled to the polarization-maintaining fiber 550 by the collimator lens 543 and sends the laser light to the collimator lens 560. The collimator lens 560 emits incoming laser light from the polarization-maintaining fiber 550 to the MEMS mirror 520. The MEMS mirror 520 reflects incoming laser light from the collimator lens 560 at various angles.

Figures 6, 20:
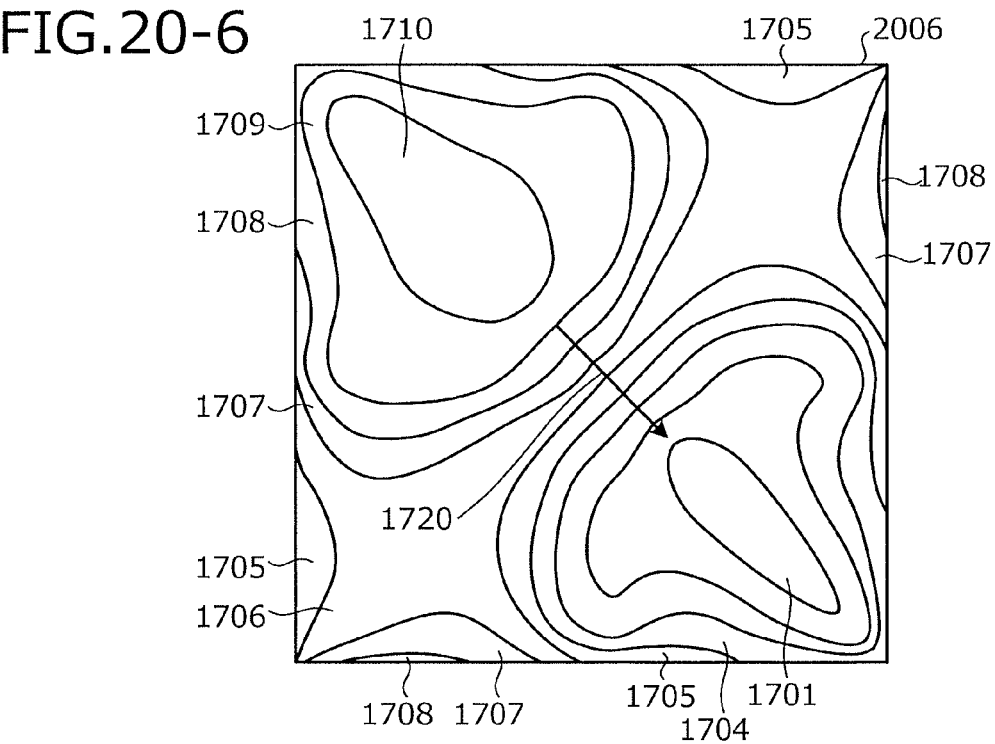

FIG. 6-1 depicts a fourth configuration example of a video engine to which the optical device is applied. In FIG. 6-1, components identical to those depicted in FIG. 1-1 are denoted by the same reference numerals used in FIG. 1-1 and are omitted in further description. A video engine 600 of FIG. 6-1 is a video engine to which the optical device 100 of FIG. 1-1 is applied and in which a digital light processing (DLP: registered trademark) is used. The video engine 600 includes the light source unit 110, the liquid crystal device 120, a lens 610, and a DLP 620.

The liquid crystal device 120 controls the polarization state of incoming laser light from the light source unit 110 and sends the laser light to the lens 610. The lens 610 emits incoming laser light from the liquid crystal device 120 to the DLP 620. The lens 610 may be configured by combining multiple lenses together. The DLP 620 is a modulator that modulates laser light spatially to generate video. The DLP 620 reflects incoming laser light from the lens 610 toward a screen. The DLP 620 controls the reflection angle of light for each pixel on a surface that reflects laser light. Through this control, for each pixel of the DLP 620, light is reflected to the screen or in a direction different from the direction of the screen. As a result, the intensity of laser light projected onto the screen can be controlled for each pixel.

FIG. 6-2 depicts a fifth configuration example of a video engine to which the optical device is applied. In FIG. 6-2, components identical to those depicted in FIG. 1-1, 5-2, or 6-1 are denoted by the same reference numerals used in FIGS. 1-1, 5-2, and 6-1, and are omitted in further description. A video engine 600 of FIG. 6-2 is a modification of the video engine 600 of FIG. 6-1.

The video engine 600 includes the light source unit 110, the polarization-maintaining fiber 530, the collimator lens 541, the liquid crystal device 120, the collimator lens 543, the polarization-maintaining fiber 550, the collimator lens 560, and the DLP 620. The collimator lens 560 emits laser light to the DLP 620. The DLP unit reflects incoming laser light from the collimator lens 560 at various angles at respective pixels.

As described above, the liquid crystal device 120 merely has to adjust a single beam of laser light created by combining beams of laser light at the light source unit. As a result, the video engine can be reduced in overall size and can be adjusted easily.

(Configuration Example of Projector to which Optical Device is Applied)

Figures 7, 20:
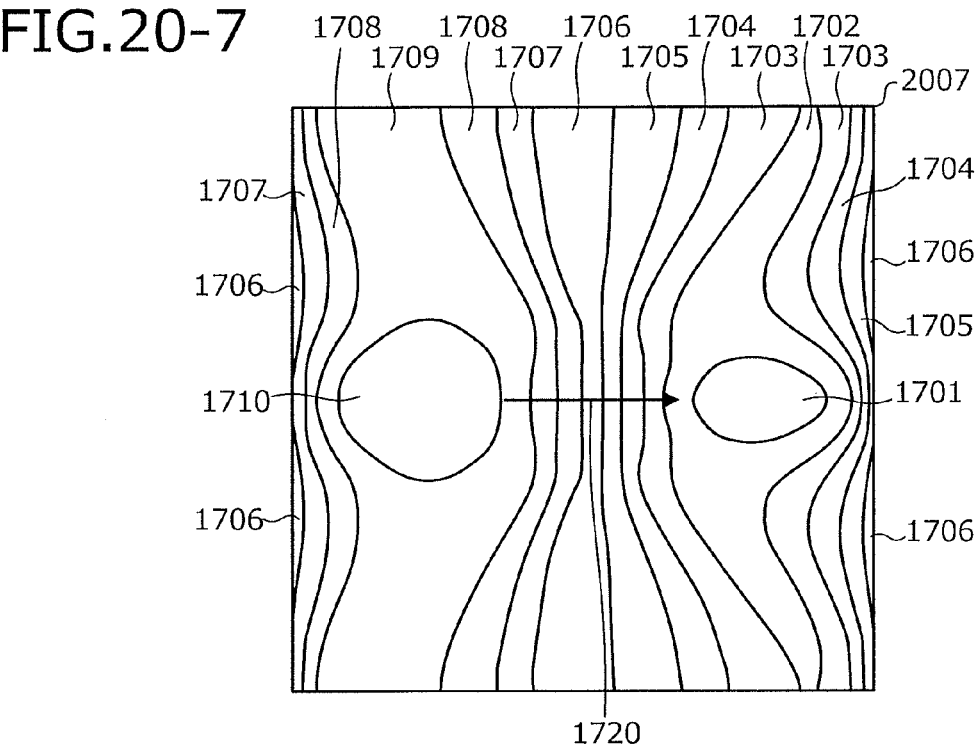
Figures 8, 20:
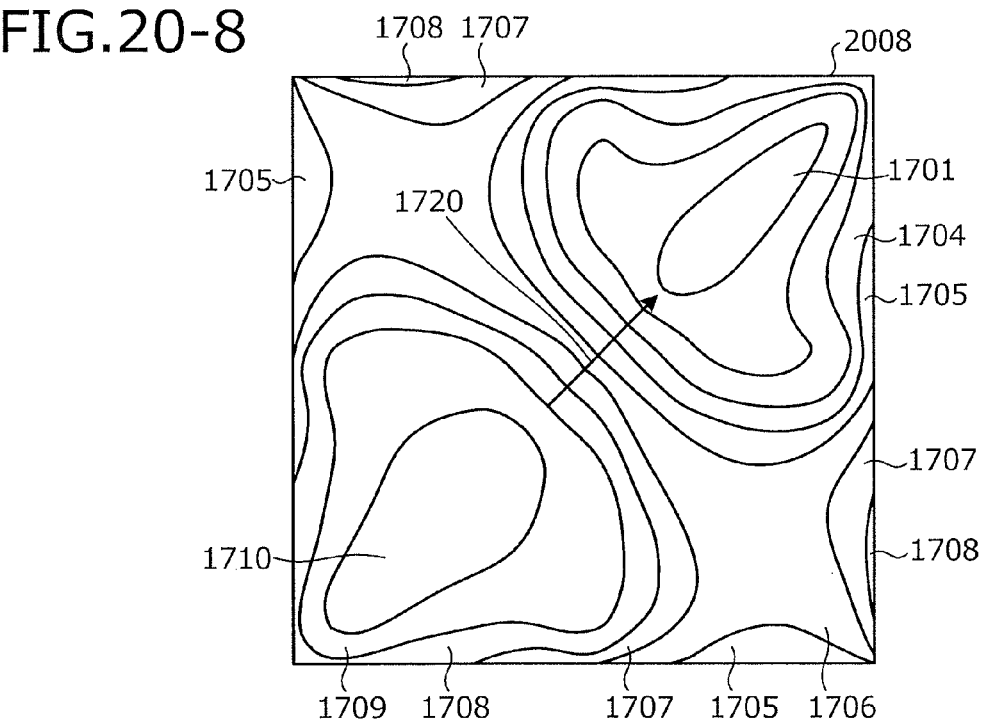

FIG. 7 depicts a configuration example of a projector to which the optical device is applied. In FIG. 7, components identical to those depicted in FIGS. 1-1, 3-1 to 3-3, 4-1, etc., are denoted by the same reference numerals used in FIGS. 1-1, 3-1 to 3-3, 4-1, etc., and are omitted in further description. A projector 700 of FIG. 7 includes a video engine 710, a control board 720, and a power supply 730.

The video engine 710 may be provided as, for example, the video engine 400 of FIG. 4-1, the video engine 500 of FIGS. 5-1 and 5-2, or the video engine 600 of FIGS. 6-1 and 6-2. A case of using the video engine 400 of FIG. 4-1 as the video engine 710 will be described. In this case, the video engine 710 includes the red light source 311, the green light source 312, the blue light source 313, the liquid crystal device 120, and the LCOS 430.

The control board 720 has a light source controller 721, a liquid crystal element controller 722, an LCOS controller 723, and a control unit 724. Under the control of the control unit 724, the light source controller 721 controls a drive current supplied to the red light source 311, the green light source 312, and the blue light source 313 and thereby, controls beams of light emitted from the red light source 311, the green light source 312, and the blue light source 313, respectively.

The liquid crystal element controller 722 corresponds to the control circuit 130 of FIG. 1-1. Under the control of the control unit 724, the liquid crystal element controller 722 controls the voltage applied to electrodes of the liquid crystal cell 123 and thereby, controls the polarization state of laser light emitted out of the projector 700. For example, the liquid crystal element controller 722 cyclically shifts the angle of the director direction 124 of the liquid crystal cell 123 with respect to the slow axis orientation 122 of the wave plate 121, to 67.5 degrees and to 112.5 degrees.

The control unit 724 has a video signal processing unit 725. The video signal processing unit 725 performs video processing based on a video signal input to the projector 700. Based on the video processing by the video signal processing unit 725, the control unit 724 controls the light source controller 721, the liquid crystal element controller 722, and the LCOS controller 723.

Under the control of the control unit 724, the LCOS controller 723 modulates laser light by controlling the voltage applied to electrodes of the LCOS 430 and thereby, controls images and video created by laser light emitted from the projector 700. Hence, laser light from the projector 700 is projected onto a screen to display video images. The power supply 730 is the power supply to the control board 720. The power supply 730 may be a battery.

(Example of Electrode Structure of Liquid Crystal Cell)

Figures 1, 8:
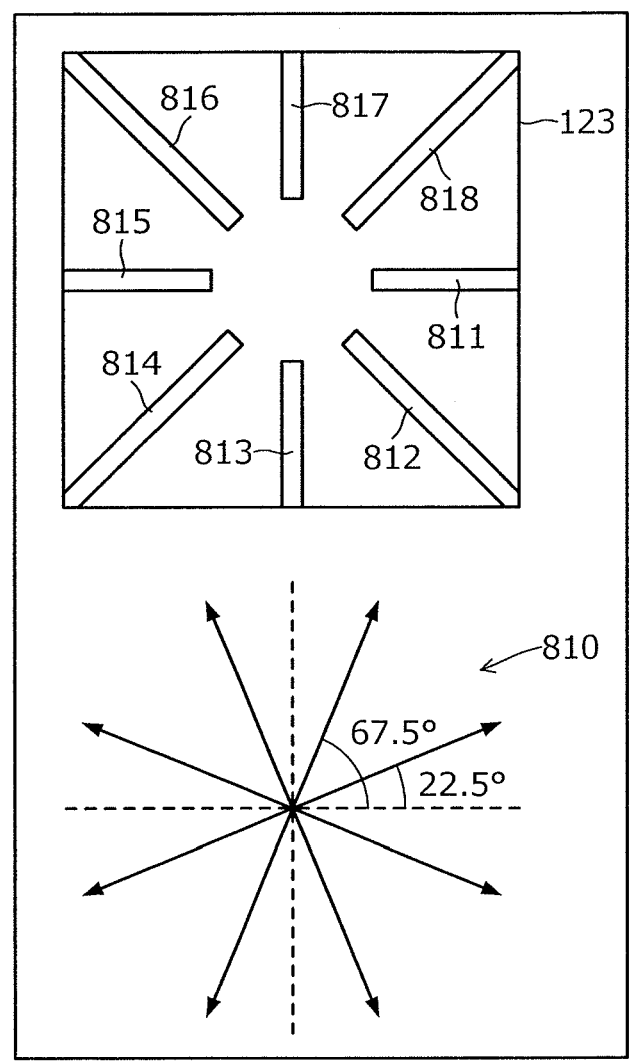
Figures 2, 8:
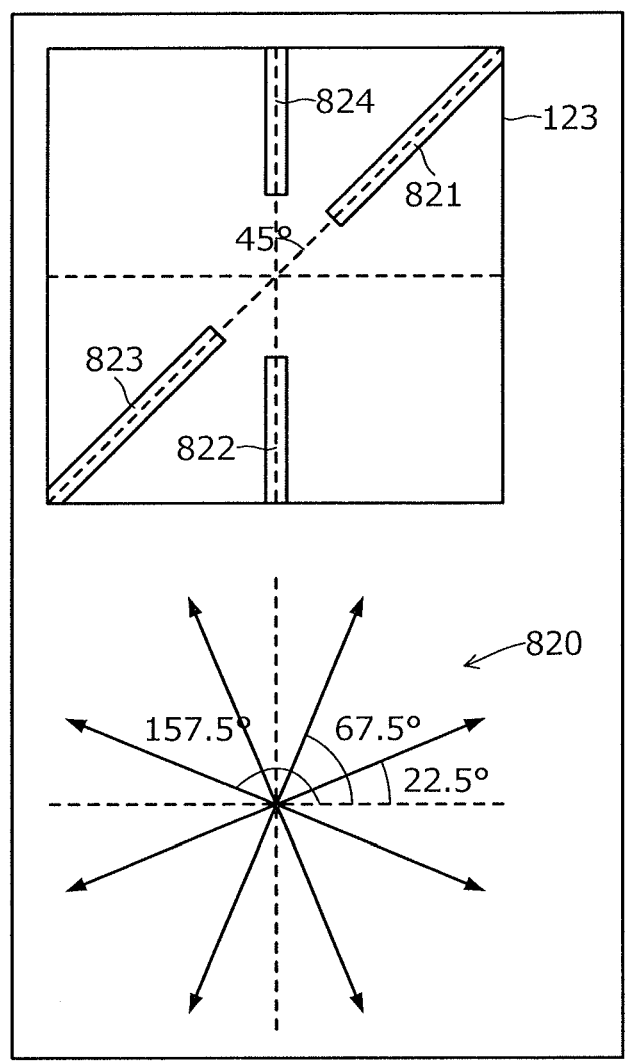
Figures 3, 8:
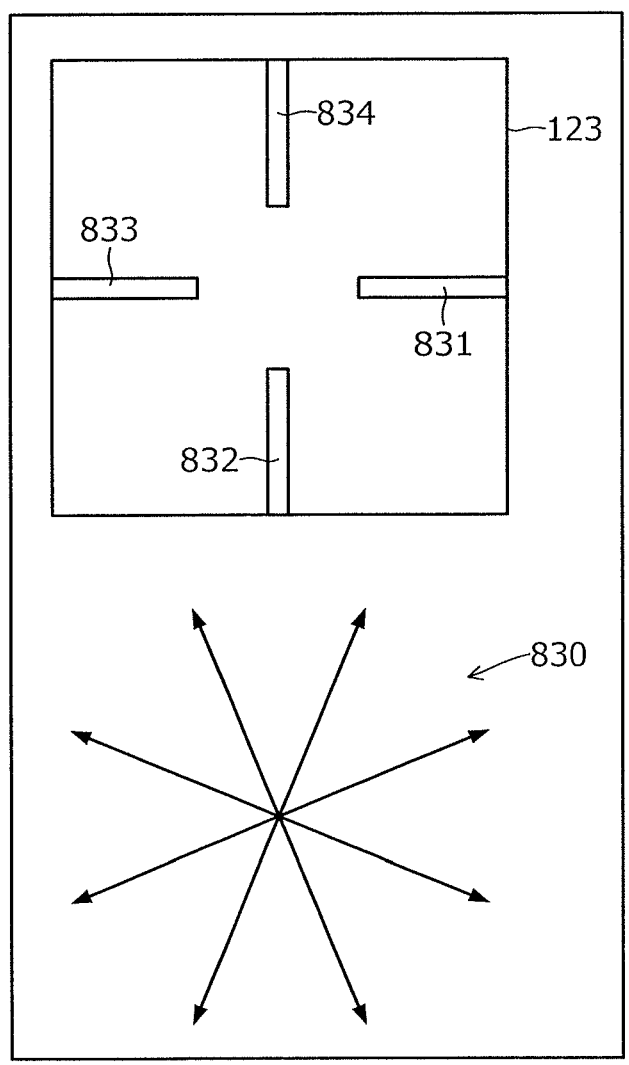
Figures 4, 8:
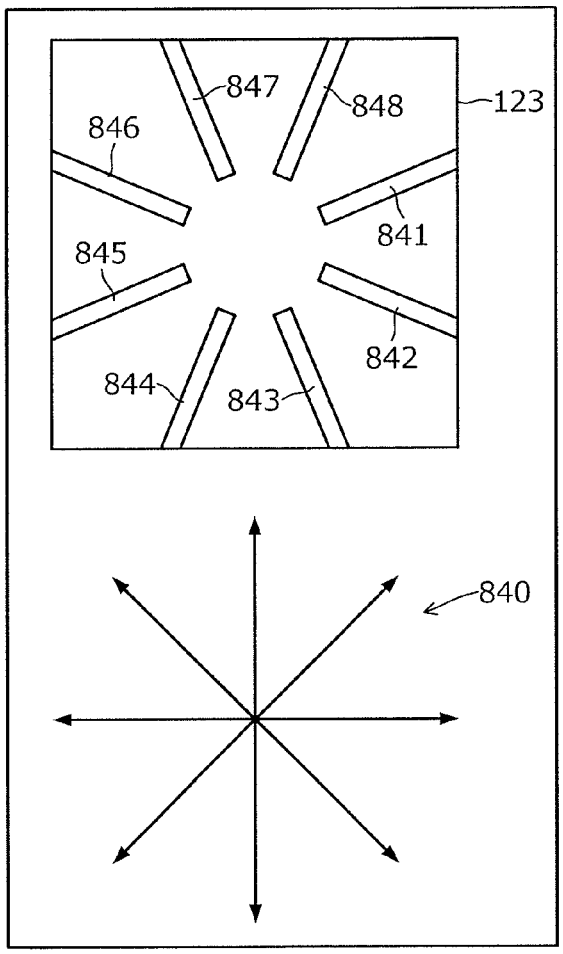

FIG. 8-1 depicts a first example of the electrode structure of the liquid crystal cell. The liquid crystal cell 123 of FIG. 8-1 is the liquid crystal cell 123 as viewed in the traveling direction of laser light (the same applies to the liquid crystal cell 123 of FIGS. 8-2 to 8-4). Electrodes 811 to 818 are electrodes of the liquid crystal cell 123. The electrodes 811 to 818 are set at angles of 0 degrees, 45 degrees, 90 degrees, 135 degrees, 180 degrees, 225 degrees, 270 degrees, and 315 degrees, respectively.

The electrodes 811 and 815, the electrodes 812 and 816, the electrodes 813 and 817, and the electrodes 814 and 818 are paired, respectively. The application of voltage to paired electrodes causes the director of a liquid crystal molecule in the liquid crystal cell 123 to rotate parallel to the substrate surface, whereby the director direction is controlled. For example, by applying voltage to the electrodes 811 and 815, the director direction of the liquid crystal cell 123 can be controlled to be 0 degrees. Voltage may be applied to electrodes other than the paired electrodes. In this manner, by balancing the voltage applied to respective electrodes, the director direction of the liquid crystal cell 123 can be controlled over a broader range. In this manner, because the movement of the liquid crystal molecule can be controlled through only the field response rate of the liquid crystal, the liquid crystal cell 123 can be operated at high speed.

In this example, the polarization direction of laser light incident on the liquid crystal device 120 and the slow axis orientations 122 and 126 of the wave plates 121 and 125 are set to any one among directions of 22.5 degrees, 67.5 degrees, 112.5 degrees, and 157.5 degrees, as indicated by polarization directions 810. As a result, by controlling the voltage applied to the electrodes 811 to 818, the angle of the director direction of the liquid crystal cell 123 can be shifted to 67.5 degrees and to 112.5 degrees with respect to the slow axis orientations 122 and 126 of the wave plates 121 and 125.

For example, a liquid crystal polarization controlling device described in non-patent document (Yasuo OHTERA, Takafumi CHIBA, and Shojiro KAWAKAMI, "Liquid Crystal Polarization Controlling Devices Utilizing Rotating Electric Fields", Optics, Vol. 30, 1st issue, pp. 29-30, Jan. 10, 2001) can be used as the liquid crystal cell 123 of FIG. 8-1.

FIG. 8-2 depicts a second example of the electrode structure of the liquid crystal cell. Electrodes 821 to 824 of FIG. 8-2 are electrodes of the liquid crystal cell 123. The electrodes 821 to 824 are set at angles of 45 degrees, 90 degrees, 225 degrees, and 270 degrees, respectively. Because the liquid crystal cell 123 has to shift the director direction thereof to two directions of 67.5 degrees and 112.5 degrees, the liquid crystal cell 123 are to be provided with two pairs of electrodes, as depicted in FIG. 8-2.

In this case, the polarization direction of laser light incident on the liquid crystal device 120 and the slow axis orientations 122 and 126 of the wave plates 121 and 125 are set to any one among directions of 22.5 degrees, 67.5 degrees, 112.5 degrees, and 157.5 degrees, as indicated by polarization directions 820. As a result, by controlling the voltage applied to the electrodes 821 to 824, the angle of the director direction of the liquid crystal cell 123 can be shifted to 67.5 degrees and to 112.5 degrees with respect to the slow axis orientations 122 and 126 of the wave plates 121 and 125.

FIG. 8-3 depicts a third example of the electrode structure of the liquid crystal cell. Electrodes 831 to 834 of FIG. 8-3 are electrodes of the liquid crystal cell 123. The electrodes 831 to 834 are set at angles of 0 degrees, 90 degrees, 180 degrees, and 270 degrees, respectively.

In this example, the polarization direction of laser light incident on the liquid crystal device 120 and the slow axis orientations 122 and 126 of the wave plates 121 and 125 are set to any one among directions of 22.5 degrees, 67.5 degrees, 112.5 degrees, and 157.5 degrees, as indicated by polarization directions 830. As a result, by controlling the voltage applied to the electrodes 831 to 834, the angle of the director direction of the liquid crystal cell 123 can be shifted to 67.5 degrees and to 112.5 degrees with respect to the slow axis orientations 122 and 126 of the wave plates 121 and 125.

FIG. 8-4 depicts a fourth example of the electrode structure of the liquid crystal cell. Electrodes 841 to 848 are electrodes of the liquid crystal cell 123. The electrodes 841 to 848 are set at angles of 22.5 degrees, 67.5 degrees, 112.5 degrees, 157.5 degrees, 202.5 degrees, 247.5 degrees, 292.5 degrees, and 337.5 degrees, respectively. In other words, the electrodes 841 to 848 are obtained by tilting the electrodes 811 to 818 of FIG. 8-1 by 22.5 degrees, respectively.

In this case, the polarization direction of laser light incident on the liquid crystal device 120 and the slow axis orientations 122 and 126 of the wave plates 121 and 125 are set to any one among directions of 0 degrees, 45 degrees, 90 degrees, and 135 degrees, as indicated by polarization directions 840. As a result, by controlling the voltage applied to the electrodes 841 to 848, the angle of the director direction of the liquid crystal cell 123 can be shifted to 67.5 degrees and to 112.5 degrees with respect to the slow axis orientations 122 and 126 of the wave plates 121 and 125.

As depicted in FIGS. 8-1 to 8-4, the liquid crystal cell 123 has multiple pairs of electrodes that maintain director directions and therefore, can shift multiple director directions at high speed. For example, the liquid crystal cell 123 has first electrodes that keep the direction of directors at 67.5 degrees with respect to the direction of the slow axes of the wave plates 121 and 125, and second electrodes that keep the direction of directors at 112.5 degrees with respect to the direction of the slow axes of the wave plates 121 and 125.

(Form of Use of Projector)

Figures 1, 9:
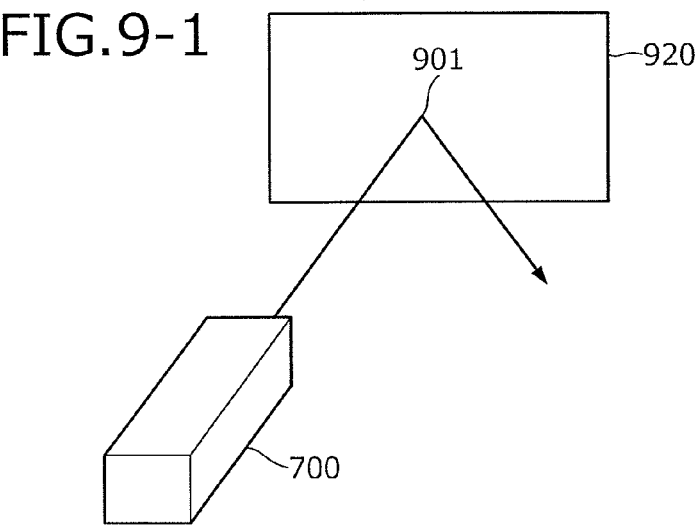
Figures 2, 9:
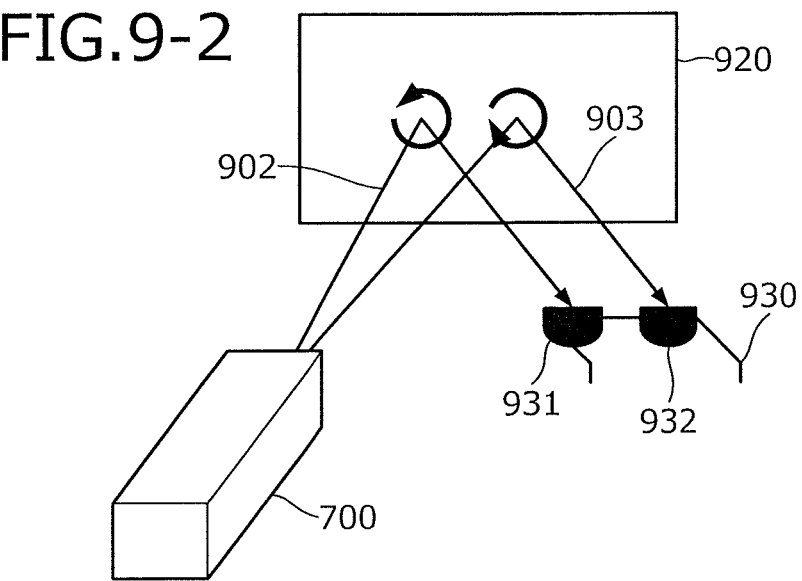

FIG. 9-1 depicts a first example of the form of use of the projector. The projector 700 of FIG. 9-1 is, for example, the projector 700 of FIG. 7. The projector 700 emits laser light 901 onto a screen 920 while causing the optical device 100 to cyclically change the polarization states at high speed. As a result, speckles of video and images projected on the screen 920 are reduced and image quality is improved.

FIG. 9-2 depicts a second example of the form of use of the projector. In FIG. 9-2, components identical to those depicted in FIG. 9-1 are denoted by the same reference numerals used in FIG. 9-1 and are omitted in further description. As depicted in FIG. 9-2, the projector 700 alternately emits laser light 902 in a counterclockwise circular polarization state and laser light 903 in a clockwise circular polarization state, onto the screen 920. Each of laser light 902 and laser light 903 is modulated so as to create images seen from different points of view.

A pair of three-dimensional glasses 930 has a glass 931 that transmits only the laser light 902 in a counterclockwise circular polarization state and a glass 932 that transmits only the laser light 903 in a clockwise circular polarization state. In this configuration, the three-dimensional glasses 930 allows a person wearing the three-dimensional glasses 930 to visually perceive a three-dimensional image. While the configuration for realizing a three-dimensional image by switching circular polarization states is described in this example, a configuration for realizing a three-dimensional image by switching linear polarization states in different directions is also be possible.

(Control for Case of Realizing Reduction in Speckles)

FIG. 10 is a flowchart of an example of control in a case of realizing a reduction in speckles. For example, when a reduction in speckles is realized as in the example of FIG. 9-1, the optical device 100 under control of the control unit 724 executes, for example, steps depicted in FIG. 10. First, the liquid crystal element controller 722 shifts the director direction 124 of the liquid crystal cell 123 (step S1001).

Subsequently, the LCOS controller 723 inputs a video signal for red to the LCOS 430 (step S1002). The light source controller 721 then turns on the red light source 311 (step S1003). The light source controller 721 then turns off the red light source 311 (step S1004).

Subsequently, the LCOS controller 723 inputs a video signal for green to the LCOS 430 (step S1005). The light source controller 721 then turns on the green light source 312 (step S1006). The light source controller 721 then turns off the green light source 312 (step S1007).

Subsequently, the LCOS controller 723 inputs a video signal for blue to the LCOS 430 (step S1008). The light source controller 721 then turns on the blue light source 313 (step S1009). The light source controller 721 then turns off the blue light source 313 (step S1010), and the process flow returns to step S1001. Through repeated execution of the above steps, polarization states are changed by shifting the director direction 124 of the liquid crystal cell 123 as beams of laser light bearing different colors are output in time-sharing sequence.

As a result, each time a series of beams of red, green, and blue laser light are output, the director direction 124 of the liquid crystal cell 123 can be shifted. However, when reducing speckles is intended, for example, shifting of the director direction 124 of the liquid crystal cell 123 does not need to be synchronized with the control of the red light source 311, the green light source 312, the blue light source 313, and the LCOS 430.

Figure 11:
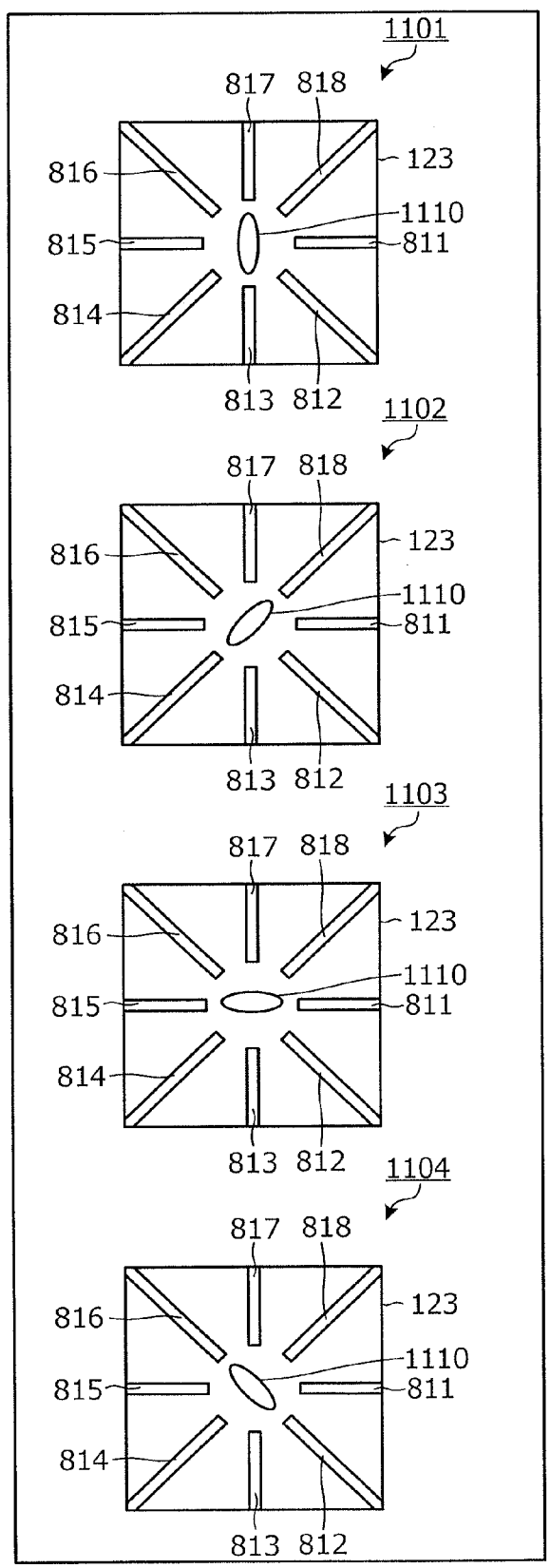
FIG. 11 depicts an example of a shifting of a director direction of the liquid crystal device.

FIG. 11 depicts an example of the shifting of the director direction of the liquid crystal device. In FIG. 11, components identical to those depicted in FIG. 8-1 are denoted by the same reference numerals used in FIG. 8-1 and are omitted in further description. A director 1110 is the director of the liquid crystal cell 123. States 1101 to 1104 represent states of the shifting of the direction of the director 1110.

Through control of the voltage applied to the electrodes 811 to 818, the liquid crystal element controller 722 shifts the direction of the director 1110 by 45 degrees at each execution of step S1001 in FIG. 10. Through this process, the direction of the director 1110 can be shifted sequentially to the direction in the state 1101, the direction in the state 1102, the direction in the state 1103, the direction in the state 1104, the direction in the state 1101, and so on.

(Control in Case of Realizing Three-Dimensional Image)

Figure 12:
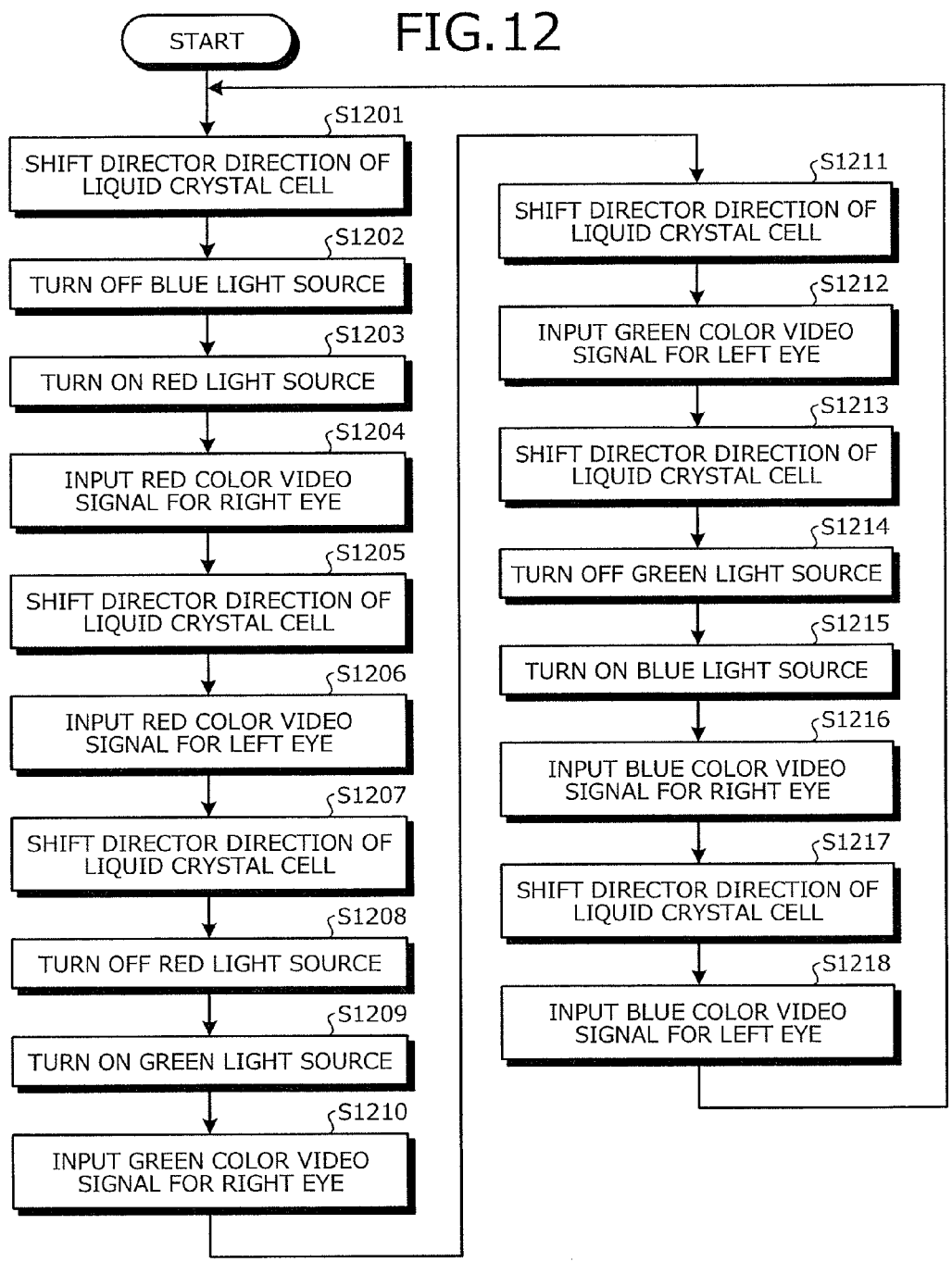
FIG. 12 is a flowchart of an example of control in a case of realizing a three-dimensional image.

FIG. 12 is a flowchart of an example of control in a case of realizing a three-dimensional image. For example, when a three-dimensional image is realized by the optical device 100 as in the example of FIG. 9-2, steps depicted in FIG. 12 are executed repeatedly, for example, under the control of the control unit 724.

First, the liquid crystal element controller 722 shifts the director direction 124 of the liquid crystal cell 123 (step S1201). Subsequently, the light source controller 721 turns off the blue light source 313 (step S1202). The light source controller 721 then turns on the red light source 311 (step S1203).

Subsequently, the LCOS controller 723 inputs a red color video signal for the right eye, to the LCOS 430 (step S1204). The liquid crystal element controller 722 shifts the director direction 124 of the liquid crystal cell 123 (step S1205). The LCOS controller 723 then inputs a red color video signal for the left eye, to the LCOS 430 (step S1206).

Subsequently, the liquid crystal element controller 722 shifts the director direction 124 of the liquid crystal cell 123 (step S1207). Subsequently, the light source controller 721 turns off the red light source 311 (step S1208). The light source controller 721 then turns on the green light source 312 (step S1209).

Subsequently, the LCOS controller 723 inputs a green color video signal for the right eye, to the LCOS 430 (step S1210). The liquid crystal element controller 722 shifts the director direction 124 of the liquid crystal cell 123 (step S1211). The LCOS controller 723 then inputs a green color video signal for the left eye, to the LCOS 430 (step S1212).

Subsequently, the liquid crystal element controller 722 shifts the director direction 124 of the liquid crystal cell 123 (step S1213). Subsequently, the light source controller 721 turns off the green light source 312 (step S1214). The light source controller 721 then turns on the blue light source 313 (step S1215).

Subsequently, the LCOS controller 723 inputs a blue color video signal for the right eye, to the LCOS 430 (step S1216). The liquid crystal element controller 722 shifts the director direction 124 of the liquid crystal cell 123 (step S1217). The LCOS controller 723 then inputs a blue color video signal for the left eye, to the LCOS 430 (step S1218), and returns to step S1201.

By repeatedly executing the above steps, laser light is output as the polarization state thereof is changed by video signals for the right eye and video signals for the left eye. Hence, a three-dimensional image is realized. When creation of a three-dimensional image is intended as in this example, shifting of the director direction 124 of the liquid crystal cell 123 is synchronized with control over the red light source 311, the green light source 312, the blue light source 313, and the LCOS 430. For example, shifting of the director direction 124 of the liquid crystal cell 123 is performed in synchronization with switching between a video signal for the right eye and a video signal for the left eye. The order of shifting of the director direction 124 of the liquid crystal cell 123 is, for example, the same as the order indicated in the example of FIG. 11.

(Applied Voltages 1 to Liquid Crystal Cell)

Figures 1, 2, 13:
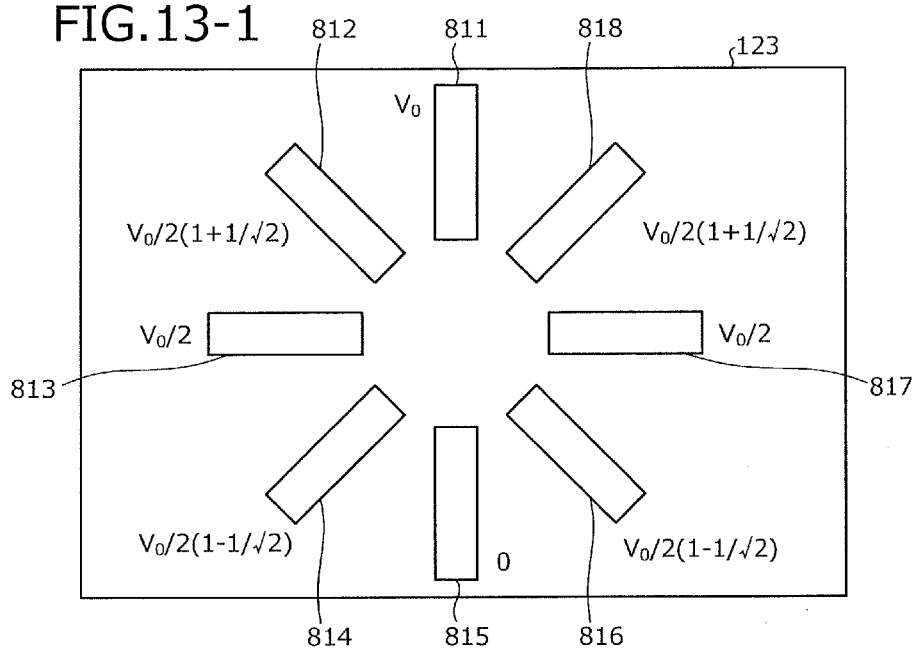

FIG. 13-1 depicts an example of applied voltages to the liquid crystal cell. In FIG. 13-1, components identical to those depicted in FIG. 8-1 are denoted by the same reference numerals used in FIG. 8-1 and are omitted in further description. As depicted in FIG. 13-1, voltages applied to the electrodes 811 to 818 are assumed to be $V_0$, $V_0/2(1+\sqrt{2})$, $V_0/2$, $V_0/2(1-\sqrt{2})$, 0, $V_0/2(1-\sqrt{2})$, $V_0/2$, and $V_0/2(1+1\sqrt{2})$, respectively. The time for applying an applied voltage V to each of the electrodes 811 to 818 during one cycle can be calculated by, for example, equation (9).

$$V = \sqrt{\frac{1}{T}\int V_0^2 dt} \quad (9)$$

FIG. 13-2 depicts an example of times for applying voltages during one cycle. In a table 1320 of FIG. 13-2, electrodes 1 to 8 represent the electrodes 811 to 818, respectively. As indicated in the table 1320, voltages applied to the electrodes 811 to 818 are determined to be $V_0$, $0.854V_0$, $0.5V_0$, $0.146V_0$, 0, $0.146V_0$, $0.5V_0$, and $0.854V_0$, respectively. Times for applying applied voltages V to the electrodes 811 to 818 during one cycle are assumed to be T, 730T/1000, 250T/1000, 20T/1000, 0, 20T/1000, 250T/1000, and 730T/1000, respectively.

(Waveforms 1 of Applied Voltages to Liquid Crystal Cell)

FIG. 14-1 depicts a first example of the waveforms of voltages applied to the liquid crystal cell. In FIG. 14-1, the electrodes 1 to 8 represent the electrodes 811 to 818, respectively. Waveforms 1411 to 1418 represent the waveforms of respective voltages applied to the electrodes 811 to 818. Pulses 1 to 5 represent the waveform patterns of the applied voltages. For example, voltages of the same waveform pattern (pulse 2) are applied to the electrodes 812 and 818, respectively. Voltages of the same waveform pattern (pulse 3) are applied to the electrodes 813 and 817, respectively. Voltages of the same waveform pattern (pulse 4) are applied to the electrodes 814 and 816, respectively.

The liquid crystal element controller 722 applies the voltages of the waveforms 1411 to 1418 to the electrodes 811 to 818, respectively, and thereby shifts the director direction of the liquid crystal cell 123 sequentially.

FIG. 14-2 depicts a second example of the waveforms of voltages applied to the liquid crystal cell. In FIG. 14-2, parts identical to those depicted in FIG. 14-1 are denoted by the same reference numerals used in FIG. 14-1 and are omitted in further description. The liquid crystal element controller 722 may apply voltages of waveforms 1411 to 1418 depicted in FIG. 14-2 to the electrodes 811 to 818 of the liquid crystal cell 123, respectively, and thereby, shift the director direction of the liquid crystal cell 123 sequentially.

(Applied Voltages 2 to Liquid Crystal Cell)

Application of voltages to the electrodes 811 to 818 may be performed in the following manner. FIG. 15-1 depicts an example of voltages applied to the liquid crystal cell. In FIG. 15-1, parts identical to those depicted in FIG. 8-1 are denoted by the same reference numerals used in FIG. 8-1 and are omitted in further description. As depicted in FIG. 15-1, voltages applied to the electrodes 811 to 818 are assumed to be, for example, $V_0$, $V_0/\sqrt{2}$, 0, $-V_0/\sqrt{2}$, $-V_0$, $-V_0/\sqrt{2}$, 0, and $V_0/\sqrt{2}$, respectively. According to the above voltage application method, these voltages are to be applied to the electrodes 811 to 818 during ⅛ cycle.

FIG. 15-2 depicts an example of times for applying voltages during one cycle. In a table 1520 of FIG. 15-2, the electrodes 1 to 8 represent the electrodes 811 to 818, respectively. As indicated in the table 1520, voltages applied to the electrodes 811 to 818 are assumed to be $V_0$, $0.0707V_0$, 0, $-0.707V_0$, $-V_0$, $-0.707V_0$, 0, and $0.707V_0$, respectively.

(Waveforms 2 of Applied Voltages to Liquid Crystal Cell)

FIG. 16 depicts a third example of the waveforms of voltages applied to the liquid crystal cell. In FIG. 16, the electrodes 1 to 8 represent the electrodes 811 to 818, respectively. Waveforms 1601 to 1608 represent the waveforms of respective voltages applied to the electrodes 811 to 818. Pulses 1 to 8 represent the waveform patterns of the applied voltages. For example, voltages applied to the electrodes 811 to 818 are determined to be $V_0$, $0.070V_0$, 0, $-0.707V_0$, $-V_0$, $-0.707V_0$, 0, and $0.707V_0$, respectively.

(Electric Field Distribution Generated by Voltage Application to Liquid Crystal Cell)

Figure 17:
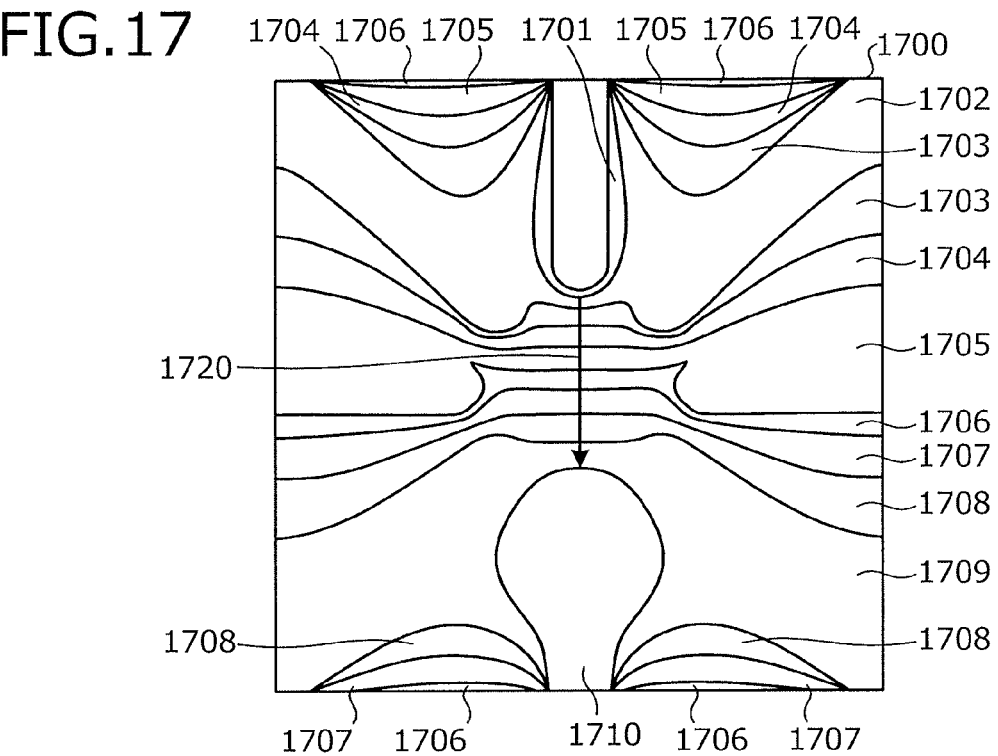
FIG. 17 is a diagram (1) showing an example of electric field distribution generated by voltage application to the liquid crystal cell.

FIG. 17 is a diagram (1) showing an example of electric field distribution generated by voltage application to the liquid crystal cell. Electric field distribution 1700 depicted in FIG. 17 represents electric field distribution that is generated on the substrate surface of the liquid crystal cell 123 when the above voltages (e.g., voltages depicted in FIG. 14-1 or FIG. 16) are applied to the liquid crystal cell 123. Areas 1701 to 1710 represent areas in which field intensities are 9 to 10, 8 to 9, 7 to 8, 6 to 7, 5 to 6, 4 to 5, 3 to 4, 2 to 3, 1 to 2, and 0 to 1, respectively. A director direction 1720 represents the direction of the director 1110

Figure 18:
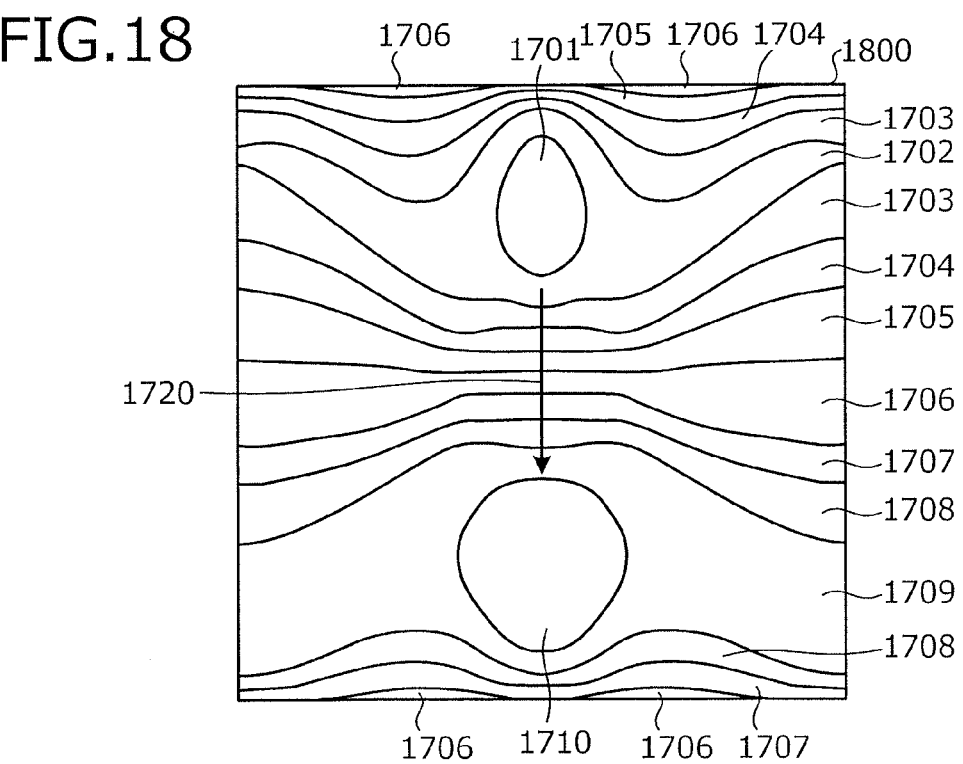
FIG. 18 is a diagram (2) showing an example of electric field distribution generated by voltage application to the liquid crystal cell.

FIG. 18 is a diagram (2) showing an example of electric field distribution generated by voltage application to the liquid crystal cell. In FIG. 18, parts identical to those depicted in FIG. 17 are denoted by the same reference numerals used in FIG. 17 and are omitted in further description. An electric field distribution 1800 of FIG. 18 represents an electric field distribution generated on the bulk of the liquid crystal cell 123 when the above voltages (e.g., voltages depicted in FIG. 14-2) are applied to the liquid crystal cell 123.

(Voltage Application Patterns to Respective Electrodes)

FIG. 19 depicts an example of voltage application patterns for respective electrodes of the liquid crystal cell. In FIG. 19, parts identical to those depicted in FIG. 14-1 are denoted by the same reference numerals used in FIG. 14-1 and are omitted in further description. A table 1900 depicted in FIG. 19 indicates an example of voltage application patterns for the electrodes 811 to 818 of the liquid crystal cell 123. As indicated in the table 1900, at each cycle, the liquid crystal element controller 722 shifts pulses applied to the electrodes 811 to 818.

For example, the liquid crystal element controller 722 applies pulses 1, 2, 3, 4, 5, 4, 3, and 2 to the electrodes 811 to 818, respectively, at the first cycle and applies pulses 2, 3, 4, 5, 4, 3, 2 and 1 to the electrodes 811 to 818, respectively, at the second cycle. After ending the eighth cycle, the liquid crystal element controller 722 returns to the first cycle.

FIGS. 20-1 and 20-8 depict examples of changes of electric field distributions caused by voltage application patterns. In FIGS. 20-1 to 20-8, components identical to those depicted in FIG. 17 are denoted by the same reference numerals used in FIG. 17 and are omitted in further description. Electric field distributions 2001 to 2008 of FIGS. 20-1 to 20-8 represent the electric field distributions of the liquid crystal cell 123 at the first to eighth cycles indicated in the table 1900 of FIG. 19, respectively.

As indicated in FIGS. 20-1 to 20-8, pulses applied to the electrodes 811 to 818 are changed at each cycle to change the electric field distributions of the liquid crystal cell 123. Hence, the director direction 124 of the liquid crystal cell 123 can be changed in sequence.

(Another Modification of Optical Device)

FIG. 21 depicts another modification of the optical device. In FIG. 21, components identical to those depicted in FIG. 1-1 are denoted by the same reference numerals used in FIG. 1-1 and are omitted in further description. As depicted in FIG. 21, the optical device 100 may include the liquid crystal cell 123 as a reflective liquid crystal cell. In this case, the wave plates 121 and 125 of FIG. 1-1 are integrated into one wave plate 121.

As depicted in FIG. 21, a mirror 1010 is disposed on the face of the liquid crystal cell 123 opposite to the face of the same closer to the wave plate 121. The liquid crystal cell 123 causes the mirror 1010 to reflect laser light of which the direction of polarization is rotated and emits the laser light to the wave plate 121. This means that laser light reciprocates through the liquid crystal cell 123, in which process the polarization direction of reflected laser light is rotated by the liquid crystal cell 123 at the same degree as the degree of rotation of the polarization direction of laser light coming from the polarization-maintaining fiber 112 and incident on the liquid crystal cell 123. In other words, reciprocating laser light travels a light path that is twice the light path that the laser light travels when passing through just the liquid crystal cell 123. Hence, the liquid crystal cell 123 substantially functions as the half wave plate. The wave plate 121 transmits laser light emitted from the liquid crystal cell 123. As a result, the polarization state of reflected laser light having been reflected by the liquid crystal cell 123 and passed through the wave plate 121 becomes one of the polarization states 102 and 103 (see, FIG. 1-1).

In this manner, the liquid crystal cell 123 serves as the reflective liquid crystal cell and laser light is caused to reciprocate through the wave plate 121, achieving the same effect as that of the optical device 100 depicted in FIG. 1-1. As a result, a configuration that omits the wave plate 125 becomes possible. Hence, the number of components can be reduced, enabling reduction of the device size.

Laser light reflected by the liquid crystal cell 123 and passing through the wave plate 121 can be extracted by using, for example, a circulator. Laser light may be extracted by adjusting the angles of elements so that a position at which laser light from the light source unit 110 falls onto the wave plate 121 is different from a position at which laser light reflected by the liquid crystal cell 123 exits of the wave plate 121.

In addition to the optical device 100 depicted in FIG. 1-1, the modification depicted in FIG. 21 is further applicable to, for example, the optical device 100 depicted in FIGS. 1-2, 1-3, and 1-6.

(Design of Laminated Wave Plate)

Figure 22:
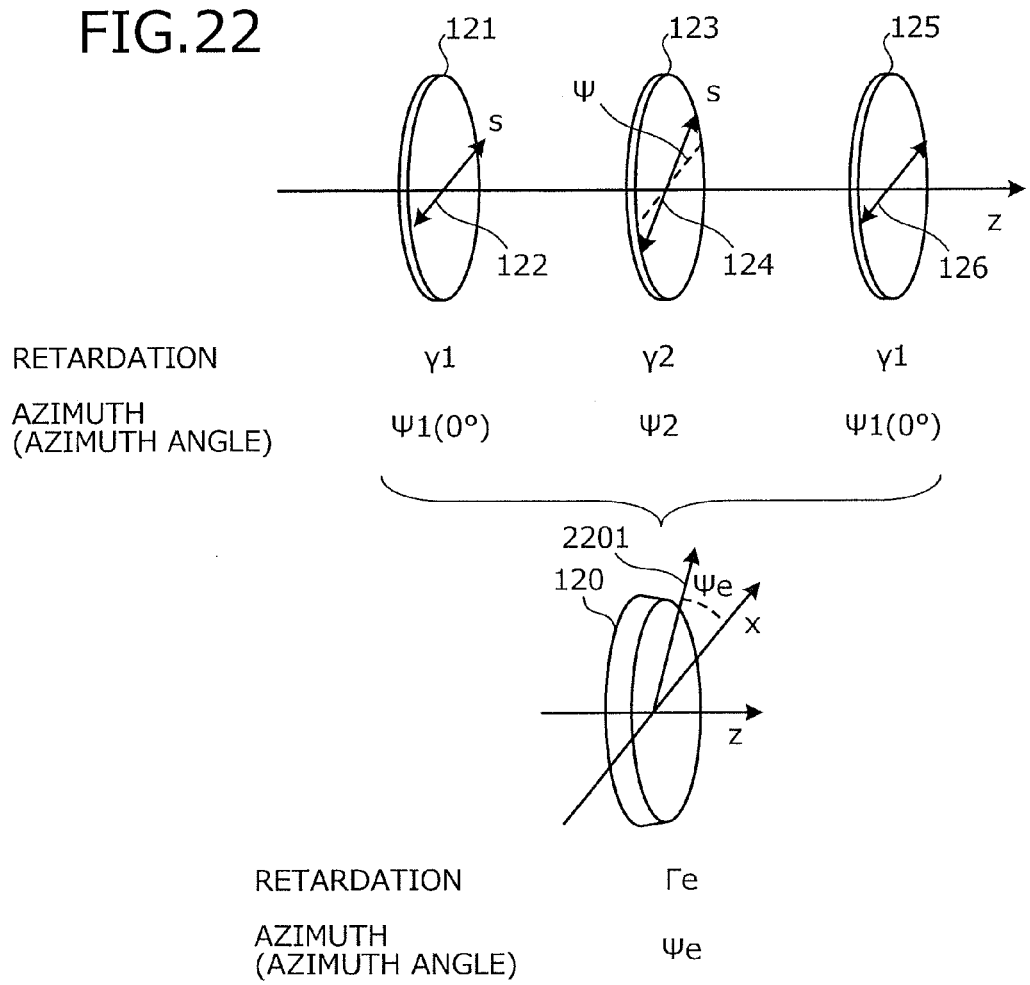
FIG. 22 depicts an example of operation of a laminated wave plate.

FIG. 22 depicts an example of the operation of a laminated wave plate. In FIG. 22, components identical to those depicted in FIG. 1-1 are denoted by the same reference numerals used in FIG. 1-1 and are omitted in further description. In FIG. 22, the x axis corresponds to the above given direction (0 degrees), and the z axis corresponds to the traveling direction of light. It is assumed that the retardations of the wave plates 121 and 125 are the same, $\gamma 1$, and that azimuths between the slow axis orientations 122 and 126 of the wave plates 121 and 125 and the given direction are the same, $\Psi 1$.

It is also assumed that the retardation of the liquid crystal cell 123 is $\gamma 2$ and that an azimuth between the director direction 124 of the liquid crystal cell 123 and the given direction is $\Psi 2$. In this example, the direction equivalent to the slow axis orientations 122 and 126 of the wave plates 121 and 125 is defined as a reference direction with zero azimuth. In this case, the azimuth $\Psi 1$ of the wave plates 121 and 125 is 0 degrees. Therefore, an azimuth $\Psi$ between the wave plates 121 and 125 and the liquid crystal cell 123 is calculated as $\Psi = \Psi 2 - \Psi 1 = \Psi 2$.

The liquid crystal device 120 of FIG. 22 is obtained by virtually depicting the liquid crystal device 120 composed of the wave plates 121 and 125 and the liquid crystal cell 123 as a single wavelength plate (laminated wavelength plate). A slow axis orientation 2201 represents the direction of the virtual slow axis of the liquid crystal device 120. An azimuth between the slow axis orientation 2201 of the liquid crystal device 120 and the given direction is $\Psi e$.

The retardation $\Gamma e$ by the liquid crystal device 120 and the azimuth $\Psi e$ between the slow axis orientation 2201 of the liquid crystal device 120 and the given direction can be expressed as the above equations (3) and (4) by a calculation based on the retardations $\gamma 1$ and $\gamma 2$ of the wave plates 121 and 125 and the liquid crystal cell 123, the azimuth $\Psi$, and the Jones matrix.

In equations (3) and (4), the retardation $\gamma x$ of the wave plate x (wave plates 121 and 125 and the liquid crystal cell 123) changes in a manner expressed by equation (10), depending on the wavelength of light passing through the wave plate x. In equation (10), $\Delta nx$ denotes the refractive index (birefringence) of the wave plate x. $\Delta nx$ is determined by, for example, the material of the wave plate x and the wavelength $\lambda$ of light passing through the wave plate x. The wavelength dependency of $\Delta nx$ will be described later. $dx$ denotes the thickness of the wave plate x.

$$\gamma x = 2\pi \cdot \Delta nx \cdot dx / \lambda \qquad (10)$$

<Case of Using Liquid Crystal Device as Quarter Wave Plate>

A case of using the liquid crystal device 120 as a quarter wave plate will be described. To use the liquid crystal device 120 as the quarter wave plate, the retardation Γe by the liquid crystal device 120 is assumed to be Γe=±π/2×(2n−1) (n denotes a natural number, ± denotes + or −). It follows then cos(Γe/2)=±1/√2 and sin (Γe/2)=±1/√2. The liquid crystal cell 123 is designed so that it works as a half wave plate for a given wavelength (e.g., wavelength for green), in which case γ2=π is satisfied. Hence, sin(γ2/2)=1 results.

For example, to change the polarization direction to clockwise circular polarization and to counterclockwise circular polarization, Ψe=45 degrees should be satisfied. Using cos (Γe/2)=±1/√2, sin(Γe/2)=±1/√2, and sin(γ2/2)=1, equation (4) is simplified into sin(2Ψe)=±1/√2×sin(2Ψ)=1. This means, therefore, that the azimuth Ψ between the wave plates 121 and 125 and the liquid crystal cell 123 is to be 22.5 degrees, 67.5 degrees, or 112.5 degrees or 157.5 degrees, i.e., is to be Ψ=π/8×(2n−1).

Equation (10), Ψ=π/8×(2n−1), and the wavelength of each beam of laser light emitted from each light source are substituted in equation (3), and the material and thickness d1 of the wave plates 121 and 125 that bring the value of equation (3) closer to ±1/√2 are selected. As a result, for the wavelength of each beam of laser light emitted from each light source, the liquid crystal device 120 (laminated wave plate) is caused to work as the quarter wave plate.

For example, a case is assumed where, to facilitate switching by the liquid crystal cell 123, the azimuth Ψ between the wave plates 121 and 125 and the liquid crystal cell 123 is determined to be 67.5 degrees. In this case, the wavelengths of beams of blue, green, and red laser light are λB, λG, and λR, respectively, and the retardations of beams of blue, green, and red laser light at the wave plates 121 and 125 are γ1B, γ1G, and γ1R, respectively. The retardations γ1B, γ1G, and γ1R can be determined based on equation (10), the refractive indices Δn1 of the wave plates 121 and 125, the thickness d1 of the wave plates 121 and 125, and the wavelengths λB, λG, and λR.

The retardations of beams of blue, green, and red laser light at the liquid crystal cell 123 are γ2B, γ2G, and γ2R, respectively. The retardations γ2B, γ2G, and γ2R can be determined based on equation (10), the refractive indices Δn2 of the liquid crystal cell 123, the thickness d2 of the liquid crystal cell 123, and the wavelengths λB, λG, and λR.

Substituting a double-angle formula indicated as equations (11), Ψ=67.5 degrees, γ1=γ1B, γ1G, γ1R, and γ2=γ2B, γ2G, γ2R in equation (3) gives equations (12).

$$\cos^2 \Psi = \frac{\cos 2\Psi + 1}{2}, \quad \sin^2 \Psi = \frac{-\cos 2\psi + 1}{2} \quad (11)$$

$$\cos(\Gamma e/2) = \frac{-1+\sqrt{2}}{2\sqrt{2}}\cos(\gamma 1B + \gamma 2B/2) + \frac{1+\sqrt{2}}{2\sqrt{2}}\cos(\gamma 1B - \gamma 2B/2)$$

$$\cos(\Gamma e/2) = \frac{-1+\sqrt{2}}{2\sqrt{2}}\cos(\gamma 1G + \gamma 2G/2) + \frac{1+\sqrt{2}}{2\sqrt{2}}\cos(\gamma 1G - \gamma 2G/2)$$

$$\cos(\Gamma e/2) = \frac{-1+\sqrt{2}}{2\sqrt{2}}\cos(\gamma 1R + \gamma 2R/2) + \frac{\sqrt{2}}{2\sqrt{2}}\cos(\gamma 1R - \gamma 2R/2) \quad (12)$$

Equations (12) can be transformed into equations (13), using a product-sum formula.

$$\cos(\Gamma e/2) = \frac{-1+\sqrt{2}}{2\sqrt{2}}\cos(\gamma 1B + \gamma 2B/2) + \frac{1+\sqrt{2}}{2\sqrt{2}}\cos(\gamma 1B - \gamma 2B/2) \qquad (13)$$

$$= \frac{-1}{2\sqrt{2}}\{\cos(\gamma 1B + \gamma 2B/2) - \cos(\gamma 1B - \gamma 2B/2)\} + \frac{1}{2}\{\cos(\gamma 1B + \gamma 2B/2) + \cos(\gamma 1B - \gamma 2B/2)\}$$

$$= \frac{1}{\sqrt{2}}\sin(\gamma 1B)\sin(\gamma 2B/2) + \cos(\gamma 1B)\cos(\gamma 2B/2)$$

$$\cos(\Gamma e/2) = \frac{-1+\sqrt{2}}{2\sqrt{2}}\cos(\gamma 1G + \gamma 2G/2) + \frac{1+\sqrt{2}}{2\sqrt{2}}\cos(\gamma 1G - \gamma G/2)$$

$$= \frac{-1}{2\sqrt{2}}\{\cos(\gamma 1G + \gamma 2G/2) - \cos(\gamma 1G - \gamma 2G/2)\} + \frac{1}{2}\{\cos(\gamma 1G + \gamma 2G/2) + \cos(\gamma 1G - \gamma 2G/2)\}$$

$$= \frac{1}{\sqrt{2}}\sin(\gamma 1G)\sin(\gamma 2G/2) + \cos(\gamma 1G)\cos(\gamma 2G/2)$$

$$\cos(\Gamma e/2) = \frac{-1+\sqrt{2}}{2\sqrt{2}}\cos(\gamma 1R + \gamma 2R/2) + \frac{1+\sqrt{2}}{2\sqrt{2}}\cos(\gamma 1R - \gamma 2R/2)$$

$$= \frac{-1}{2\sqrt{2}}\{\cos(\gamma 1R + \gamma 2R/2) - \cos(\gamma 1R - \gamma 2R/2)\} + \frac{1}{2}\{\cos(\gamma 1R + \gamma 2R/2) + \cos(\gamma 1R - \gamma 2R/2)\}$$

$$= \frac{1}{\sqrt{2}}\sin(\gamma 1R)\sin(\gamma 2R/2) + \cos(\gamma 1R)\cos(\gamma 2R/2)$$

The refractive index Δn also changes depending on the wavelength λ. For example, from the Cauchy dispersion formula, the refractive index Δn can be approximated at Δn=a+b/λ²+c/λ⁴+d/λ⁶ . . . , in which a, b, c, d, . . . are coefficients specific to the material of the wave plate. In the following explanation, the refractive index Δn is approximated at a+b/λ²+c/λ⁴ (first to third terms).

Based on equation (10), γ1B, γ1G, γ1R, γ2B, γ2G, and γ2R can be expressed as equations (14), where the coefficients a, b, and c for the wave plates 121 and 125 are replaced with a1, b1, and c1, respectively, and the coefficients a, b, and c for the liquid crystal cell 123 are replaced with a2, b2, and c2.

γ1B=2π(a1+b1/λB²+c1/λB⁴)·d1/λB

γ2B=2π(a2+b2/λB²+c2/λB⁴)·d2/λB

γ1G=2π(a1+b1/λG²+c1/λG⁴)·d1/λG

γ2G=2π(a2+b2/λG²+c2/λG⁴)·d2/λG

γ1R=2π(a1+b1/λ1R²+c1/λR⁴)·d1/λR

γ2R=2π·(a2+b2/λ2R²+c2/λR⁴)·d2/λR   (14)

The liquid crystal cell 123 works as the half wave plate for a given wavelength (e.g., λG), at which the thickness d2 of the liquid crystal cell 123 is determined by the coefficients a2, b2, and c2 for the liquid crystal cell 123 and equations (14).

By transforming equations (12), the retardation Γe for the wavelengths λB, λG, and λR at the liquid crystal device 120 can be expressed as equations (15).

$$\Gamma e = \arccos\left[\begin{array}{l}\frac{-1+\sqrt{2}}{2\sqrt{2}}\cos\left(\frac{2\pi\cdot(a1+b1/\lambda B^2+c1/\lambda B^4)\cdot d1}{\lambda B}+\frac{2\pi\cdot(a2+b2/\lambda B^2+c2/\lambda B^4)\cdot d2}{2\lambda B}\right)+\\ \frac{1+\sqrt{2}}{2\sqrt{2}}\cos\left(\frac{2\pi\cdot(a1+b1/\lambda B^2+c1/\lambda B^4)\cdot d1}{\lambda B}-\frac{2\pi\cdot(a2+b2/\lambda B^2+c2/\lambda B^4)\cdot d2}{2\lambda B}\right)\end{array}\right]\times 2 \quad (15)$$

$$\Gamma e = \arccos\left[\begin{array}{l}\frac{-1+\sqrt{2}}{2\sqrt{2}}\cos\left(\frac{2\pi\cdot(a1+b1/\lambda G^2+c1/\lambda G^4)\cdot d1}{\lambda G}+\frac{2\pi\cdot(a2+b2/\lambda G^2+c2/\lambda G^4)\cdot d2}{2\lambda G}\right)+\\ \frac{1+\sqrt{2}}{2\sqrt{2}}\cos\left(\frac{2\pi\cdot(a1+b1/\lambda G^2+c1/\lambda G^4)\cdot d1}{\lambda G}-\frac{2\pi\cdot(a2+b2/\lambda G^2+c2/\lambda G^4)\cdot d2}{2\lambda G}\right)\end{array}\right]\times 2$$

$$\Gamma e = \arccos\left[\begin{array}{l}\frac{-1+\sqrt{2}}{2\sqrt{2}}\cos\left(\frac{2\pi\cdot(a1+b1/\lambda R^2+c1/\lambda R^4)\cdot d1}{\lambda R}+\frac{2\pi\cdot(a2+b2/\lambda R^2+c2/\lambda R^4)\cdot d2}{2\lambda R}\right)+\\ \frac{1+\sqrt{2}}{2\sqrt{2}}\cos\left(\frac{2\pi\cdot(a1+b1/\lambda R^2+c1/\lambda R^4)\cdot d1}{\lambda R}-\frac{2\pi\cdot(a2+b2/\lambda R^2+c2/\lambda R^4)\cdot d2}{2\lambda R}\right)\end{array}\right]\times 2$$

Equations (15) can be transformed into equations (16), using a product-sum formula.

$$\Gamma e = \arccos\left[\begin{array}{l}\frac{1}{\sqrt{2}}\sin\left(\frac{2\pi\cdot(a1+b1/\lambda B^2+c1/\lambda B^4)\cdot d1}{\lambda B}\right)\sin\left(\frac{2\pi\cdot(a2+b2/\lambda B^2+c2/\lambda B^4)\cdot d2}{2\lambda B}\right)+\\ \cos\left(\frac{2\pi\cdot(a1+b1/\lambda B^2+c1/\lambda B^4)\cdot d1}{\lambda B}\right)\cos\left(\frac{2\pi\cdot(a2+b2/\lambda B^2+c2/\lambda B^4)\cdot d2}{2\lambda B}\right)\end{array}\right]\times 2 \quad (16)$$

$$\Gamma e = \arccos\left[\begin{array}{l}\frac{1}{\sqrt{2}}\sin\left(\frac{2\pi\cdot(a1+b1/\lambda G^2+c1/\lambda G^4)\cdot d1}{\lambda G}\right)\sin\left(\frac{2\pi\cdot(a2+b2/\lambda G^2+c2/\lambda G^4)\cdot d2}{2\lambda G}\right)+\\ \cos\left(\frac{2\pi\cdot(a1+b1/\lambda G^2+c1/\lambda G^4)\cdot d1}{\lambda G}\right)\cos\left(\frac{2\pi\cdot(a2+b2/\lambda G^2+c2/\lambda G^4)\cdot d2}{2\lambda G}\right)\end{array}\right]\times 2$$

$$\Gamma e = \arccos\left[\begin{array}{l}\frac{1}{\sqrt{2}}\sin\left(\frac{2\pi\cdot(a1+b1/\lambda R^2+c1/\lambda R^4)\cdot d1}{\lambda R}\right)\sin\left(\frac{2\pi\cdot(a2+b2/\lambda R^2+c2/\lambda R^4)\cdot d2}{2\lambda R}\right)+\\ \cos\left(\frac{2\pi\cdot(a1+b1/\lambda R^2+c1/\lambda R^4)\cdot d1}{\lambda R}\right)\cos\left(\frac{2\pi\cdot(a2+b2/\lambda R^2+c2/\lambda R^4)\cdot d2}{2\lambda R}\right)\end{array}\right]\times 2$$

The thickness d1 of the wave plates 121 and 125, therefore, is selected so that the retardation Γe for the wavelengths λB, λG, and λR in equations (15) or (16) comes closer to $\pm\pi/2\times(2n-1)$. As a result, the liquid crystal device 120 (laminated wave plate) is caused to work as the quarter wave plate for respective wavelength components, i.e., the wavelengths λB, λG, and λR.

Figure 23:
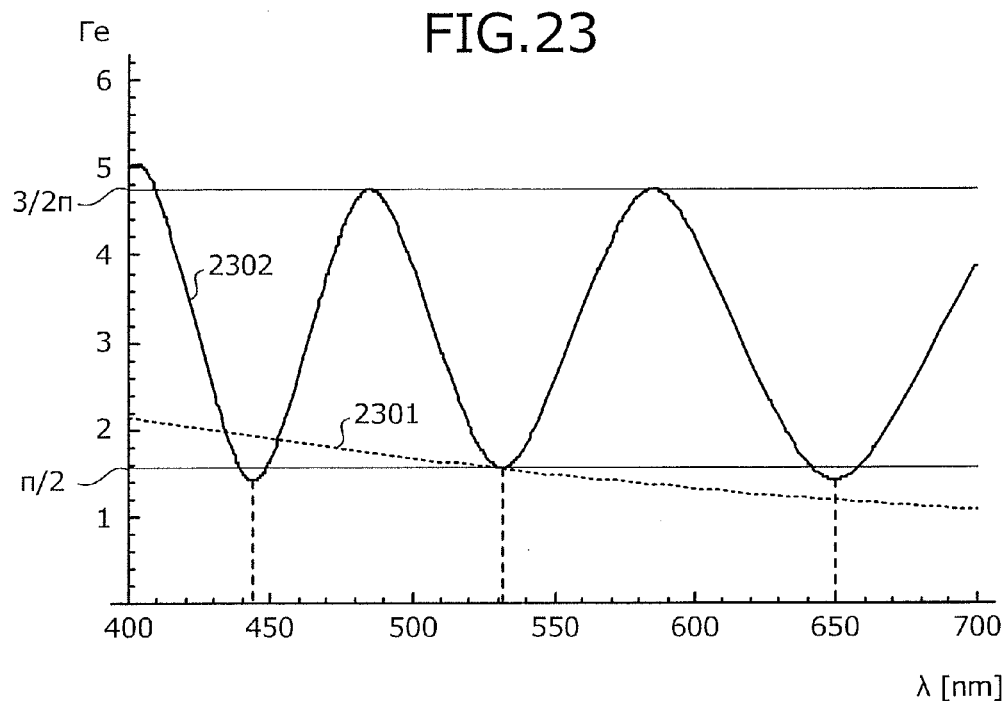
FIG. 23 is a graph of a first example of characteristics of retardation for wavelengths in a case of using a liquid crystal device as a quarter wave plate.

FIG. 23 is a graph of a first example of the characteristics of retardation for wavelengths in the case of using the liquid crystal device as the quarter wave plate. In FIG. 23, the horizontal axis represents the wavelength λ [nm] of light and the vertical axis represents the retardation Γe (phase difference) by the liquid crystal device 120. Retardation characteristics 2301 are indicated as reference data representing the characteristics of change of the retardation Γe for wavelengths in a case where the liquid crystal cell 123 is assumed to be a single liquid crystal cell working as the quarter wave plate.

Retardation characteristics 2302 represent the characteristics of change of the retardation Γe for wavelengths at the liquid crystal device 120 composed of the wave plates 121 and 125 and the liquid crystal cell 123. As indicated by the retardation characteristics 2302, at the liquid crystal device 120 composed of the wave plates 121 and 125 and the liquid crystal cell 123, the retardation Γe changes cyclically for wavelengths.

For example, for a wavelength of 448 [nm] corresponding to blue laser light, the retardation Γe is about π/2. For a wavelength of 532 [nm] corresponding to green laser light, the retardation Γe is about π/2. For a wavelength of 650 [nm] corresponding to red laser light, the retardation Γe is about π/2.

In this manner, by determining the thickness d1 of the wave plates 121 and 125 so that the retardation Γe takes an intended value for multiple wavelengths to be used, the liquid crystal device 120 is caused to work as the quarter wave plate for respective wavelength components to be used. In this case, the polarization directions of beams of laser light incident on the liquid crystal device 120 are made uniform in advance (see, FIG. 28-1).

Figures 1, 24:
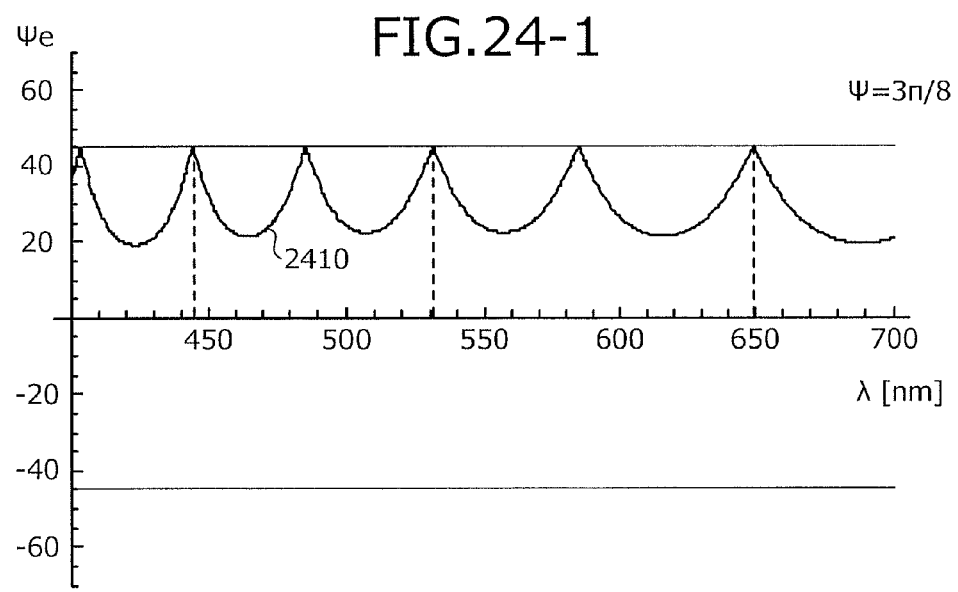
Figures 2, 24:
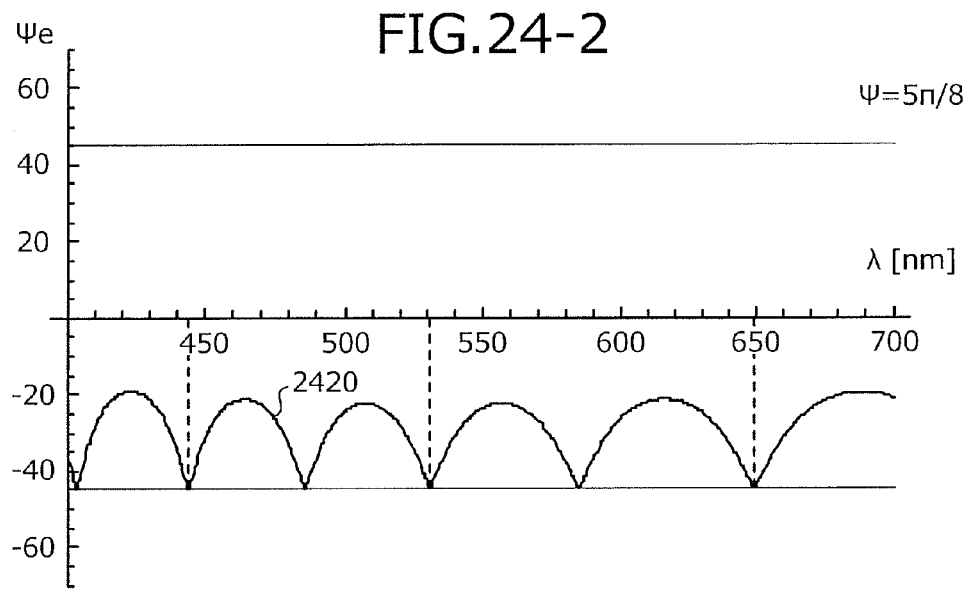

FIG. 24-1 is a graph of a first example of the characteristics of the azimuth (Ψ=3π/8) in a case of using the liquid crystal device as the quarter wave plate. FIG. 24-2 is a graph of a first example of the characteristics of the azimuth (Ψ=5π/8) in a case of using the liquid crystal device as the quarter wave plate. In FIGS. 24-1 and 24-2, the horizontal axis represents the wavelength λ [nm] of light and the vertical axis represents the azimuth Ψe of the liquid crystal device 120.

Azimuth characteristics 2410 of FIG. 24-1 represent the characteristics of change of the azimuth Ψe for wavelengths in a case where in the liquid crystal device 120, the azimuth Ψ between the slow axes of the wave plates 121 and 125 and the slow axis of the liquid crystal cell 123 is determined to be $\Psi=3\pi/8$. As indicated by the azimuth characteristics 2410, when $\Psi=3\pi/8$ is satisfied, the azimuth $\Psi$e of the liquid crystal device 120 is about 45 degrees for the respective wavelengths to be used (448 [nm], 532 [nm], and 650 [nm]).

Azimuth characteristics 2420 of FIG. 24-2 represent the characteristics of change of the azimuth $\Psi$e for wavelengths in a case where in the liquid crystal device 120, the azimuth $\Psi$ between the slow axes of the wave plates 121 and 125 and the slow axis of the liquid crystal cell 123 is determined to be $\Psi=5\pi/8$. As indicated by the azimuth characteristics 2420, when $\Psi=5\pi/8$ is satisfied, the azimuth $\Psi$e of the liquid crystal device 120 is about −45 degrees for the respective wavelengths to be used (448 [nm], 532 [nm], and 650 [nm]).

As depicted in FIGS. 23 to 24-2, by properly determining the thickness d1 of the wave plates 121 and 125, the retardation $\Gamma$e by the liquid crystal device 120 can be set to $\pi/2$ and the azimuth $\Psi$e of the liquid crystal device 120 can be set to ±45 degrees for the respective wavelengths to be used (448 [nm], 532 [nm], and 650 [nm]). Hence, by uniformly setting the polarization directions of incident beams of light of respective wavelengths to 0 degrees or 90 degrees, wavelength components output from the liquid crystal device 120 can be brought into the same circular polarization state.

Figure 25:
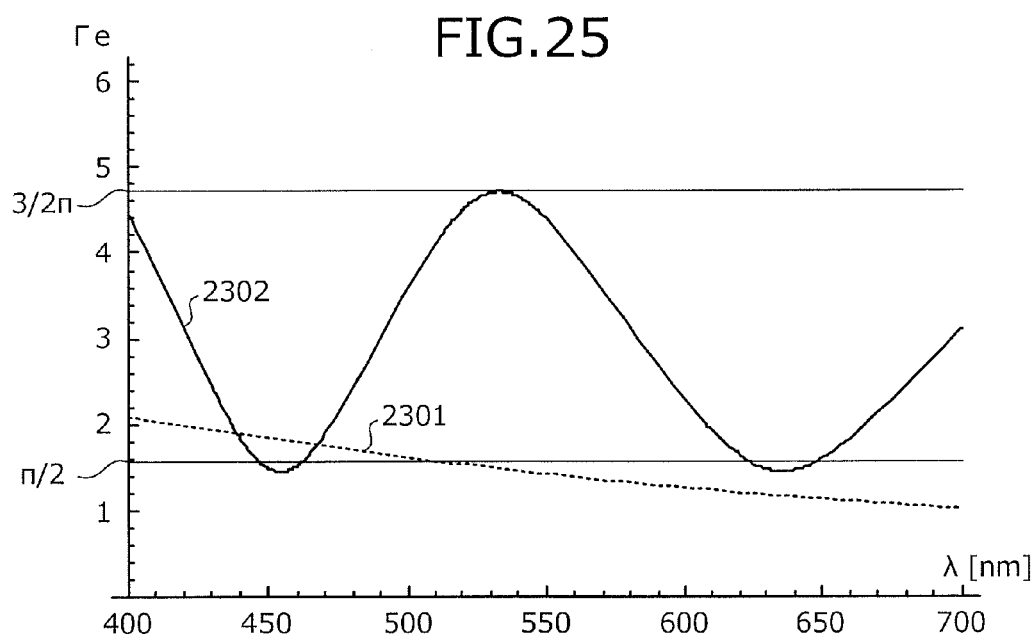
FIG. 25 is a graph of a second example of characteristics of retardation for wavelengths in a case of using the liquid crystal device as the quarter wave plate.

FIG. 25 is a graph of a second example of the characteristics of retardation for wavelengths in the case of using the liquid crystal device as the quarter wave plate. In FIG. 25, components identical to those depicted in FIG. 23 are denoted by the same reference numerals used in FIG. 23 and are omitted in further description. The thickness d1 of the wave plates 121 and 125 may be determined so that the characteristics of the retardation $\Gamma$e by liquid crystal device 120 become retardation characteristics 2302 of FIG. 25. In this case, for example, the thickness d1 of the wave plates 121 and 125 can be determined to be smaller than the thickness d1 for the example of FIG. 23.

In this case, for a wavelength 455 [nm] corresponding to blue laser light and a wavelength 635 [nm] corresponding to red laser light, the retardation $\Gamma$e is about $\pi/2$. For a wavelength 532 [nm] corresponding to green laser light, the retardation $\Gamma$e is about $3\pi/2$ ($-\pi/2$). Hence, the retardation $\Gamma$e by the liquid crystal device 120 can be set to ±$\pi/2$ for the respective wavelengths to be used (455 [nm], 532 [nm], and 635 [nm]). As a result, the liquid crystal device 120 is caused to work as the quarter wave plate for respective wavelength components, i.e., the wavelengths $\lambda$B, $\lambda$G, and $\lambda$R.

By tilting the polarization direction of green laser light by 90 degrees with respect to the polarization directions of blue and red light (see, e.g., FIG. 28-2), the wavelength component of green light output from the liquid crystal device 120 and the wavelength components of blue and red light output from the liquid crystal device 120 are brought into the same circular polarization state. In this manner, respective wavelength components output from the liquid crystal device 120 can be brought into the same circular polarization state.

Figures 1, 26:
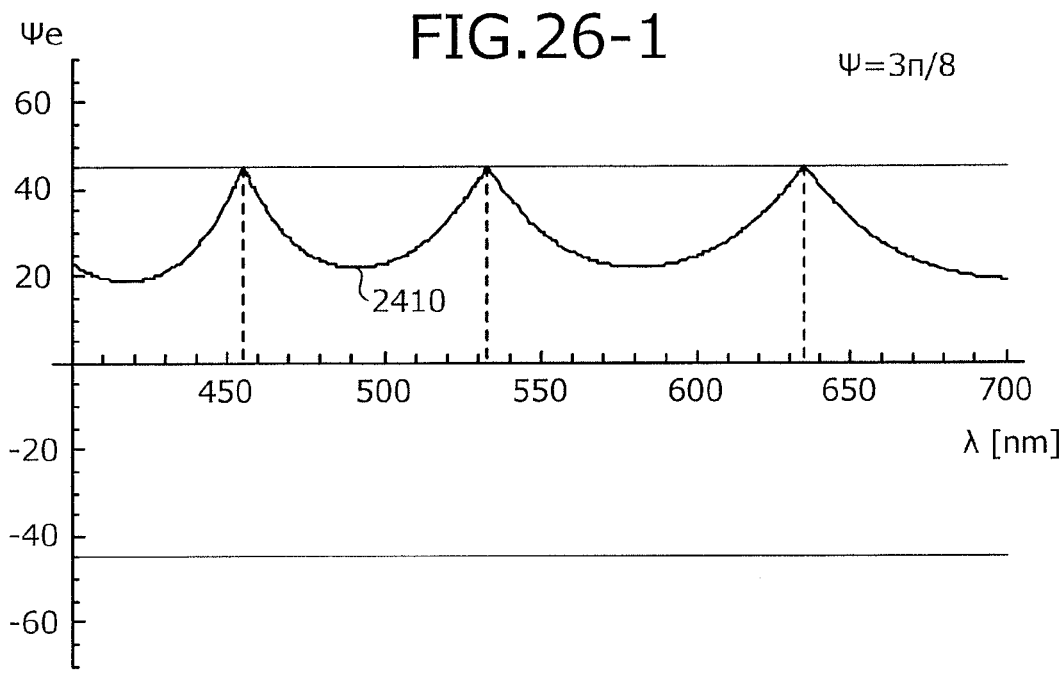
Figures 2, 26:
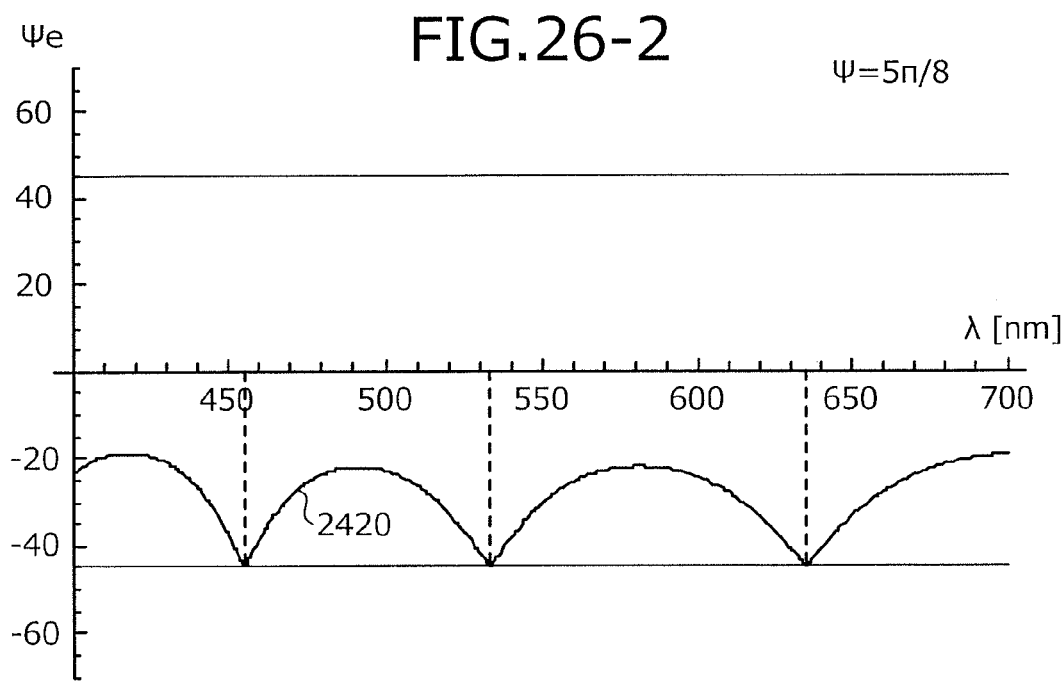

FIG. 26-1 is a graph of a second example of the characteristics of the azimuth ($\Psi=3\pi/8$) in the case of using the liquid crystal device as the quarter wave plate. FIG. 26-2 is a graph of a second example of the characteristics of the azimuth ($\Psi=5\pi/8$) in the case of using the liquid crystal device as the quarter wave plate. In FIGS. 26-1 and 26-2, components identical to those depicted in FIG. 24-1 or 24-2 are denoted by the same reference numerals used in FIGS. 24-1 and 24-2, and are omitted in further description.

In the example of FIG. 25, azimuth characteristics for the case of $\Psi=3\pi/8$ become azimuth characteristics 2410 depicted in FIG. 26-1. In the example of FIG. 25, the azimuth $\Psi$e of the liquid crystal device 120 for the case of $\Psi=3\pi/8$ is about 45 degrees for respective wavelengths to be used (455 [nm], 532 [nm], and 635 [nm]).

In the example of FIG. 25, azimuth characteristics for the case of $\Psi=5\pi/8$ become azimuth characteristics 2420 depicted in FIG. 26-2. In the example of FIG. 25, the azimuth $\Psi$e of the liquid crystal device 120 for the case of $\Psi=5\pi/8$ is about −45 degrees for respective wavelengths to be used (455 [nm], 532 [nm], and 635 [nm]).

As depicted in FIGS. 23 to 26-2, by properly determining the thickness d1 of the wave plates 121 and 125, the liquid crystal device 120 is caused to work as the quarter wave plate for the respective wavelengths to be used (455 [nm], 532 [nm], and 635 [nm]).

In the examples of FIGS. 23 to 26-2, the azimuth $\Psi$ is switched between $\Psi=3\pi/8$ and $\Psi=5\pi/8$ or between $\Psi=\pi/8$ and $\Psi=7\pi/8$. This allows the azimuth $\Psi$e to be shifted to ±45 degrees while the value of the retardation $\Gamma$e is kept as is for the respective wavelengths to be used. Hence, the liquid crystal device can be used as a circular polarization switching device.

This is realized by switching the director direction 124 of the liquid crystal between 67.5 degrees and 112.5 degrees or between 22.5 degrees and 157.5 degrees (−22.5 degrees) with respect to the slow axis orientation 122, using a ferroelectric liquid crystal having a cone angle of 45 degrees or the liquid crystal cell 123 of FIG. 8-1.

(Configuration Using Phase Difference Film)

In the above examples, a phase difference film having an arbitrary phase difference γ3 (e.g., $\lambda$/4 film), and different from the wave plates 121 and 125, may be used in combination with the wave plates 121 and 125. This allows more flexible adjustment that adapts phase difference characteristics and azimuth characteristics to the respective wavelengths to be used.

Figures 4, 27:
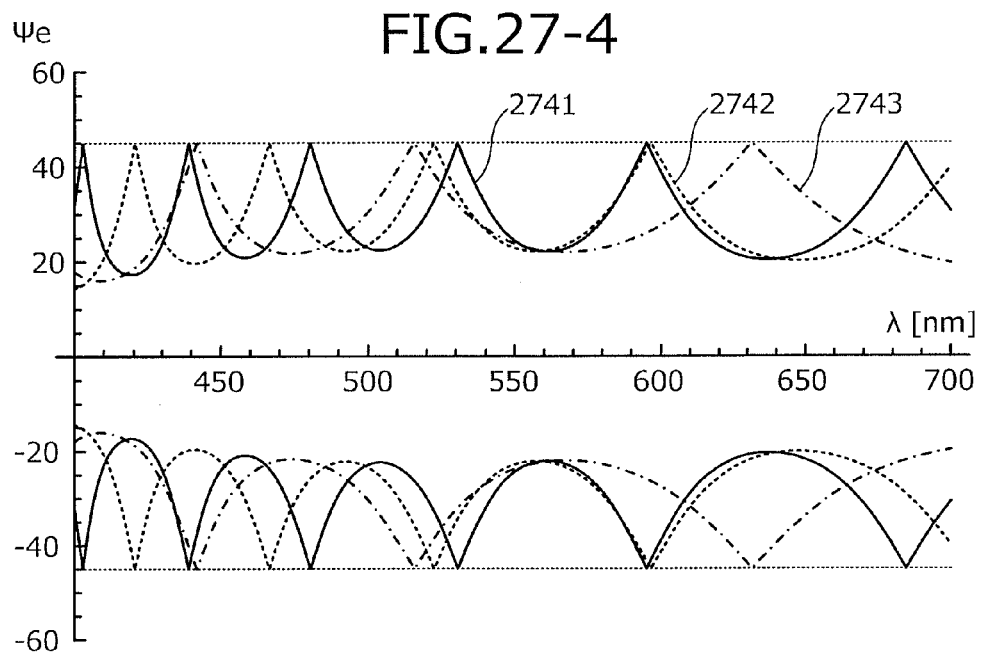
Figures 5, 27:
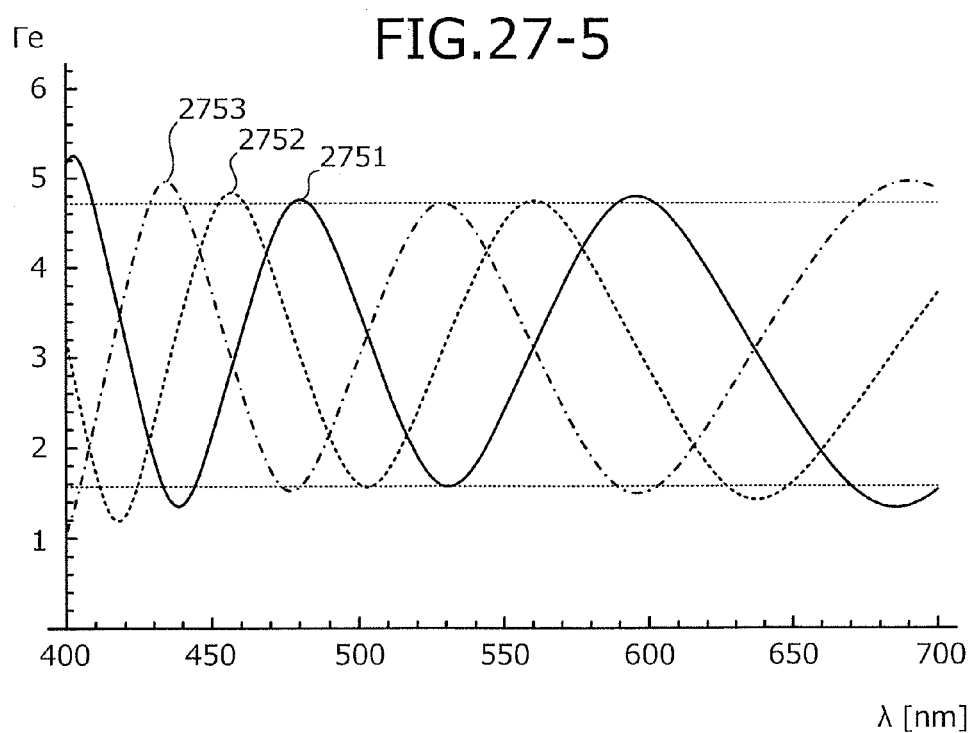
Figures 6, 27:
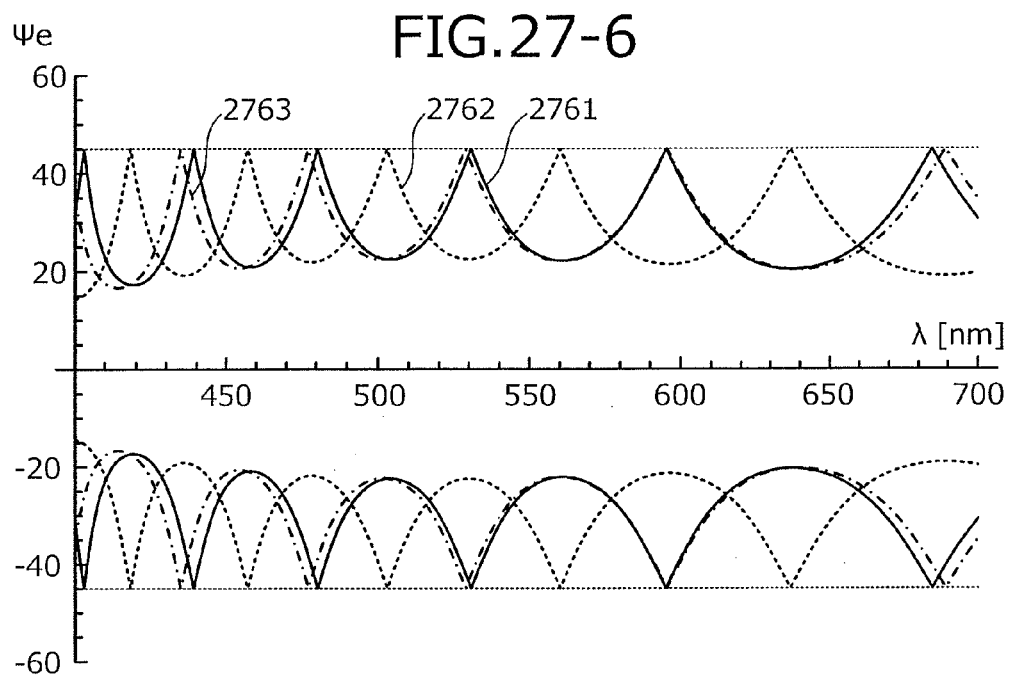
Figures 7, 27:
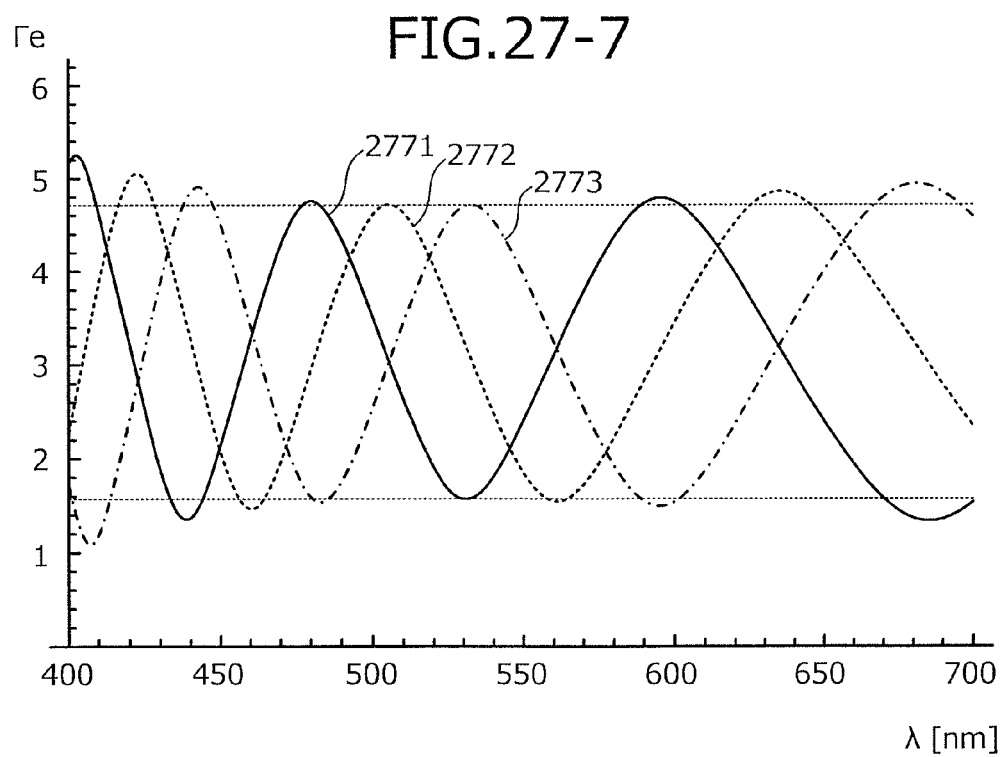
Figures 8, 27:
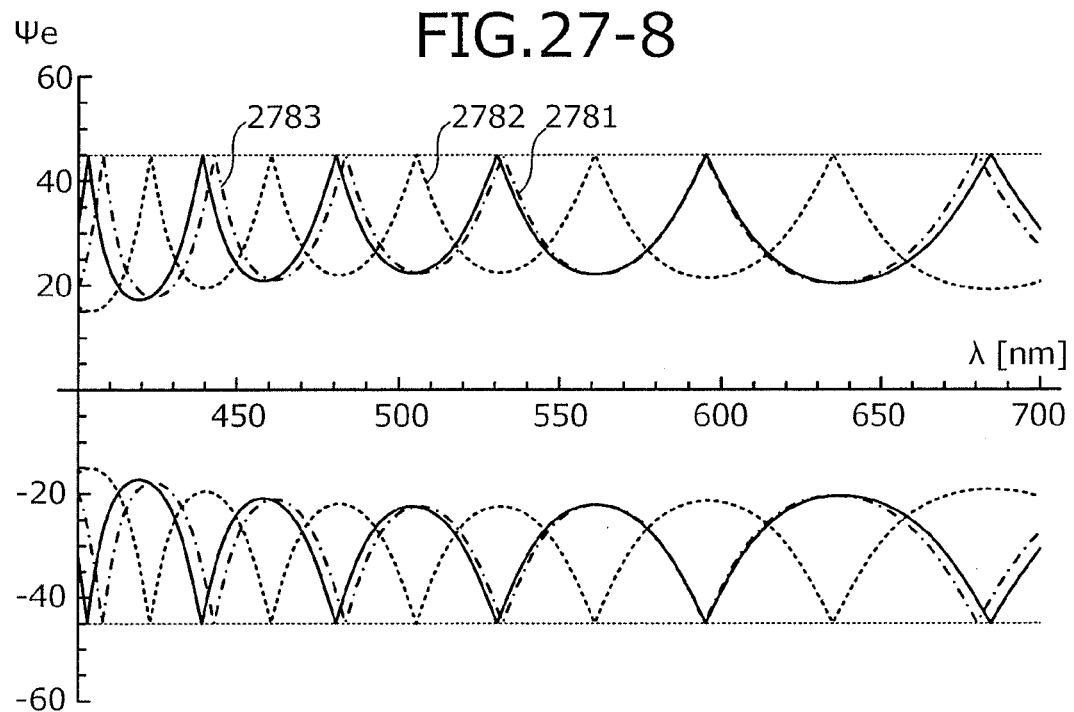

FIG. 27-1 depicts an example of a laminated wave plate in which phase difference films are combined together. In FIG. 27-1, components identical to those depicted in FIG. 22 are omitted in further description. As depicted in FIG. 27-1, for example, a phase difference film 127 may be disposed between the wave plate 121 and the liquid crystal cell 123. A phase difference film 128 may be disposed on a device downstream of the wave plate 125. When a configuration without the wave plate 121 is adopted, the phase difference film 127 is unnecessary. The light axes of the phase difference films 127 and 128 can be set parallel or orthogonal to the light axes of the wave plates 121 and 125.

A case of setting the slow axis of a phase difference film (e.g., phase difference films 127 and 128) to be parallel to the slow axes of the wave plates 121 and 125 will first be described.

FIG. 27-2 is a graph of an example of the characteristics of chromatic dispersion of a phase difference film. FIG. 27-3 is a graph of an example of the characteristics of retardation for wavelengths at the liquid crystal device that includes a phase difference film. In FIGS. 27-2 and 27-3, the horizontal axis represents the wavelength $\lambda$ [nm] of light and the vertical axis represents the retardation $\Gamma$e (phase difference).

Retardation characteristics 2721 of FIG. 27-2 represent the characteristics of change of the retardation $\Gamma$e for wavelengths at the wave plates 121 and 125. Retardation characteristics 2722 represent an example of the characteristics of change of the retardation $\Gamma$e for wavelengths at the phase difference films 127 and 128. Retardation characteristics 2723 of FIG. 27-2 represent another example of the characteristics of change of the retardation Γe for wavelengths at the phase difference films 127 and 128.

A phase difference film having chromatic dispersion property different from that of the wave plates 121 and 125, as indicated by the retardation characteristics 2722 and 2723, may be used as the phase difference films 127 and 128. The phase difference films 127 and 128 and the wave plates 121 and 125 are designed so that the respective slow axes are aligned.

Retardation characteristics 2731 of FIG. 27-3 represent the characteristics of change of the retardation Γe for wavelengths at the liquid crystal device 120 that does not include the phase difference films 127 and 128. Retardation characteristics 2732 represent the characteristics of change of the retardation Γe for wavelengths at the liquid crystal device 120 that includes the phase difference films 127 and 128 having the retardation characteristics 2722. Retardation characteristics 2733 represent the characteristics of change of the retardation Γe for wavelengths at the liquid crystal device 120 that includes the phase difference films 127 and 128 having the retardation characteristics 2723.

As indicated in FIGS. 27-2 and 27-3, by using a combination of the phase difference films 127 and 128, a wavelength position that creates an intended phase difference can be changed. This enables flexible response to the wavelengths to be used. While a λ/4 film is used as the phase difference films 127 and 128 in the above examples, the phase differences of the phase difference films 127 and 128 are not limited to λ/4.

FIG. 27-4 is a graph of an example of the characteristics of the azimuth for wavelengths at the liquid crystal device that includes a phase difference film. In FIG. 27-4, the horizontal axis represents the wavelength λ [nm] of light and the vertical axis represents the azimuth Ψe of the liquid crystal device 120. Azimuth characteristics 2741 of FIG. 27-4 represent the characteristics of change of the azimuth Ψe for wavelengths at the liquid crystal device 120 that does not include the phase difference films 127 and 128.

Azimuth characteristics 2742 represent the characteristics of change of the azimuth Ψe for wavelengths at the liquid crystal device 120 that includes the phase difference films 127 and 128 having the retardation characteristics 2722. Azimuth characteristics 2743 represent the characteristics of change of the azimuth Ψe for wavelengths at the liquid crystal device 120 that includes the phase difference films 127 and 128 having the retardation characteristics 2723.

As indicated by the azimuth characteristics 2741 to 2743, the azimuth Ψe of the liquid crystal device 120 is at ±45 degrees at points where the phase difference becomes the local minimum or local maximum in both cases of providing the phase difference films 127 and 128 and not providing the phase difference films 127 and 128.

FIG. 27-5 depicts an example of a change of the retardation characteristics depending on the number of phase difference films. In FIG. 27-5, the horizontal axis represents the wavelength λ [nm] of light and the vertical axis represents the retardation (phase difference) Γe.

Retardation characteristics 2751 to 2753 of FIG. 27-5 represent the characteristics of change of the retardation Γe in a case of changing the number of phase difference films (e.g., phase difference films 127 and 128) having the retardation characteristics 2722, to 0, 1, and 2.

In this manner, the characteristics of the retardation Γe by the liquid crystal device 120 can be adjusted by changing the number of phase difference films. Further, the number of the phase difference films (e.g., phase difference films 127 and 128) may be determined to be 3 or more.

FIG. 27-6 depicts an example of a change of the azimuth characteristics depending on the number of phase difference films. In FIG. 27-6, the horizontal axis represents the wavelength λ [nm] of light and the vertical axis represents the azimuth Ψe of the liquid crystal device 120. Azimuth characteristics 2761 to 2763 of FIG. 27-6 represent the characteristics of change of the azimuth Ψe in a case of changing the number of phase difference films (e.g., phase difference films 127 and 128) having the retardation characteristics 2722, to 0, 1, and 2.

As indicated by the azimuth characteristics 2761 to 2763, the azimuth Ψe of the liquid crystal device 120 is at ±45 degrees at points where the phase difference becomes the local minimum or local maximum in both cases of providing the phase difference films 127 and 128 and not providing the phase difference films 127 and 128.

A phase difference film (e.g., phase difference films 127 and 128) and the wavelength films 121 and 125 may be combined together with the respective axes set orthogonal to one another.

FIG. 27-7 depicts an example of a change of the retardation characteristics depending on the number of phase difference films in a case of setting the slow axes of the phase difference films and wave plates orthogonal to one another. In FIG. 27-7, the horizontal axis represents the wavelength λ [nm] of light and the vertical axis represents the retardation (phase difference) Γe.

Retardation characteristics 2771 to 2773 of FIG. 27-7 represent the characteristics of change of the retardation Γe in a case of changing the number of phase difference films having the retardation characteristics 2722 to 0, 1, and 2 when the slow axes of the phase difference films (e.g., phase difference films 127 and 128) are set orthogonal to the slow axes of the wavelength films 121 and 125.

As indicated by the retardation characteristics 2771 to 2773, when the slow axes of the phase difference films are set orthogonal to the slow axes of the wavelength films 121 and 125, peak positions of the characteristics of change of the retardation Γe can be shifted in a direction reverse to the peak positions in a case where the slow axes of the phase difference films are set parallel to the slow axes of the wavelength films 121 and 125.

FIG. 27-8 depicts an example of a change of the azimuth characteristics depending on the number of phase difference films in a case of setting the slow axes of the phase difference films and wave plates orthogonal to one another. In FIG. 27-8, the horizontal axis represents the wavelength λ [nm] of light and the vertical axis represents the azimuth Ψe.

Azimuth Ψe characteristics 2781 to 2783 of FIG. 27-8 represent the characteristics of change of the azimuth Ψe in a case of changing the number of phase difference films having the retardation characteristics 2722 to 0, 1, and 2 when the slow axes of the phase difference films (e.g., phase difference films 127 and 128) are set orthogonal to the slow axes of the wavelength films 121 and 125.

As indicated by the azimuth characteristics 2781 to 2783, when the slow axes of the phase difference films are set orthogonal to the slow axes of the wavelength films 121 and 125, similar to the peak positions of the characteristics of changed of the retardation Γe, peak positions of the characteristics of change of the azimuth Ψe can be shifted in a direction reverse to the peak positions in a case where the slow axes of the phase difference films are set parallel to the slow axes of the wavelength films 121 and 125.

Figures 1, 28:
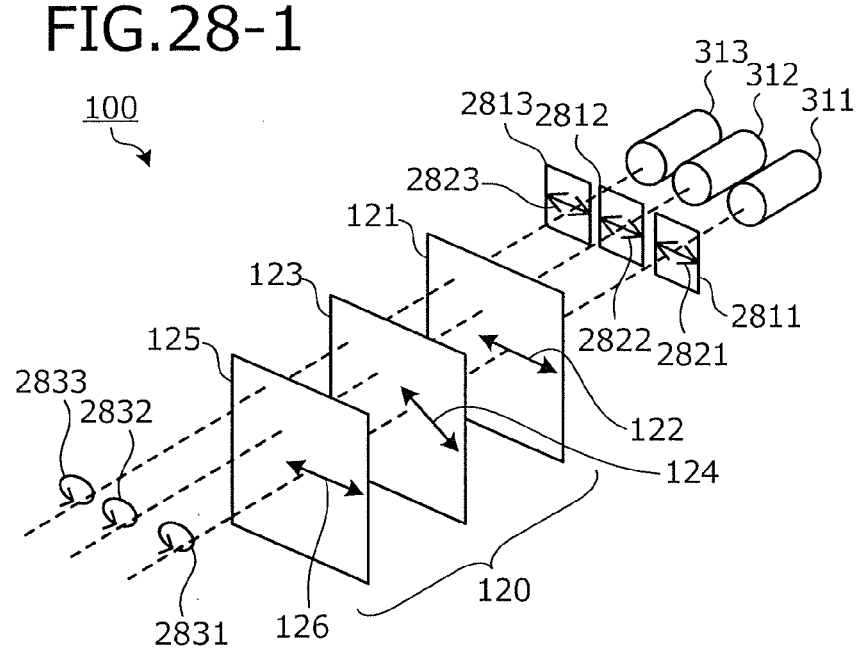
Figures 2, 28:
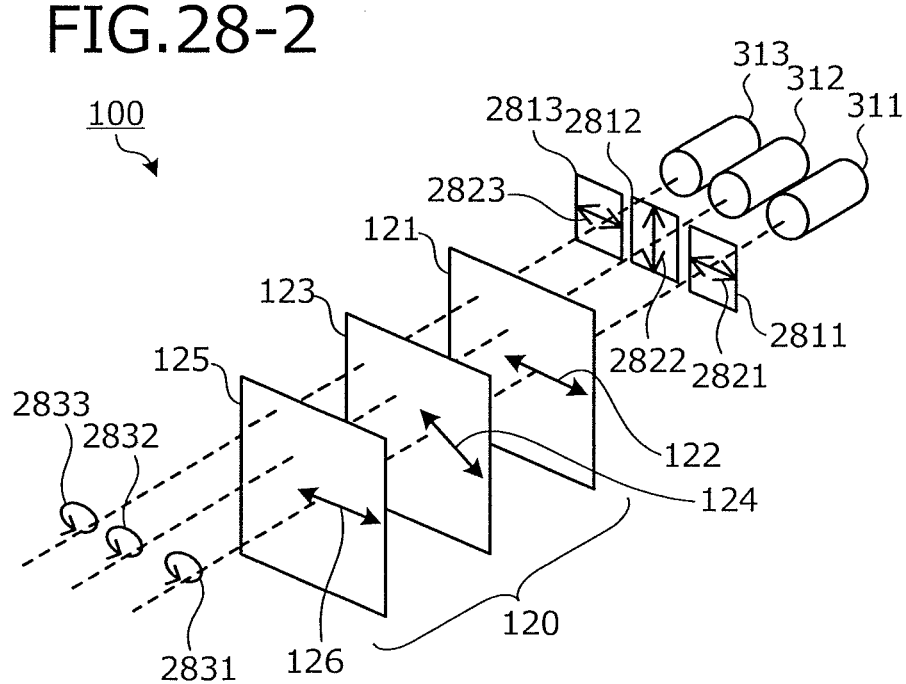

FIG. 28-1 is a perspective view of an example of the optical device. In FIG. 28-1, components identical to those depicted in FIG. 1-1 are denoted by the same reference numerals used in FIG. 1-1 and are omitted in further description. As depicted in FIG. 28-1, polarizing films 2811 to 2813 may be disposed between the red light source 311, green light source 312, and blue light source 313 and the liquid crystal device 120.

Beams of laser light output from the red light source 311, green light source 312, and blue light source 313 are incident onto the polarizing films 2811 to 2813, respectively. The polarizing film 2811 is a polarizer that out of laser light emitted from the red light source 311, transmits only the linear polarization component in a transmission polarization direction 2821 and sends the linear polarization component to the liquid crystal device 120. The polarizing film 2812 is a polarizer that out of laser light emitted from the green light source 312, transmits only the linear polarization component in a transmission polarization direction 2822 and sends the linear polarization component to the liquid crystal device 120.

The polarizing film 2813 is a polarizer that out of laser light emitted from the blue light source 313, transmits only the linear polarization component in a transmission polarization direction 2823 and sends the linear polarization component to the liquid crystal device 120. For example, when the retardation Γe is the same for respective wavelengths to be used, as in the first example of FIG. 23, the transmission polarization directions 2821 to 2823 of the linear polarization components transmitted by the polarizing films 2811 to 2813 are uniformly set in a given direction, as depicted in FIG. 28-1. As a result, respective wavelength components output from the liquid crystal device 120 can be brought into the same circular polarization state.

When the red light source 311, the green light source 312, and the blue light source 313 emit beams of linearly polarized laser light, the angles of the red light source 311, the green light source 312, and the blue light source 313 may be adjusted in advance so that the polarization directions of the beams of laser light from the red light source 311, the green light source 312, and the blue light source 313 substantially matches the transmission polarization directions 2821 to 2823, respectively. In this case, a configuration that omits the polarizing films 2811 to 2813 is possible. Such a configuration suppresses optical loss caused by the polarizing films 2811 to 2813.

Polarization directions 2831 to 2833 represent the polarization directions of respective wavelength components for red, green, and blue of laser light emitted from the liquid crystal device 120. In the example of FIG. 28-1, the polarization directions of respective wavelength components are set in the same direction of circular polarization.

FIG. 28-2 is a perspective view of another example of the optical device. In FIG. 28-2, components identical to those depicted in FIG. 28-1 are denoted by the same reference numerals used in FIG. 28-1 and are omitted in further description. For example, when the retardation Γe is ±π/2 for respective wavelengths to be used, as in the second example of FIG. 25, the transmission polarization directions 2821 to 2823 of the linear polarization components transmitted by the polarizing films 2811 to 2813 are shifted by 90 degrees with respect to one another, as depicted in FIG. 28-2.

In the second example of FIG. 25, the retardation Γe is π/2 for the wavelengths for blue and red and is 3π/2 (−π/2) for the wavelength for green. In this case, the transmission polarization directions 2821 and 2823 corresponding to red and blue are aligned while the transmission polarization direction 2822 corresponding to green is shifted by 90 degrees with respect to the transmission polarization directions 2821 and 2823. As a result, respective wavelength components output from the liquid crystal device 120 can be brought into the same circular polarization state.

In the optical device 100 of FIGS. 28-1 and 28-2, the polarization directions of beams of light incident on the liquid crystal device 120 and the direction of the phase delay axis of the wave plate 121 (first wave plate) are parallel or orthogonal to one another. For this reason, the wave plate 121 may be omitted from the optical device 100.

Figure 29:
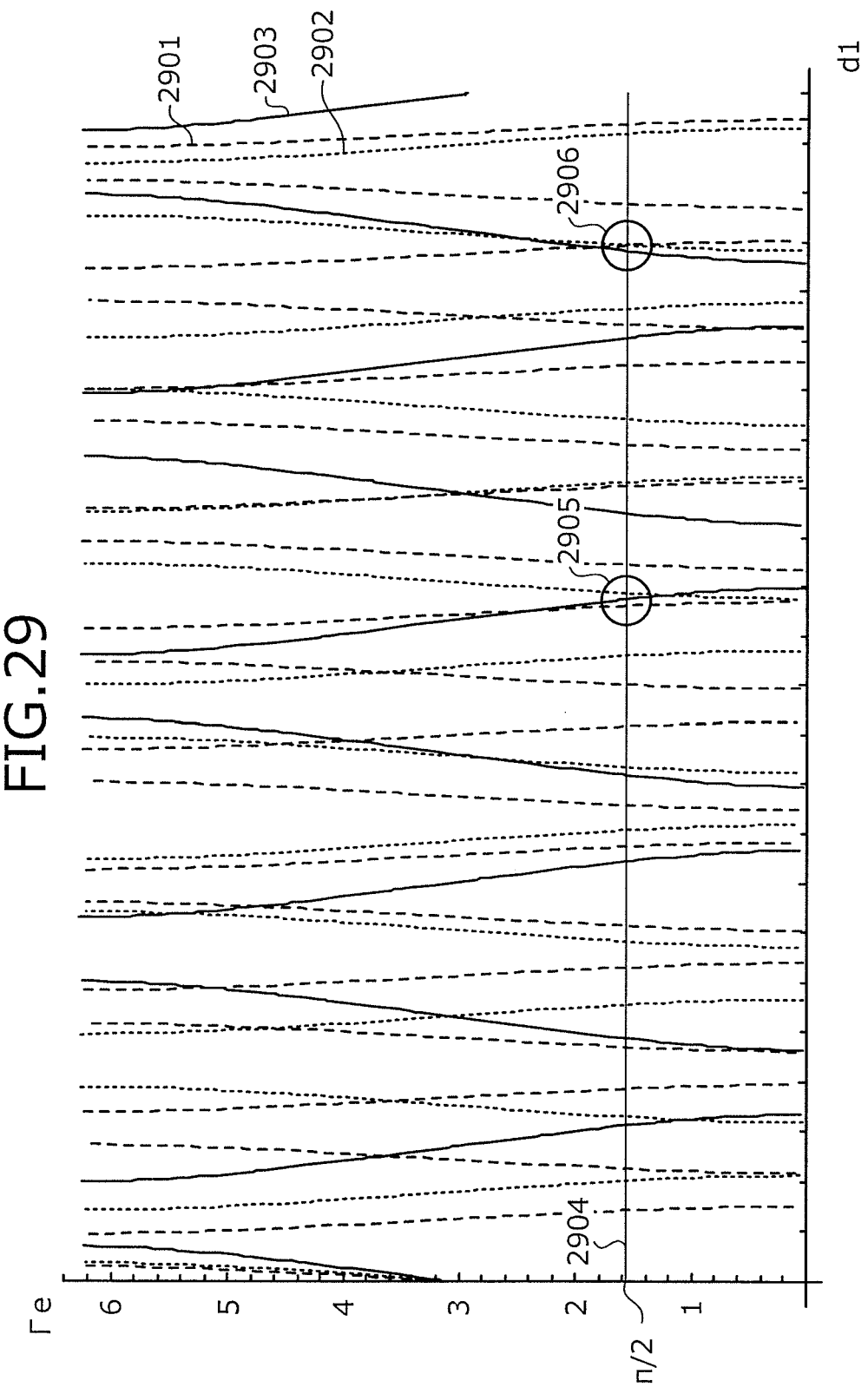
FIG. 29 is a graph of an example of retardation characteristics for thicknesses of the wave plates for respective wavelengths.

FIG. 29 is a graph of an example of retardation characteristics for the thicknesses of the wave plates for respective wavelengths. In FIG. 29, the horizontal axis represents the thickness d1 of the wave plates 121 and 125 and the vertical axis represents the retardation Γe by the liquid crystal device 120. Retardation characteristics 2901 to 2903 represent the characteristics of the retardation Γe for the thickness d1 of the wave plates 121 and 125 for the respective wavelengths for blue, green, and red. Retardation 2904 represents a retardation of π/2.

The manufacturing support apparatus according to the embodiment calculates the retardation Γe for each thickness d1 of the wave plates 121 and 125 for respective wavelength components, based on the refractive index $\Delta n1$ ($\lambda$) of the wave plates 121 and 125, the thickness d2 of the liquid crystal cell 123, the refractive index $\Delta n2$ ($\lambda$) of the liquid crystal cell 123, the azimuth Ψ between the wave plates 121 and 125 and the liquid crystal cell 123, and equations (15) or (16), and outputs the result of calculation of the retardation Γe for each thickness d1. For example, the manufacturing support apparatus outputs the result of calculation of the retardation Γe for each thickness d1 in the form of the graph of FIG. 29.

This allows the designer of the liquid crystal device 120 to select the thickness d1 of the wave plates 121 and 125 that brings the retardation Γe by the liquid crystal device 120 closer to an intended retardation for the respective wavelength components. For example, when thicknesses d1 corresponding to points indicated by reference numerals 2905 and 2906 are selected, the retardation Γe by the liquid crystal device 120 comes closer to π/2 for the respective wavelength components. Hence, the liquid crystal device 120 can be designed to work as the quarter wave plate for respective wavelength components.

<General Conditional Expressions>

The retardation Γe is expressed under condition of Ψ=67.5 degrees in equations (15) and (16). However, the retardation Γe for the wavelength $\lambda$ can be expressed in more general terms by equation (17). The thickness d1 of the wave plates 121 and 125 is, therefore, designed so that the retardation Γe calculated by equation (17) comes closer to ±π/2×(2n−1) for the respective wavelength components to be used. As a result, the liquid crystal device 120 is caused to work as the quarter wave plate for the respective wavelength components to be used.

$$\Gamma e = \arccos \left[ \cos^2 \Psi \cos \{2\pi \cdot \Delta n1(\lambda) \cdot d1/\lambda + \pi \cdot \Delta n2(\lambda) \cdot d2/\lambda\} + \sin^2 \Psi \cos \{2\pi \cdot \Delta n1(\lambda) \cdot d2/\lambda\} \right] \times 2 \quad (17)$$

In equation (17), from the Cauchy dispersion formula, the refractive index $\Delta n1$ ($\lambda$) of the wave plates 121 and 125 can be approximated by $a1+b1/\lambda^2+c1/\lambda^4 \ldots$, and the refractive index $\Delta n2$ ($\lambda$) of the liquid crystal cell 123 can be approximated by $a2+b2/\lambda^2+c2/\lambda^4 \ldots$.

Therefore, when coefficients specific to the material of the wave plates 121 and 125 are A1, A2, A3, . . . and Am (m denotes a natural number), the refractive index $\Delta n1$ ($\lambda$) of the wave plates 121 and 125 can be approximated at $A1+A2/\lambda^2+A3/\lambda^4+A4/\lambda^6 \ldots +A(m)/\lambda^{\wedge}(2(m-1))$. When coefficients specific to the material of the liquid crystal cell 123 are B1, B2, B3, . . . and Bm, the refractive index Δn2 (λ) of the liquid crystal cell 123 can be approximated at $B1+B2/\lambda^2+B3/\lambda^4+B4/\lambda^6 \ldots +B(m)/\lambda^{(2(m-1))}$.

In this manner, according to the manufacturing method of the embodiment, at a first determining step, the thickness d2 of the liquid crystal cell 123 is determined. At a second step, the azimuth Ψ between the slow axes of the wave plates 121 and 125 and the slow axis of the liquid crystal cell 123 is determined. Then at a third step, based on the result of determinations at the first and second steps, the thickness d1 of the wave plates 121 and 125 is determined to be the thickness that causes the liquid crystal device 120 to operate as the quarter wave plate for the respective wavelengths to be used. The first step and the second step may be switched in their order of execution.

Thus, the liquid crystal device 120 operates as the quarter wave plate for the respective wavelengths to be used, so that the irregularity of polarization directions for the respective wavelengths can be suppressed. As a result, for example, the projector 700 can control the polarization states of respective wavelength components of laser light more precisely. Hence, the irregularity of the extinction ratios of the respective wavelength components of laser light can be suppressed to improve the quality of an image created by projecting laser light on the screen.

The polarization states of the respective wavelength components can be changed, for example, to the clockwise circular polarization state and to the counterclockwise circular polarization state. This reduces speckles of the respective wavelength components of an image created by projecting laser light on the screen and thereby, further improves the image quality. By changing the polarization state of light for creating video, for example, to the clockwise circular polarization state and to the counterclockwise circular polarization state, a three-dimensional image can be generated using a circular polarization filter.

For respective wavelengths to be used, cases may arise where the thickness d1 of the wave plates 121 and 125 that sets the retardation Γe calculated by equation (17) to $\pm\pi/2\times(2n-1)$ cannot be determined. To deal with such a case, it is preferable that the material of the wave plates 121 and 125 and the liquid crystal device 120 be designed so that at least one thickness d1 of the wave plates 121 and 125 that sets the retardation Γe to $\pm\pi/2\times(2n-1)$ is present in each wavelength band of each of beams of laser light.

Each wavelength band of each beam of laser light can be determined such that, for example, the wavelength band of blue laser light is 435 to 480 [nm], the wavelength band of green laser light is 500 to 560 [nm], and the wavelength band of red laser right is 610 to 750 [nm].

Figure 30:
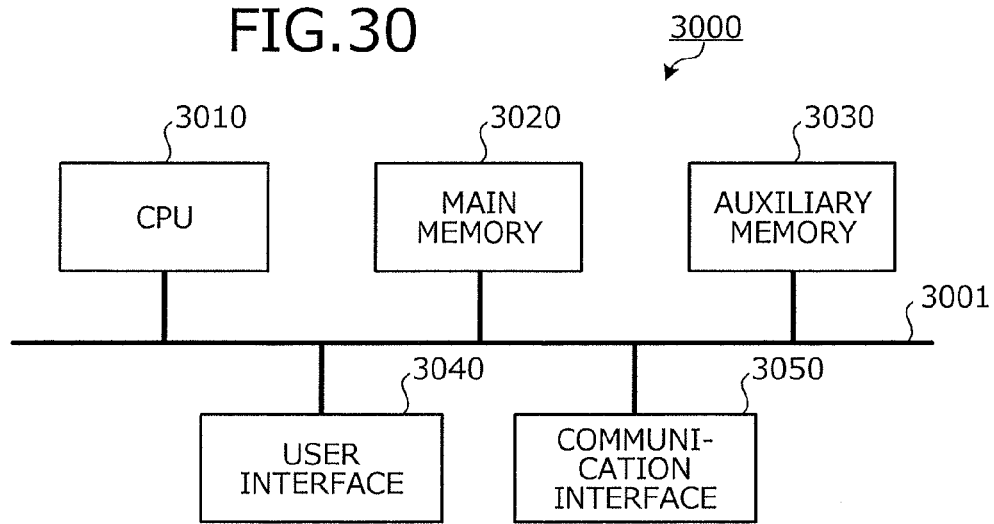
FIG. 30 is a diagram of an example of a hardware configuration of a manufacturing support apparatus according to the embodiment.

FIG. 30 is a diagram of an example of a hardware configuration of the manufacturing support apparatus according to the embodiment. The manufacturing support apparatus according to the embodiment can be, for example, implemented by an information processing apparatus 3000 depicted in FIG. 30. The information processing apparatus 3000 includes a CPU 3010, main memory 3020, auxiliary memory 3030, a user interface 3040, and a communication interface 3050. The CPU 3010, the main memory 3020, the auxiliary memory 3030, the user interface 3040, and the communication interface 3050 are respectively connected by a bus 3001.

The CPU 3010 (Central Processing Unit) governs overall control of the information processing apparatus 3000. The main memory 3020 is, for example, RAM (Random Access Memory). The main memory 3020 is used as a work area of the CPU 3010. The auxiliary memory 3030 is non-volatile memory such as a hard disk, an optical disk, flash memory, and the like. The auxiliary memory 3030 stores various types of programs that operate the information processing apparatus 3000. Programs stored in the auxiliary memory 3030 are loaded to the main memory 3020 and executed by the CPU 3010.

The user interface 3040 includes, for example, an input device that receives operational input from a user, and an output device that outputs information to the user. The input device may be implemented by, for example, a key (e.g., a keyboard), a remote controller, and the like. The output device may be implemented by, for example, a display, speakers, and the like. Further, the input device and the output device may be implemented by a touch panel and the like. The user interface 3040 is controlled by the CPU 3010.

The communication interface 3050 is an interface that, for example, performs wireless or wired communication with devices external to the information processing apparatus 3000. The communication interface 3050 is controlled by the CPU 3010.

For example, the auxiliary memory 3030 stores therein equations (15) or (16) and a computing program that performs computation using equations (15) or (16). Through the user interface 3040 and the communication interface 3050, various parameters for performing computation using equations (15) or (16) are input, the parameters including the thickness d2 of the liquid crystal cell 123, the azimuth Ψ, and wavelengths λB, λG, and λR to be used. The parameters input through the user interface 3040 and the communication interface 3050 are stored to the main memory 3020.

The CPU 3010 calculates the retardation Γe for each thickness d1 for respective wavelength components, using equations (15) or (16) and the computing program stored in the auxiliary memory 3030 and the parameters stored in the main memory 3020. The CPU 3010 then outputs the relation between the thickness d1 and the retardation Γe from the user interface 3040 and the communication interface 3050.

The configuration of the information processing apparatus 3000 is not limited to the above configuration. For example, equations (15) or (16) and the computing program may be stored in an external simulator and not in the information processing apparatus 3000. The information processing apparatus 3000, for example, may transmit the parameters to the external simulator through the communication interface 3050, receive the result of calculation of the retardation Γe for each thickness d1, and output the received calculation result.

<Case of Using Liquid Crystal Device as Half Wave Plate>

A case of using the liquid crystal device 120 as a half wave plate will be described. When the liquid crystal device 120 is used as the half wave plate, the thickness of the liquid crystal cell 123 must be controlled. It is therefore preferable to use the liquid crystal cell of FIGS. 8-1 to 8-4 which has electrodes formed radially, in a view of the traveling direction of laser light and whose thickness is controlled easily, as the liquid crystal cell 123.

To use the liquid crystal device 120 as the half wave plate, the retardation Γe by the liquid crystal device 120 should be determined to be $Γe=\pm\pi\times(2n-1)$ (n denotes a natural number, ±denotes + or −). It follows then cos (Γe/2)=0 and sin(Γe/2)=±1. The liquid crystal cell 123 is designed to operate as the half wave plate at a given wavelength (e.g., wavelength for green), in which case γ2=π is satisfied. Hence, sin(γ2/2)=1 results. The wave plates 121 and 125 are designed to operate as the quarter wave plates at a given wavelength (e.g., wavelength for green).

For example, to change the polarization direction to 0-degree linear polarization and to 90-degree linear polarization, Ψe=45 degrees should be satisfied. Equation (4) is simplified, using cos(Γe/2)=0, sin(Γe/2)=±1, and sin(γ2/2)=1, into sin (2Ψe)=sin(2Ψ)=1. This means, therefore, that the azimuth Ψ between the wave plates 121 and 125 and the liquid crystal cell 123 should be determined to be 45 degrees or 135 degrees, that is, determined to be $\Psi=\pi/4\times(2n-1)$.

Equation (10), $\Psi=\pi/4\times(2n-1)$, and the wavelength of each beam of laser light emitted from each light source are substituted in equation (3), and the material and thickness d2 of the liquid crystal cell 123 that bring the value of equation (3) closer to 0 are reselected. As a result, for the wavelength of each beam of laser light emitted from each light source, the If the refractive index $\Delta n$ is approximated by $a+b/\lambda^2+c/\lambda^4$ (first to third terms), $\gamma 1B$, $\gamma 1G$, $\gamma 1R$, $\gamma 2B$, $\gamma 2G$, and $\gamma 2R$ can be expressed as equations (14), using equation (10). Because the wave plates 121 and 125 operate as the quarter wave plates for a given wavelength (e.g., $\lambda G$), the thickness d1 of the wave plates 121 and 125 is determined by the coefficients a1, b1, and c1 and equations (14).

By transforming equations (18), the retardations $\Gamma e$ for the wavelengths $\lambda B$, $\lambda G$, and $\lambda R$ by the liquid crystal device 120 can be expressed as equations (20).

$$\Gamma e = \arccos\left[\begin{array}{l} \frac{1}{2}\cos\left(\frac{2\pi\cdot(a1+b1/\lambda B^2+c1/\lambda B^4)\cdot d1}{\lambda B} + \frac{2\pi\cdot(a2+b2/\lambda B^2+c2/\lambda B^4)\cdot d2}{2\lambda B}\right) + \\ \frac{1}{2}\cos\left(\frac{2\pi\cdot(a1+b1/\lambda B^2+c1/\lambda B^4)\cdot d1}{\lambda B} - \frac{2\pi\cdot(a2+b2/\lambda B^2+c2/\lambda B^4)\cdot d2}{2\lambda B}\right) \end{array}\right]\times 2 \quad (20)$$

$$\Gamma e = \arccos\left[\begin{array}{l} \frac{1}{2}\cos\left(\frac{2\pi\cdot(a1+b1/\lambda G^2+c1/\lambda G^4)\cdot d1}{\lambda G} + \frac{2\pi\cdot(a2+b2/\lambda G^2+c2/\lambda G^4)\cdot d2}{2\lambda G}\right) + \\ \frac{1}{2}\cos\left(\frac{2\pi\cdot(a1+b1/\lambda G^2+c1/\lambda G^4)\cdot d1}{\lambda G} - \frac{2\pi\cdot(a2+b2/\lambda G^2+c2/\lambda G^4)\cdot d2}{2\lambda G}\right) \end{array}\right]\times 2$$

$$\Gamma e = \arccos\left[\begin{array}{l} \frac{1}{2}\cos\left(\frac{2\pi\cdot(a1+b1/\lambda R^2+c1/\lambda R^4)\cdot d1}{\lambda R} + \frac{2\pi\cdot(a2+b2/\lambda R^2+c2/\lambda R^4)\cdot d2}{2\lambda R}\right) + \\ \frac{1}{2}\cos\left(\frac{2\pi\cdot(a1+b1/\lambda R^2+c1/\lambda R^4)\cdot d1}{\lambda R} - \frac{2\pi\cdot(a2+b2/\lambda R^2+c2/\lambda R^4)\cdot d2}{2\lambda R}\right) \end{array}\right]\times 2$$

liquid crystal device 120 (laminated wave plate) is caused to operate as the half wave plate.

For example, a case is assumed where the azimuth $\Psi$ between the wave plates 121 and 125 and the liquid crystal cell 123 is determined to be 45 degrees. In this case, substituting $\Psi=\pi/4$, $\gamma 1=\gamma 1B$, $\gamma 1G$, $\gamma 1R$, and $\gamma 2=\gamma 2B$, $\gamma 2G$, $\gamma 2R$ in equation (3) gives equations (18).

$$\cos(\Gamma e/2) = \frac{1}{2}\cos(\gamma 1B + \gamma 2B/2) + \frac{1}{2}\cos(\gamma 1B - \gamma 2B/2) \quad (18)$$

$$\cos(\Gamma e/2) = \frac{1}{2}\cos(\gamma 1G + \gamma 2G/2) + \frac{1}{2}\cos(\gamma 1G - \gamma 2G/2)$$

$$\cos(\Gamma e/2) = \frac{1}{2}\cos(\gamma 1R + \gamma 2R/2) + \frac{1}{2}\cos(\gamma 1R - \gamma 2R/2)$$

Equations (18) can be transformed into equations (19), using a product-sum formula.

$$\cos(\Gamma e/2) = \frac{1}{2}\cos(\gamma 1B + \gamma 2B/2) + \frac{1}{2}\cos(\gamma 1B - \gamma 2B/2) \quad (19)$$
$$= \frac{1}{2}\{\cos(\gamma 1B + \gamma 2B/2) + \cos(\gamma 1B - \gamma 2B/2)\}$$
$$= \cos(\gamma 1B)\cos(\gamma 2B/2)$$

$$\cos(\Gamma e/2) = \frac{1}{2}\cos(\gamma 1G + \gamma 2G/2) + \frac{1}{2}\cos(\gamma 1G - \gamma 2G/2)$$
$$= \frac{1}{2}\{\cos(\gamma 1G + \gamma 2G/2) + \cos(\gamma 1G - \gamma 2G/2)\}$$
$$= \cos(\gamma 1G)\cos(\gamma 2G/2)$$

$$\cos(\Gamma e/2) = \frac{1}{2}\cos(\gamma 1R + \gamma 2R/2) + \frac{1}{2}\cos(\gamma 1R - \gamma 2R/2)$$
$$= \frac{1}{2}\{\cos(\gamma 1R + \gamma 2R/2) + \cos(\gamma 1R - \gamma 2R/2)\}$$
$$= \cos(\gamma 1R)\cos(\gamma 2R/2)$$

Equations (20) can be transformed into equations (21), using a product-sum formula.

$$\Gamma e = \arccos\left[\cos\left(\frac{2\pi\cdot(a1+b1/\lambda B^2+c1/\lambda B^4)\cdot}{\lambda B}\right)\right. \quad (21)$$
$$\left.\cos\left(\frac{2\pi\cdot(a2+b2/\lambda B^2+c2/\lambda B^4)\cdot d2}{2\lambda B}\right)\right]\times 2$$

$$\Gamma e = \arccos\left[\cos\left(\frac{2\pi\cdot(a1+b1/\lambda G^2+c1/\lambda G^4)\cdot}{\lambda G}\right)\right.$$
$$\left.\cos\left(\frac{2\pi\cdot(a2+b2/\lambda G^2+c2/\lambda G^4)\cdot d2}{2\lambda G}\right)\right]\times 2$$

$$\Gamma e = \arccos\left[\cos\left(\frac{2\pi\cdot(a1+b1/\lambda R^2+c1/\lambda R^4)\cdot}{\lambda R}\right)\right.$$
$$\left.\cos\left(\frac{2\pi\cdot(a2+b2/\lambda R^2+c2/\lambda R^4)\cdot d2}{2\lambda R}\right)\right]\times 2$$

The thickness d2 of the liquid crystal cell 123, therefore, is selected so that the retardation $\Gamma e$ for the wavelengths $\lambda B$, $\lambda G$, and $\lambda R$ in equations (19) or (20) comes closer to $\pm\pi/2\times(2n-1)$. As a result, the liquid crystal device 120 (laminated wave plate) is caused to operate as the half wave plate for respective wavelength components, i.e., the wavelengths $\lambda B$, $\lambda G$, and $\lambda R$.

Figure 31:
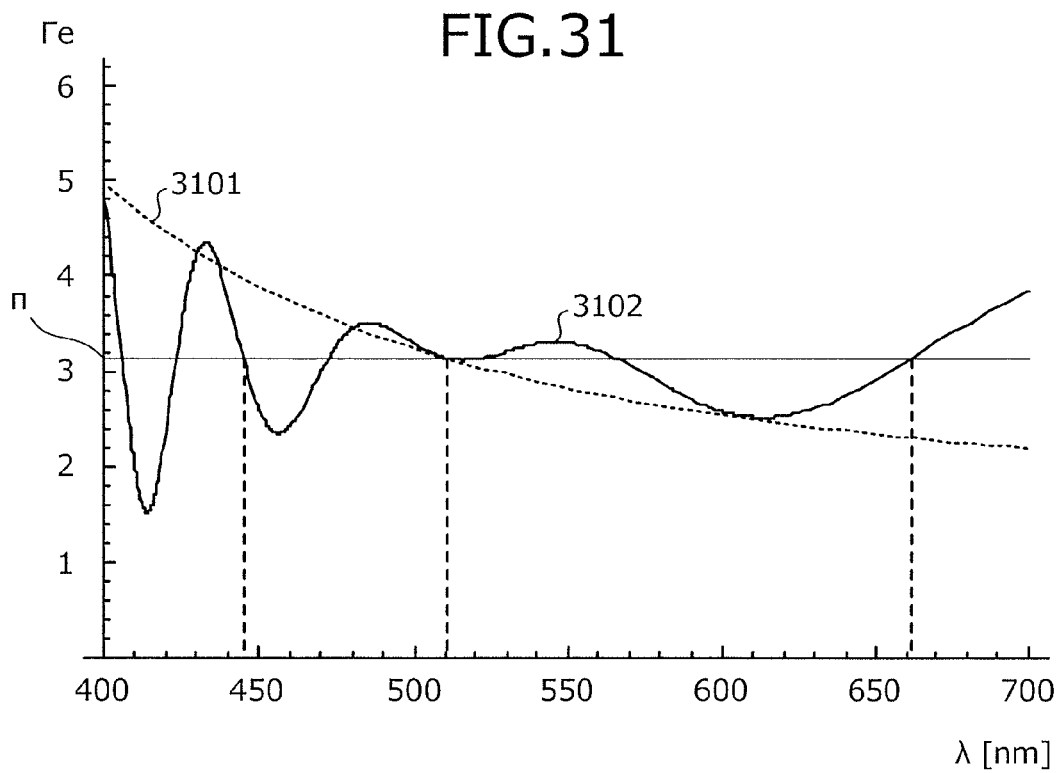
FIG. 31 is a graph of an example of characteristics of retardation for wavelengths in a case of using the liquid crystal device as a half wave plate.

FIG. 31 is a graph of an example of the characteristics of retardation for wavelengths in a case of using the liquid crystal device as the half wave plate. In FIG. 31, the horizontal axis represents the wavelength $\lambda$ [nm] of light and the vertical axis represents the retardation $\Gamma e$ (phase difference) by the liquid crystal device 120. Retardation characteristics 3101 are indicated as reference data representing the characteristics of change of the retardation $\Gamma e$ for wavelengths in a case where the liquid crystal cell 123 is assumed to be a single liquid crystal cell operating as the half wave plate.

Retardation characteristics 3102 represent the characteristics of change of the retardation $\Gamma e$ for wavelengths at the liquid crystal device 120 composed of the wave plates 121 and 125 and the liquid crystal cell 123. As indicated by the retardation characteristics 3102, at the liquid crystal device 120 composed of the wave plates 121 and 125 and the liquid crystal cell 123, the retardation Γe changes cyclically for wavelengths.

In this example, a wavelength corresponding to blue laser light is 448 [nm], a wavelength corresponding to green laser light is 510 [nm], and a wavelength corresponding to red laser light is 660 [nm]. For the wavelength of 448 [nm] corresponding to blue laser light, the retardation Γe is about π. For the wavelength of 510 [nm] corresponding to green laser light and the wavelength of 660 [nm] corresponding to red laser light, the retardation Γe is also about π.

In this manner, by determining the thickness d2 of the liquid crystal cell 123 so that the retardation Γe takes an intended value for multiple wavelengths to be used, the liquid crystal device 120 is caused to operate as the half wave plate for the respective wavelength components to be used.

Figure 32:
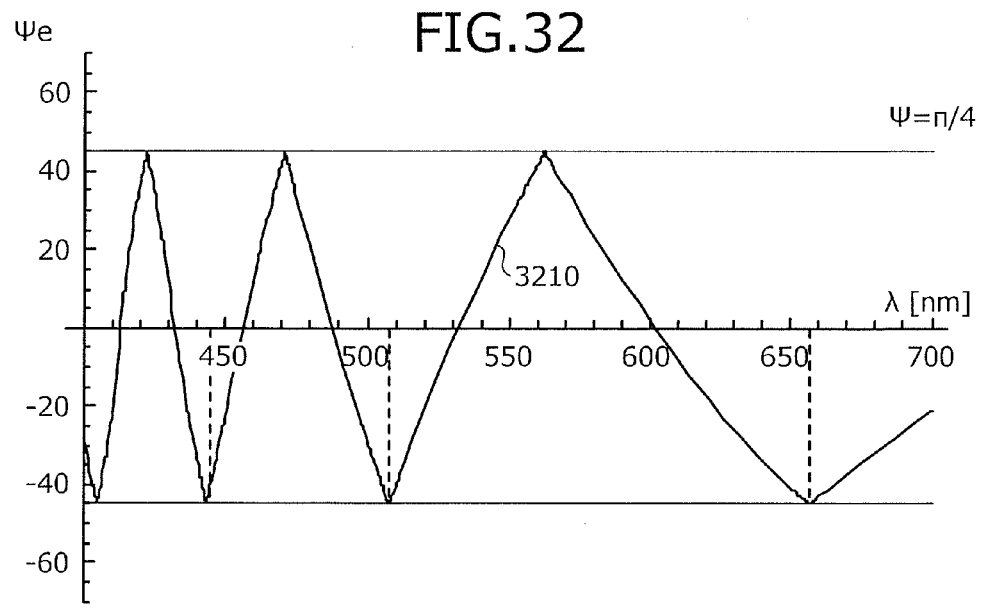
FIG. 32 is a graph of a first example of the characteristics of the azimuth ($\Psi=\pi/4$) in a case of using the liquid crystal device as the half wave plate.

FIG. 32 is a graph of a first example of the characteristics of the azimuth (Ψ=π/4) in the case of using the liquid crystal device as the half wave plate. In FIG. 32, the horizontal axis represents the wavelength λ [nm] of light and the vertical axis represents the azimuth Ψe of the liquid crystal device 120.

Azimuth characteristics 3210 of FIG. 32 represent the characteristics of change of the azimuth Ψe for wavelengths in a case where in the liquid crystal device 120, the azimuth Ψ between the slow axes of the wave plates 121 and 125 and the slow axis of the liquid crystal cell 123 is determined to be Ψ=π/4. As indicated by the azimuth characteristics 3210, when Ψ=π/4 is satisfied, the azimuth Ψe of the liquid crystal device 120 is about −45 degrees for the respective wavelengths to be used (448 [nm], 510 [nm], and 660 [nm]).

As depicted in FIGS. 31 to 32, by properly determining the thickness d2 of the liquid crystal cell 123, the retardation Γe by the liquid crystal device 120 can be set to n and the azimuth Ψe of the liquid crystal device 120 can be set to ±45 degrees for respective wavelengths to be used (448 [nm], 510 [nm], and 660 [nm]). Hence, by making the polarization directions of incident beams of light of the respective wavelengths uniform, the respective wavelength components output from the liquid crystal device 120 can be brought into the same state of linear polarization resulting from 90 degree rotation of 0-degree incident linear polarization.

When the liquid crystal device 120 is used as the half wave plate, the thickness d2 of the liquid crystal cell 123 is determined, using the manufacturing support apparatus, so that the retardation Γe calculated by equation (17) comes closer to ±π×(2n−1) for respective wavelengths to be used. As a result, the liquid crystal device 120 is caused to operate as the half wave plate for respective wavelengths to be used.

For example, the CPU 3010 calculates the retardation Γe for each thickness d2 for respective wavelength components, using equations (15) or (16) and the computing program stored in the auxiliary memory 3030 and the parameters stored in the main memory 3020. The CPU 3010 then outputs from the user interface 3040 and the communication interface 3050, the relation between the thickness d2 and the retardation Γe.

In this manner, according to the manufacturing method of the embodiment, at a first determining step, the thickness d1 of the wave plates 121 and 125 is determined. At a second step, the azimuth Ψ between the slow axes of the wave plates 121 and 125 and the slow axis of the liquid crystal cell 123 is determined. Then at a third step, based on the result of determinations at the first and second steps, the thickness d2 of the liquid crystal cell 123 is determined to be the thickness that causes the liquid crystal device 120 to operate as the half wave plate for the respective wavelengths to be used. The first step and the second step may be switched in their order of execution.

Through these steps, the liquid crystal device 120 works as the half wave plate for respective wavelengths to be used, so that the irregularity of polarization directions for respective wavelengths can be suppressed. As a result, for example, the projector 700 can control the polarization states of respective wavelength components of laser light more precisely. Hence, the irregularity of the extinction ratios of respective wavelength components of laser light can be suppressed to improve the quality of an image created by projecting laser light on the screen.

The polarization states of respective wavelength components can be changed, for example, to the zero-degree linear polarization state and to the 90-degree linear polarization state. This reduces speckles of the respective wavelength components of an image created by projecting laser light on the screen, thereby further improving the image quality. By changing the polarization state of light for creating video, for example, to the zero-degree linear polarization state and to the 90-degree linear polarization state, a three-dimensional image can be generated using a linear polarization filter.

For respective wavelengths to be used, the thickness d2 of the liquid crystal cell 123 that sets the retardation Γe calculated by equation (17) to ±π×(2n−1) cannot be determined in some cases. To deal with such a case, it is preferable that the material of the wave plates 121 and 125 and the liquid crystal device 120 be designed so that at least one thickness d2 of the liquid crystal cell 123 that sets the retardation Γe to ±π×(2n−1) is present in each wavelength band of each beam of laser light.

(Specific Example of Liquid Crystal Cell Provided by Using Ferroelectric Liquid Crystal)

A specific example of the liquid crystal cell 123 provided by using a ferroelectric liquid crystal in place of the liquid crystal having the electrode shapes of FIGS. 8-1 to 8-4 will be described. A case of using the ferroelectric liquid crystal as the liquid crystal cell 123 will be described.

Figure 33:
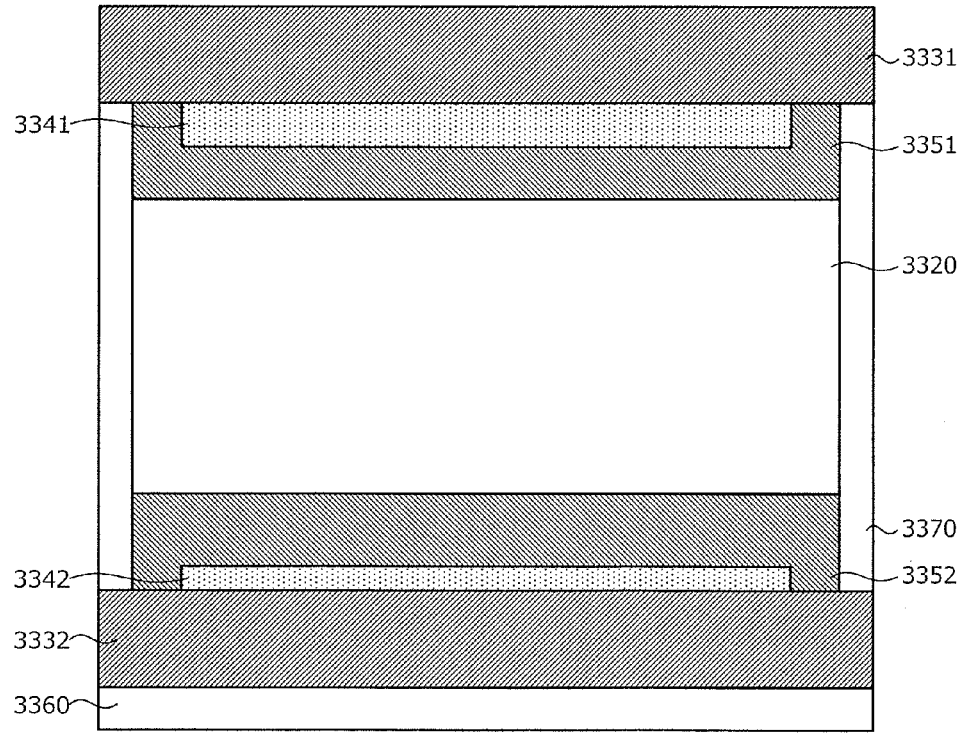
FIG. 33 is a sectional view of a specific example of a ferroelectric liquid crystal cell provided by using a ferroelectric liquid crystal.

FIG. 33 is a sectional view of a specific example of the liquid crystal cell provided by using a ferroelectric liquid crystal. As depicted in FIG. 33, the liquid crystal cell 123 includes, for example, a pair of glass substrates 3331 and 3332 sandwiching a liquid crystal layer 3320 of about 2 [μm] in thickness, and a sealing material 3370 bonding the two glass substrates 3331 and 3332. Electrodes 3341 and 3342 are formed on counter surfaces of the glass substrates 3331 and 3332, respectively. Orientation films 3351 and 3352 are formed on the electrodes 3341 and 3342, respectively, as a result of orientation treatment. The electrodes 3341 and 3342 are, for example, common plane electrodes, such as ITO.

When the liquid crystal device 120 is used as a reflective liquid crystal device, a reflective plate 3360 is disposed outside the glass substrate 3332.

Light from the wave plate 121 is incident on the first glass substrate 3331. This incident light passes through the first glass substrate 3331, the electrode 3341, the orientation film 3351, the liquid crystal layer 3320, the orientation film 3352, the electrode 3342, and the second glass substrate 3332 to reach the reflective plate 3360, where the light is reflected to travel the incident light path backward and exit the first glass substrate 3331 and fall onto the wave plate 121.

The liquid crystal cell 123 depicted in FIG. 33 and configured to omit the reflective plate may be used as, for example, the transmission-type liquid crystal cell 123 of FIGS. 1-1 to 1-6.

Figure 34:
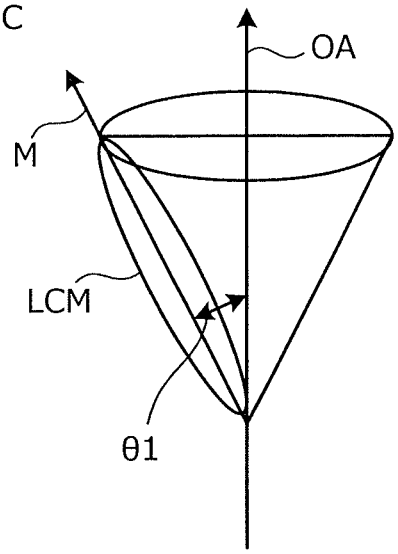
FIG. 34 is a diagram (1) of a ferroelectric liquid crystal molecule as seen from a laser light incident side.
Figure 35:
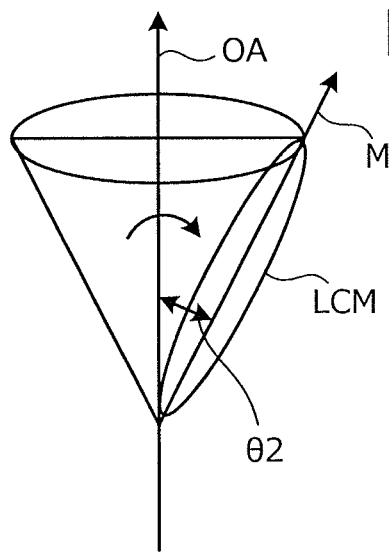
FIG. 35 is a diagram (2) of a ferroelectric liquid crystal molecule as seen from a laser light incident side.

The electro-optical effect of the ferroelectric liquid crystal will be described. FIGS. 34 and 35 are explanatory diagrams of the relation between the molecular major axis direction of the ferroelectric liquid crystal and an electric field. FIGS. 34 and 35 diagrammatically show a liquid crystal molecule seen from the laser light incident side. The average molecular major axis direction of the liquid crystal will be described referring to FIGS. 34 and 35.

As depicted in FIG. 34, when an electric field E is applied from the front of the diagram (the first glass substrate 3331 of the liquid crystal cell 123) toward the back of the diagram (the second glass substrate 3332 of the liquid crystal cell 123), an average molecular major axis direction M resulting in the first ferroelectric state of a liquid crystal molecule LCM is stable in a position tilted by "θ1" with respect to the orientation axis OA of the orientation film. When the electric field E is applied from the back of the diagram toward the front of the diagram, as depicted in FIG. 35, the average molecular major axis direction M resulting in the second ferroelectric state of the liquid crystal molecule LCM is stable in a position moved clockwise around the orientation axis OA of the orientation film and tilted by "θ2" with respect to the orientation axis OA.

This means that the liquid crystal molecule LCM shifts position along the side face of a conic shape drawn by the molecular major axis direction M as a motion line. The sum of the angles "θ1" and "θ2" (θ1+θ2) is equivalent to an angle between the average molecular major axis direction of the liquid crystal in the first ferroelectric state and the average molecular major axis direction of the liquid crystal in the second ferroelectric state, that is, the central angle θ of the cone (i.e., cone angle). By considering various materials to be selected as the material of the ferroelectric liquid crystal, the central angle θ can be set to 45 degrees. As a result, the director direction 124 (direction of the liquid crystal molecule) can be shifted to the direction parallel to the substrate surface of the liquid crystal cell 123.

The wave plates 121 and 125 described above can be made of a liquid crystal element. To enable application of a voltage into the liquid crystal element, electrodes are formed on both surfaces of a liquid crystal layer. As a result, the voltage applied to the liquid crystal element is controlled, which allows fine adjustment of the phase difference caused by the wave plates 121 and 125. In addition, the design and manufacture of the wave plates 121 and 125 become easy, which makes it possible to deal with changes in the operating environment, such as a wavelength shift of laser light caused by a temperature change.

As described above, according to the optical device, the projector, the manufacturing method, and the manufacturing support apparatus, a device can be reduced in size, while drops in image quality are suppressed.

The optical device, the projector, the manufacturing method, and the manufacturing support apparatus described above are used preferably as an optical device, a projector, a manufacturing method, and a manufacturing support apparatus for shooting video or generating images, and are particularly applicable to a small-sized optical device, such as pico-projector.

EXPLANATIONS OF LETTERS OR NUMERALS 100 optical device
101, 810, 820, 830, 840 polarization direction
102-105 polarization state
110 light source unit
111 RGB laser light source
112, 314-316, 318, 530, 550 polarization-maintaining fiber
120 liquid crystal device
121, 125 wave plate
122, 126, 2201 slow axis orientation
123 liquid crystal cell
124 director direction
127, 128 phase difference film
130 control circuit
201, 202 chromatic dispersion characteristics
210, 2301, 2302, 2721-2723, 2731-2733, 2751-2753, 2771-2773, 2901, 3101, 3102 retardation characteristics
311 red light source
312 green light source
313 blue light source
317 combiner
321, 521, 1010 mirror
322, 323 dichroic mirror
400, 500, 600, 710 video engine
410, 440, 510, 610 lens
420 polarizing beam splitter
430 LCOS
520 MEMS mirror
522, 523 rotating shaft
541, 543, 560 collimator lens
542, 544 resin
620 DLP
700 projector
720 control board
721 light source controller
722 liquid crystal element controller
723 LCOS controller
724 control unit
725 video signal processing unit
730 power supply
811-818, 821-824, 831-834, 841-848, 3341, 3342 electrode
901-903 laser light
920 screen
930 three-dimensional glasses
931, 932 glass
1101-1104 state
1110 director
1320, 1520, 1900 table
1411-1418, 1601-1608 waveform
1700, 1800, 2001-2008 electric field distribution
1701-1710 area
2410, 2420, 2741-2743, 2761-2763, 2781-2783, 3210 azimuth characteristics
2811-2813 polarizing film
2821-2823 transmission polarization direction
2904 retardation
3320 liquid crystal layer
3331, 3332 glass substrate
3351, 3352 orientation film
3360 reflective plate
3370 sealing material

The invention claimed is:

1. An optical device comprising:
a liquid crystal cell that transmits laser light that is in a state of polarization of a given direction and of a given wavelength, the liquid crystal cell being capable of shifting a direction of a director with respect to the given direction by rotating the direction of the director parallel to a substrate surface;
a wave plate that transmits laser light emitted from the liquid crystal cell, the wave plate having a phase delay axis set in an arbitrary direction; and a control circuit that cyclically shifts the direction of the director, wherein
the optical device outputs the laser light that has passed through the wave plate and the liquid crystal cell,
the laser light includes a plurality of beams of laser light differing in wavelength, and
a thickness of the wave plate is adjusted to a thickness that causes a laminated wave plate composed of the wave plate and the liquid crystal cell to operate, in a vicinity of each of the differing wavelengths, as a quarter wave plate.

2. The optical device according to claim 1, wherein
the laser light includes a beam of light having a wavelength $\lambda 1$ and a beam of light having a wavelength $\lambda 2$ different from the wavelength $\lambda 1$,
the wave plate has a thickness d1 and a refractive index $\Delta n1$ ($\lambda$) that changes depending on a wavelength $\lambda$ of light passing through the wave plate,
the liquid crystal cell has a thickness d2 and a refractive index $\Delta n2$ ($\lambda$) that changes depending on a wavelength $\lambda$ of light passing through the liquid crystal cell, and
the thickness d1 of the wave plate is adjusted when an angle between a phase delay axis of the wave plate and a phase delay axis of the liquid crystal cell is $\Psi$ so that an equation below yields $\pm\pi/2 \times (2n-1)$ (n denotes a natural number) when $\lambda=\lambda 1$ and when $\lambda=\lambda 2$ $$\arccos\left[\cos^2\Psi \cos\{2\pi\cdot\Delta n1(\lambda)\cdot d1/\lambda + \pi\cdot\Delta n2(\lambda)\cdot d2/\lambda\} + \sin^2\Psi \cos\{2\pi\cdot\Delta n1(\lambda)\cdot d1/\lambda - \pi\cdot\Delta n2(\lambda)\cdot d2/\lambda\}\right] \times 2.$$

3. The optical device according to claim 2, wherein
the refractive index $\Delta n1$ ($\lambda$) is approximated by $A1 + A2/\lambda^2 + A3/\lambda^4 + A4/\lambda^6 \ldots + Am/\lambda^{\wedge}(2(m-1))$ (A1, A2, A3, ... Am denote coefficients specific to a material of the wave plate and m denotes a natural number) and the refractive index $\Delta n2$ ($\lambda$) is approximated by $B1 + B2/\lambda^2 + B3/\lambda^4 + B4/\lambda^6 \ldots + Bm/\lambda^{\wedge}(2(m-1))$ (B1, B2, B3, ... Bm denote coefficients specific to a material of the liquid crystal cell).

4. The optical device according claim 1, wherein
a second wave plate identical in configuration to the wave plate is disposed upstream to a side of the liquid crystal cell where laser light is incident.

5. The optical device according to claim 1, wherein
any one among the wave plate and the second wave plate is a liquid crystal element to which voltage can be applied.

6. The optical device according claim 1, comprising a mirror that reflects back to the liquid crystal cell, the laser light that has passed through the liquid crystal cell, wherein
the wave plate transmits the laser light before the laser light is incident to the liquid crystal cell and transmits the laser light that has been reflected by the mirror and that has again passed through the liquid crystal cell.

7. The optical device according to claim 1, wherein
the direction of the director can be shifted to 67.5 degrees and to 112.5 degrees with respect to the given direction.

8. The optical device according to claim 1, wherein
the direction of the director can be shifted to 0 degrees and to 45 degrees with respect to the given direction.

9. The optical device according claim 1, further comprising a light source unit that emits the laser light in the state of polarization of the given direction and having a given wavelength, wherein
the light source unit includes:
light sources that emit respective beams of red laser light, green laser light, and blue laser light; and
a light-combining unit that combines the beams of laser light emitted respectively from the light sources.

10. An optical device comprising:
a liquid crystal cell that transmits laser light that is in a state of polarization of a given direction and of a given wavelength, the liquid crystal cell being capable of shifting a direction of a director with respect to the given direction by rotating the direction of the director parallel to a substrate surface;
a wave plate that transmits laser light emitted from the liquid crystal cell, the wave plate having a phase delay axis set in an arbitrary direction; and
a control circuit that cyclically shifts the direction of the director, wherein
the optical device outputs the laser light that has passed through the wave plate and the liquid crystal cell,
the laser light includes a plurality of beams of laser light differing in wavelength, and
a thickness of the liquid crystal cell is adjusted to a thickness that causes a laminated wave plate composed of the wave plate and the liquid crystal cell to operate, in a vicinity of each of the differing wavelengths, as a half wave plate.

11. The optical device according to claim 10, wherein
the laser light includes a beam of light having a wavelength $\lambda 1$ and a beam of light having a wavelength $\lambda 2$ different from the wavelength $\lambda 1$,
the wave plate has a thickness d1 and a refractive index $\Delta n1$ ($\lambda$) that changes depending on a wavelength $\lambda$ of light passing through the wave plate,
the liquid crystal cell has a thickness d2 and a refractive index $\Delta n2$ ($\lambda$) that changes depending on a wavelength $\lambda$ of light passing through the liquid crystal cell, and
the thickness d2 of the liquid crystal cell is adjusted when an angle between a phase delay axis of the wave plate and a phase delay axis of the liquid crystal cell is $\Psi$ so that an equation below yields $\pm\pi\times(2n-1)$ (n denotes a natural number) when $\lambda=\lambda 1$ and when $\lambda=\lambda 2$ $$\arccos\left[\cos^2\Psi \cos\{2\pi\cdot\Delta n1(\lambda)\cdot d1/\lambda + \pi\cdot\Delta n2(\lambda)\cdot d2/\lambda\} + \sin^2\Psi \cos\{2n\cdot\Delta n1(\lambda)\cdot d1/\lambda - \pi\cdot\Delta n2(\lambda)\cdot d2/\lambda\}\right] \times 2.$$

12. The optical device according to claim 11, wherein
the refractive index $\Delta n1(\lambda)$ is approximated by $A1 + A2/\lambda^2 + A3/\lambda^4 + A4/\lambda^6 \ldots + Am/\lambda^{\wedge}(2(m-1))$ (A1, A2, A3, ... Am denote coefficients specific to a material of the wave plate and m denotes a natural number) and the refractive index $\Delta n2$ ($\lambda$) is approximated by $B1 + B2/\lambda^2 + B3/\lambda^4 + B4/\lambda^6 \ldots + Bm/\lambda^{\wedge}(2(m-1))$ (B1, B2, B3, ... Bm denote coefficients specific to a material of the liquid crystal cell).

13. The optical device according claim 10, wherein
a second wave plate identical in configuration to the wave plate is disposed upstream to a side of the liquid crystal cell where laser light is incident.

14. The optical device according claim 10, wherein
any one among the wave plate and the second wave plate is a liquid crystal element to which voltage can be applied.

15. The optical device according claim 10, comprising a mirror that reflects back to the liquid crystal cell, the laser light that has passed through the liquid crystal cell, wherein
the wave plate transmits the laser light before the laser light is incident to the liquid crystal cell and transmits the laser light that has been reflected by the mirror and that has again passed through the liquid crystal cell.

16. The optical device according to claim 10, wherein
the direction of the director can be shifted to 67.5 degrees and to 112.5 degrees with respect to the given direction.

17. The optical device according claim 10, wherein
the direction of the director can be shifted to 0 degrees and to 45 degrees with respect to the given direction.

18. A manufacturing method of an optical device that includes a liquid crystal cell that transmits a plurality of laser light beams that are in a state of polarization of a given direction and have differing wavelengths, the liquid crystal being capable of shifting a direction of a director with respect to the given direction, the optical device further including a wave plate that has a phase delay axis set in an arbitrary direction and that transmits the laser light that has passed through the liquid crystal cell, the optical device outputting the laser light that has passed through the wave plate and the liquid crystal cell, the manufacturing method comprising:
 a first determining step of determining a thickness of the liquid crystal cell;
 a second determining step of determining an angle between a phase delay axis of the wave plate and a phase delay axis of the liquid crystal cell; and
 a third determining step of determining based on the thickness of the liquid crystal cell determined at the first determining step and on the angle between the phase delay axes determined at the second step, a thickness of the wave plate to be a thickness that causes a laminated wave plate composed of the wave plate and the liquid crystal cell to work as a quarter wave plate for respective wavelengths of emitted beams of light.

19. The manufacturing method according to claim 18, wherein
the wave plate has a refractive index $\Delta n1(\lambda)$ that changes depending on a wavelength $\lambda$ of light passing through the wave plate,
the liquid crystal cell has a refractive index $\Delta n2(\lambda)$ that changes depending on a wavelength $\lambda$ of light passing through the liquid crystal cell, and
at the third determining step, a thickness d1 of the wave plate is determined based on a thickness d2 of the liquid crystal cell determined at the first determining step and on an angle $\Psi$ between the phase delay axes determined at the second step, so that an equation below yields $\pm\pi/2\times(2n-1)$ (n denotes a natural number) when $\kappa=\lambda 1$ and when $\lambda=\lambda 2$ $$\arccos\,[\cos^2\Psi \times \cos\,\{2\pi\cdot\Delta n1(\lambda)\cdot d1/\lambda + \pi\cdot\Delta n2(\lambda)\cdot d2/\lambda\} + \sin^2\Psi\,\cos\,\{2\pi\cdot\Delta n1(\lambda)\cdot d1/\lambda - \pi\cdot\Delta n2(\lambda)\cdot d2/\lambda\}]\times 2.$$

20. A manufacturing method of an optical device that includes a liquid crystal cell that transmits a plurality of laser light beams that are in a state of polarization of a given direction and have differing wavelengths, the liquid crystal being capable of shifting a direction of a director with respect to the given direction, the optical device further including a wave plate that has a phase delay axis set in a predetermined direction and that transmits the laser light that has passed through the liquid crystal cell, the optical device outputting the laser light that has passed through the wave plate and the liquid crystal cell, the manufacturing method comprising:
 a first determining step of determining a thickness of the wave plate;
 a second determining step of determining an angle between a phase delay axis of the wave plate and a phase delay axis of the liquid crystal cell; and
 a third determining step of determining based on the thickness of the wave plate determined at the first determining step and on the angle between the phase delay axes determined at the second step, a thickness of the liquid crystal cell to be a thickness that causes a laminated wave plate composed of the wave plate and the liquid crystal cell to work as a half wave plate for respective wavelengths of emitted beams of light.

21. The manufacturing method according to claim 20, wherein
the wave plate has a refractive index $\Delta n1(\lambda)$ that changes depending on a wavelength $\lambda$ of light passing through the wave plate,
the liquid crystal cell has a refractive index $\Delta n2(\lambda)$ that changes depending on a wavelength $\lambda$ of light passing through the liquid crystal cell, and
at the third determining step, a thickness d2 of the liquid crystal cell is determined based on a thickness d1 of the wave plate determined at the first determining step and on an angle $\Psi$ between the phase delay axes determined at the second step, so that an equation below yields $\pm\pi\times(2n-1)$ (n denotes a natural number) when $\lambda=\lambda 1$ and when $\lambda=\lambda 2$ $$\arccos\,[\cos^2\Psi\,\cos\,\{2\pi\text{---}\Delta n1(\lambda)\cdot d1/\lambda + \pi\cdot\Delta n2(\lambda)\cdot d2/\lambda\} + \sin^2\Psi\,\cos\,\{2\pi\cdot\Delta n1(\lambda)\cdot d1/\lambda - \pi\cdot\Delta n2(\lambda)\cdot d2/\lambda\}]\times 2.$$

* * * * *